United States Patent
Endo et al.

(10) Patent No.: US 12,175,502 B2
(45) Date of Patent: Dec. 24, 2024

(54) INFORMATION PROCESSING APPARATUS, INFORMATION PROCESSING METHOD, INFORMATION PROCESSING SYSTEM, TERMINAL DEVICE, TERMINAL-DEVICE CONTROL METHOD, AND NON-TRANSITORY COMPUTER READABLE STORAGE MEDIUM

(71) Applicant: SoftBank Corp., Tokyo (JP)

(72) Inventors: Yoshihiro Endo, Tokyo (JP); Masanori Tanzawa, Tokyo (JP); Koji Hidaka, Tokyo (JP); Naohiro Akiyama, Tokyo (JP); Junichiro Mamiya, Tokyo (JP)

(73) Assignee: SOFTBANK CORP., Tokyo (JP)

( * ) Notice: Subject to any disclaimer, the term of this patent is extended or adjusted under 35 U.S.C. 154(b) by 0 days.

(21) Appl. No.: 17/276,421

(22) PCT Filed: Dec. 23, 2020

(86) PCT No.: PCT/JP2020/048320
§ 371 (c)(1),
(2) Date: Mar. 15, 2021

(87) PCT Pub. No.: WO2021/132414
PCT Pub. Date: Jul. 1, 2021

(65) Prior Publication Data
US 2022/0358550 A1    Nov. 10, 2022

(30) Foreign Application Priority Data

Dec. 24, 2019  (JP) .................... 2019-232836
Dec. 26, 2019  (JP) .................... 2019-237003
Dec. 26, 2019  (JP) .................... 2019-237012

(51) Int. Cl.
G06Q 10/00    (2023.01)
G06Q 10/02    (2012.01)
(Continued)

(52) U.S. Cl.
CPC ......... *G06Q 30/0282* (2013.01); *G06Q 10/02* (2013.01); *G06Q 30/0207* (2013.01); *G06V 20/53* (2022.01)

(58) Field of Classification Search
CPC .............. G06Q 30/0282; G06Q 10/02; G06Q 30/0207; G06Q 30/02; G06Q 10/06315; G06V 20/53; G06T 7/00; H04N 7/18
See application file for complete search history.

(56) References Cited

U.S. PATENT DOCUMENTS 10,332,178 B1 *   6/2019   Hare ................. G06Q 30/0201
2007/0179792 A1 * 8/2007   Kramer ............. G06Q 30/02
                                                         705/1.1
(Continued)

FOREIGN PATENT DOCUMENTS

JP    2001-297229 A    10/2001
JP    2004-94470 A      3/2004
(Continued)

OTHER PUBLICATIONS

Decision of Refusal issued Apr. 13, 2021 in Japanese Application No. 2019-232836.
(Continued)

Primary Examiner — Gabrielle A McCormick
(74) Attorney, Agent, or Firm — XSENSUS LLP

(57) ABSTRACT

An information processing apparatus according to the present application includes a use-condition acquiring unit, an image acquiring unit, a reservation-information acquiring unit, and a selecting unit. The use-condition acquiring unit acquires a use condition of the store. The image acquiring unit acquires an image obtained by capturing an inside of the store. The reservation-information acquiring unit acquires reservation information of the store. The selecting unit selects a store estimated to be usable on a date and time
(Continued)

indicated in the use condition based on the acquired image of the store and the reservation information of the store.

10 Claims, 40 Drawing Sheets

(51) Int. Cl.
*G06Q 30/0207* (2023.01)
*G06Q 30/0282* (2023.01)
*G06V 20/52* (2022.01)

(56) References Cited

U.S. PATENT DOCUMENTS

| | | | |
|---|---|---|---|
| 2012/0150586 A1* | 6/2012 | Harper | G06Q 30/0204 |
| | | | 705/7.33 |
| 2014/0278768 A1* | 9/2014 | Zenor | G06Q 30/0202 |
| | | | 705/7.31 |
| 2015/0310312 A1 | 10/2015 | Mongeon et al. | |
| 2016/0156575 A1* | 6/2016 | Jeong | H04L 51/10 |
| | | | 709/206 |
| 2017/0124465 A1* | 5/2017 | Yang | G06N 20/00 |
| 2020/0160066 A1* | 5/2020 | Tani | H04W 4/90 |

FOREIGN PATENT DOCUMENTS

| | | | |
|---|---|---|---|
| JP | 2004-220150 | A | 8/2004 |
| JP | 2005-44170 | A | 2/2005 |
| JP | 2012-98981 | A | 5/2012 |
| JP | 2013-37504 | A | 2/2013 |
| JP | 2014-203272 | A | 10/2014 |
| JP | 2015-179459 | A | 10/2015 |
| JP | 2016-177775 | A | 10/2016 |
| JP | 2017-68836 | A | 4/2017 |
| JP | 2019-101985 | A | 6/2019 |
| JP | 2019-145022 | A | 8/2019 |
| WO | 2008/114643 | A1 | 9/2008 |
| WO | 2011/115010 | A1 | 9/2011 |
| WO | 2018/116359 | A1 | 6/2018 |

OTHER PUBLICATIONS

Japanese Notice of a Patent Grant mailed Jun. 1, 2021 in Japanese Application No. 2019-237012.
Japanese Office Action mailed Jun. 8, 2021 in Japanese Application No. 2019-237003.
Office Action issued on Sep. 7, 2021, in corresponding Japanese patent Application No. 2019-237003, 3 pages.

* cited by examiner

| STORE ID | RESERVATION ID | NUMBER OF PEOPLE | RESERVATION TIME |
|---|---|---|---|
| E1 | ... | ... | ... |
| | 1 | 4 | 2019/10/8 19:00 TO 21:00 |
| | ... | ... | ... |
| E2 | ... | ... | ... |
| | ... | ... | ... |

| STORE ID | NUMBER OF PEOPLE | DATE AND TIME OF IMAGING |
|---|---|---|
| ... | ... | |
| E1 | 5 PEOPLE | 2019/9/14 10:00 |
| | 6 PEOPLE | 2019/9/14 14:00 |
| | 12 PEOPLE | 2019/9/14 17:00 |
| | ... | |
| E2 | ... | ... |
| ... | ... | ... |

FIG.7

| STORE ID | TYPE OF CUISINE | BUDGET | ATMOSPHERE | ADDRESS | NUMBER OF SEATS | ... |
|---|---|---|---|---|---|---|
| ... | ... | ... | ... | ... | ... | ... |
| E1 | JAPANESE FOOD | ○○○ TO ×××YEN | SUITABLE FOR DATE | SHINBASHI ○-○-○ | ○○ | ... |
| ... | ... | ... | ... | ... | ... | ... |
| ... | ... | ... | ... | ... | ... | ... |

| STORE ID | IMAGE | DATE AND TIME OF IMAGING |
|---|---|---|
| ... | ... | |
| E1 | IMAGE #1 | 2019/9/14 10:00 |
| | IMAGE #2 | 2019/9/14 14:00 |
| | IMAGE #3 | 2019/9/14 17:00 |
| | ... | |
| E2 | ... | ... |
| ... | ... | ... |

| STORE ID | IMAGE | DATE AND TIME OF IMAGING |
|---|---|---|
| ... | ... | |
| E21 | IMAGE #1 | 2019/9/14 10:00 |
| | IMAGE #2 | 2019/9/14 14:00 |
| | IMAGE #3 | 2019/9/14 17:00 |
| | ... | |
| E22 | ... | ... |
| ... | ... | ... |

| USE PURPOSE | CONDITION |
|---|---|
| ... | |
| SUITABLE FOR DATE | BRIGHTNESS IS AA OR LOWER, AND CALMNESS IS BB OR HIGHER |
| SUITABLE FOR CLIENT ENTERTAINMENT | CALMNESS IS CC OR HIGHER |
| SUITABLE FOR FAMILY DINNER | NUMBER OF FAMILIES IS DD OR MORE |
| SUITABLE FOR MATCHMAKING PARTY | AGE GROUP IS EE OR YOUNGER |
| ... | |

| STORE ID | DETAIL INFORMATION | SEARCH CONDITION | | | |
|---|---|---|---|---|---|
| | | USE PURPOSE | VACANCY | AREA | ... |
| E21 | DETAIL INFORMATION #1 | SUITABLE FOR DATE | VACANCY #1 | AREA #1 | ... |
| E22 | DETAIL INFORMATION #2 | SUITABLE FOR FAMILY DINNER | VACANCY #2 | AREA #2 | ... |
| ... | ... | ... | ... | ... | ... |

| AREA | STORE ID | GENRE | AVERAGE SPENDING PER CUSTOMER | USE PURPOSE | ... |
|---|---|---|---|---|---|
| AR1 | SH11 | ITALIAN FOOD | 900 | DATE | ... |
| | SH12 | ITALIAN FOOD | 850 | SECOND PARTY | ... |
| | SH13 | JAPANESE FOOD | 600 | HAVING FEW DRINKS | ... |
| | ... | ... | ... | ... | ... |
| AR2 | SH21 | ITALIAN FOOD | 700 | FAMILY DINNER | ... |
| | SH22 | ITALIAN FOOD | 1,000 | DATE | ... |
| | SH23 | TAVERN | 1,000 | MATCHMAKING PARTY | ... |
| | ... | ... | ... | ... | ... |
| AR3 | SH31 | ITALIAN FOOD | 900 | DRINKING PARTY | ... |
| | SH32 | ITALIAN FOOD | 900 | DATE | ... |
| | SH33 | BAR | 1,500 | DATE | ... |
| | ... | ... | ... | ... | ... |
| ... | ... | ... | ... | ... | ... |

INFORMATION PROCESSING APPARATUS, INFORMATION PROCESSING METHOD, INFORMATION PROCESSING SYSTEM, TERMINAL DEVICE, TERMINAL-DEVICE CONTROL METHOD, AND NON-TRANSITORY COMPUTER READABLE STORAGE MEDIUM

CROSS-REFERENCE TO RELATED APPLICATIONS

The present application is based on PCT filing PCT/JP2020/048320, filed Dec. 23, 2020, which claims priority to JP 2019-232836, filed Dec. 24, 2019, and JP 2019-237003, filed Dec. 26, 2019, and JP 2019-237012, filed Dec. 26, 2019, the entire contents of each are incorporated herein by reference.

FIELD

The present invention relates to an information processing apparatus, an information processing method, an information processing program, an information processing system, a terminal device, a terminal-device control method, a terminal-device control program, and a terminal program.

BACKGROUND

Conventionally, a technique of providing information on whether there is a table available at a store, the number of waiting people, waiting time, and the like (information on crowdedness) when there are no tables available, or sending a real time atmosphere of the store with an image has been suggested (refer to Patent Literature 1).

CITATION LIST

Patent Literature

Patent Literature 1: JP-A-2004-220150

SUMMARY

Technical Problem

However, by the technique described above, when a user of a store searches for an available store at a specified time (for example, 10 minutes from the current time), the user needs to search for it while checking the information on crowdedness and images of multiple stores and, therefore, it takes time and effort to find a store. The present application has been achieved in view of the above problem, and it is an object of the present application to reduce time and effort when searching for a store.

Solution to Problem

An information processing apparatus includes an image acquiring unit that acquires an image that is obtained by capturing an inside of a store. The information processing apparatus includes a reservation-information acquiring unit that acquires reservation information of the store. The information processing apparatus includes a selecting unit that selects a store estimated to be usable based on the image of the store and the reservation information of the store acquired.

Advantageous Effects of Invention

According to one mode of embodiments, an effect is produced that time and effort for searching for a store can be reduced.

BRIEF DESCRIPTION OF DRAWINGS

FIG. 6 is a diagram illustrating an example of a use state database according to the first embodiment.

FIG. 7 is a diagram illustrating an example of a store database according to the first embodiment.

FIG. 14 is a diagram illustrating an example of an image database according to the second embodiment.

FIG. 31 is a diagram illustrating an example of an image database according to the fourth embodiment.

FIG. 32 is a diagram illustrating an example of a use purpose database according to the fourth embodiment.

FIG. 47 is a diagram illustrating an example of a store database according to the seventh embodiment.

DESCRIPTION OF EMBODIMENTS

In the following, forms (hereinafter, "embodiments") to implement an information processing apparatus, an information processing method, an information processing program, an information processing system, a terminal device, a terminal-device control method, a terminal-device control program, and a terminal program will be explained in detail with reference to the drawings. Note that the information processing apparatus, the information processing method, the information processing program, the information processing system, the terminal device, the terminal-device control method, the terminal-device control program, and the terminal program according to the present application are not limited to the embodiments. Moreover, like reference signs are assigned to like parts throughout the embodiments described below, and duplicated explanation will be omitted.

First Embodiment

One Example of Information Processing

Figure 1:
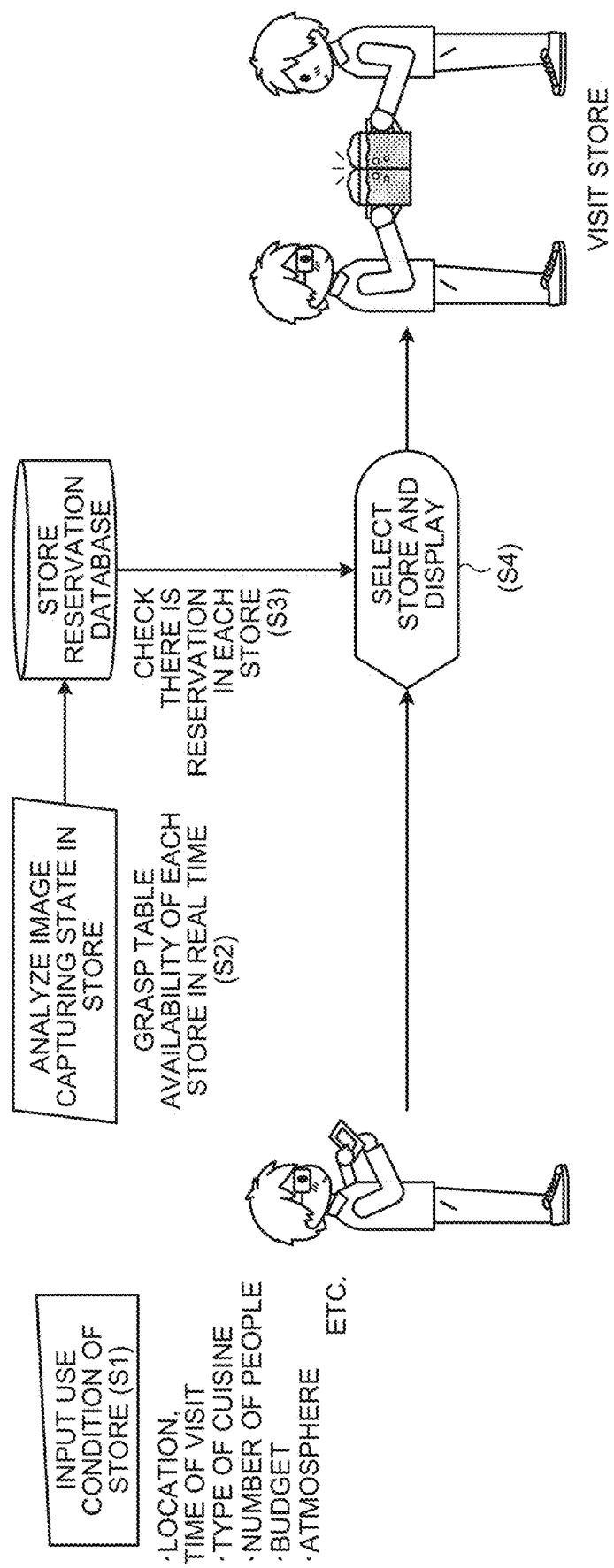
FIG. 1 a diagram illustrating an example of information processing according to a first embodiment.

An example of information processing according to a first embodiment will be explained by using FIG. 1. FIG. 1 is a diagram illustrating an example of the information processing according to the first embodiment. FIG. 1 explains processing performed by the information processing apparatus of selecting a store that matches a use condition input by a user of a store based on table availability of stores that is judged from images captured by an imaging apparatus and store reservation database. The stores are eating places, such as a coffee shop, a tavern, and a restaurant. The imaging apparatus that captures images of respective stores in the first embodiment is, for example, an artificial intelligence (AI) camera, and analyzes the captured images.

There can be a difference between the number of tables available in a reservation service or the like of an eating place and the number of actual available tables. This happens because if all of vacant tables made available in a reservation system, the store becomes a reservation-only store, and general customers cannot enter the store. Accordingly, to check the table availability information of a store in real time, table availability information of a store that is judged from images of the actual store captured by a camera is necessary in addition to information in a store reservation database.

The information processing apparatus accepts an input of a use condition of a store from a terminal device (user terminal) of a user of the store (step S1). This use condition of a store includes, for example, a location of a store the user wishes to use (an area in which a store is located), a time of visit, the number of people, a budget, atmosphere, and the like.

The imaging apparatuses installed in the respective stores judge the number of customers in the stores by analyzing images capturing a state in the stores. The information processing apparatus then grasps (judges) the table availability of the respective stores in real time based on the number of customers in the respective stores acquired from the respective imaging apparatuses (step S2).

Subsequently, the information processing apparatus refers to, for example, information in a store reservation database provided by a gourmet site or the like, to check whether the respective stores have reservations (step S3). Thus, for example, the information processing apparatus can check whether there is a table available for the wished number of people at the wished time of visit in a store that has been judged that there is a vacant table based on the number of customers in the respective stores.

The information processing apparatus then selects a store that matches the use condition input at S1 and that has been confirmed to have a table available for the number of people wishing to visit at the wishing time of visit, and displays it on the user terminal of the user, or the like (step S4). Thereafter, the user chooses a store he/she likes from among the stores displayed at S4, and makes a reservation process or the like for the chosen store, and then visits the store.

By thus processing, the user can acquire information of a store that matches a time he/she wishes to visit, the number of people, and a preference. As a result, for example, after a first party such as a reception, time and effort of the user for finding a store to be a place of a second party can be reduced.

The processing of judging table availability of respective stores in real time performed by an information processing apparatus 100 described at S2 in FIG. 1 will be explained by using FIG. 2.

For example, it is explained using an example in which three units of imaging apparatuses 10-1 to 10-3 are installed in stores E1 to E3, respectively. Moreover, in the following, the three stores E1 to E3 are referred to as store E collectively, when those are not particularly distinguished from one another. Similarly, the three units of the imaging apparatuses 10-1 to 10-3 are collectively referred to as imaging apparatus 10. The imaging apparatus 10 is a camera installed in a store, a camera held by a staff of a store, and the like.

Figure 2:
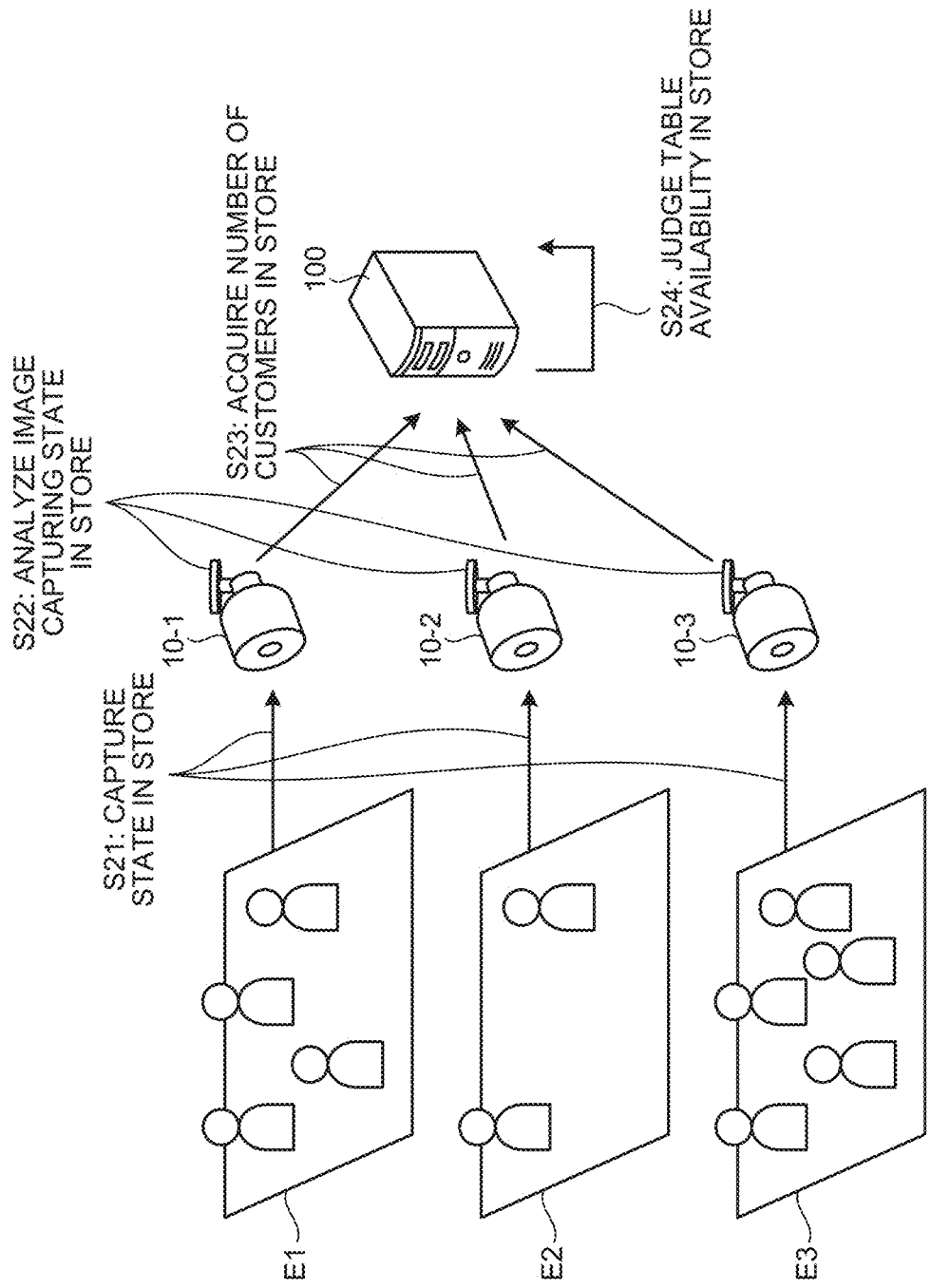
FIG. 2 is a diagram illustrating an example of processing to judge table availability of respective stores in real time by analyzing images capturing a state in the respective stores by an information processing apparatus according to the first embodiment.

As illustrated in FIG. 2, the three units of the imaging apparatuses 10 installed in the three stores E, respectively, capture a state in the corresponding stores E (step S21). In the example in FIG. 2, the imaging apparatus 10-1 installed in the store E1 captures a state in the store E1. Moreover, the imaging apparatus 10-2 installed in the store E2 captures a state in the store E2. Furthermore, the imaging apparatus 10-3 installed in the store E3 captures a state in the store E3.

Subsequently, the imaging apparatuses 10 respectively analyze images capturing the state in the stores E (step S22), and judge the number of customers in the stores E. The information processing apparatus 100 acquires the number of people of the stores E (step S23). Specifically, for each of the three stores E1 to E3, the information processing apparatus 100 acquires the number of customers of the respective stores E from the three units of the imaging apparatuses 10-1 to 10-3 corresponding thereto. Subsequently, the information processing apparatus 100 judges the table availability of the respective stores E based on the acquired number of customers of the respective stores E (step S24). For example, the information processing apparatus 100 judges a percentage of seats taken out of seats prepared in the store E and the like based on the acquired number of customers of the store E and the number of seats of the store E described in the store database.

Configuration of Information Processing System

Figures 3, 4:
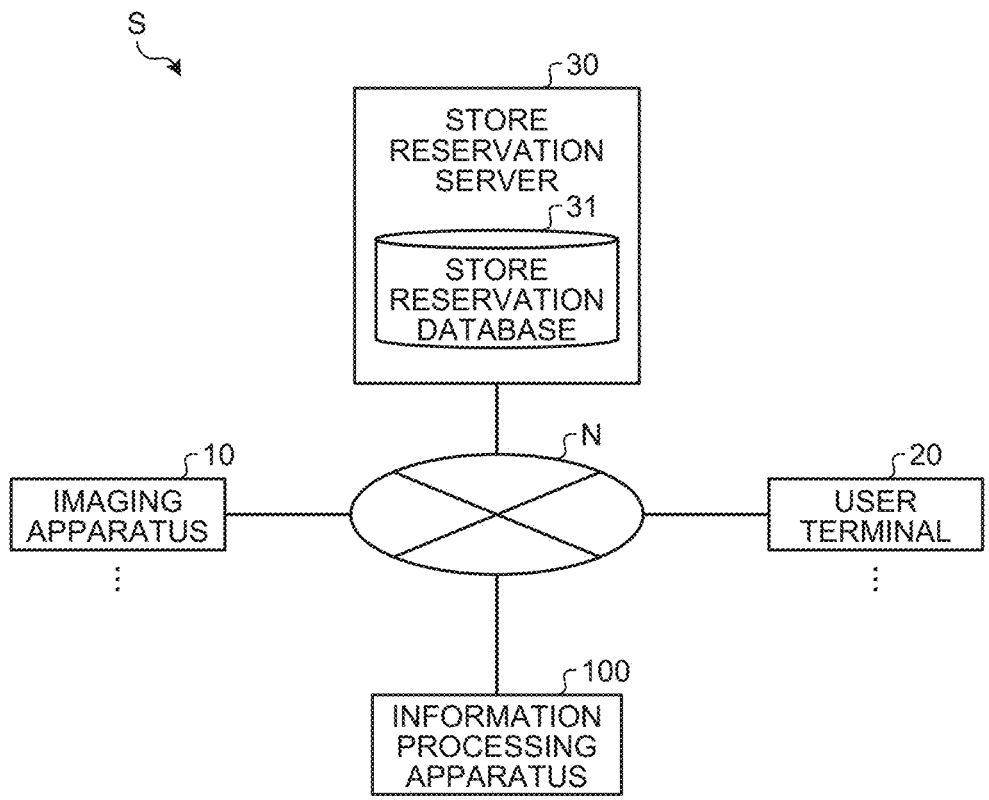
FIG. 3 is a diagram illustrating a configuration example of an information processing system according to the first embodiment.
FIG. 4 is a diagram illustrating an example of a store reservation database according to the first embodiment.

Next, a configuration of an information processing system S according to the first embodiment will be explained. FIG. 3 is a diagram illustrating a configuration example of the information processing system S according to the first embodiment. As illustrated in FIG. 3, the information processing system S includes the imaging apparatus 10, a user terminal (terminal device) 20, a store reservation server 30, and the information processing apparatus 100. The imaging apparatus 10, the user terminal 20, the store reservation server 30, and the information processing apparatus 100 are wiredly or wirelessly connected through a network N so as to be able to communicate with one another.

The imaging apparatus 10, for example, is a camera that is installed in a store, a camera held by a staff of the store, and the like. An image captured by the imaging apparatus 10 may be a still image, or a moving image. This imaging apparatus 10 analyzes an image capturing a state in a store, and judges the number of customers in the store.

The user terminal 20 is an information processing apparatus that is used by a user that views information of a store through an application or a web page. The user terminal 20 is, for example, a smartphone, a mobile phone, a tablet terminal, a personal digital assistant (PDA), a desktop personal computer (PC), a laptop PC, or the like.

The store reservation server 30 has a store reservation database 31. FIG. 4 illustrates an example of the store reservation database 31 according to the first embodiment. The store reservation database 31 stores reservation information of respective stores. This reservation information includes, for example, items of "STORE ID", "RESERVATION ID", "NUMBER OF PEOPLE", and "RESERVATION TIME" as illustrated in FIG. 4.

For example, it is indicated that the number of people of the reservation ID "1" of the store ID "E1" is "4 (people)", and the reservation time is "2019/10/8 19:00 to 21:00" in FIG. 4.

Returning back to explanation of FIG. 3, the information processing apparatus 100 is implemented by, for example, a server device, or the like. The information processing apparatus 100 selects a store that matches a use condition input by a user of a store, based on the number of customers of the store acquired from the imaging apparatus 10 and the store reservation database.

Configuration of Imaging Apparatus

Figure 5A:
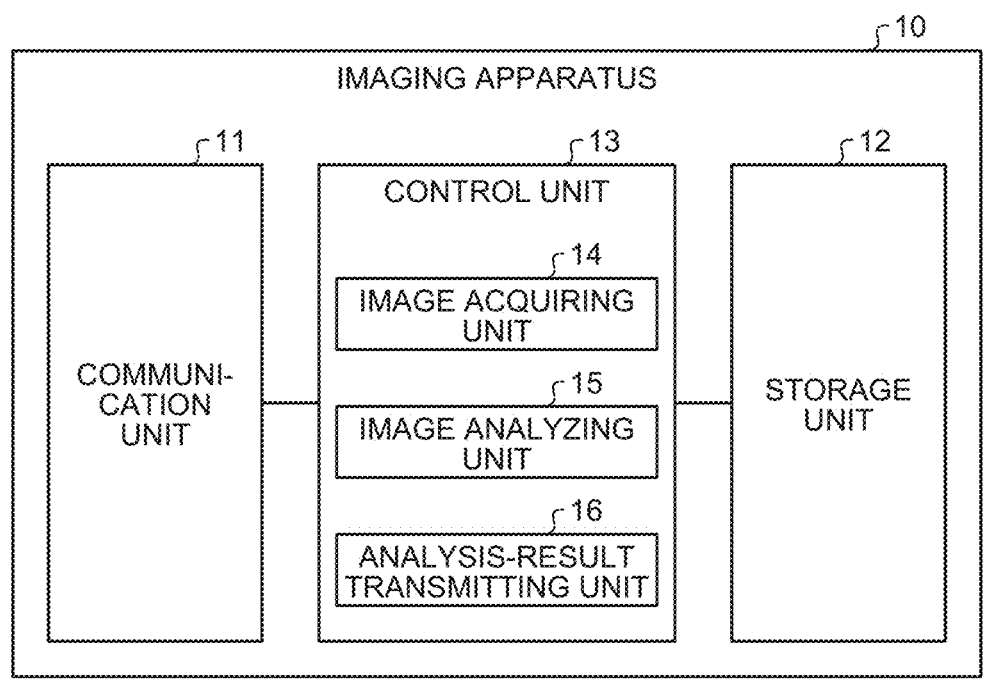
FIG. 5A is a diagram illustrating a configuration example of an imaging apparatus according to the first embodiment.

Next, a configuration of the imaging apparatus 10 according to the first embodiment will be explained by using FIG. 5A. FIG. 5A is a diagram illustrating a configuration example of the imaging apparatus 10 according to the first embodiment. As illustrated in FIG. 5A, the imaging apparatus 10 includes a communication unit 110, a storage unit 12, and a control unit 13.

A communication unit 11 is implemented by, for example, a network interface card (NIC), or the like. The communication unit 11 is connected wiredly or wirelessly to a network, and transmits and receives information with the information processing apparatus 100.

The storage unit 12 is implemented by, for example, a semiconductor memory, such as a random access memory (RAM) and a flash memory, or a storage device, such as a hard disk and an optical disk. The storage unit 12 stores information that is referred to when the control unit 13 performs various kinds of processing, processing results, and the like.

The control unit 13 includes an image acquiring unit 14, an image analyzing unit 15, and an analysis-result transmitting unit 16.

The image acquiring unit 14 acquires an image. For example, the image acquiring unit 14 acquires an image capturing a state in a store.

The image analyzing unit 15 analyzes the image that is acquired by the image acquiring unit 14. For example, the image analyzing unit 15 analyzes the image capturing a state in a store, to thereby judge the number of customers the store. This image analyzing unit 15 may be configured such that an publicly-known image analysis technology identifies a human image from an image or a moving image by using a human detection technique, and the number of customers are counted based on the number of identified human images.

The analysis-result transmitting unit 16 transmits an analysis result acquired by the image analyzing unit 15 to the information processing apparatus 100. For example, the analysis-result transmitting unit 16 information in which a store ID and a time stamp (imaging date and time) are added to the number of customers in the store, which is the analysis result acquired by the image analyzing unit 15 (information relating to the number of customers of the store), to the information processing apparatus 100. The analysis-result transmitting unit 16 may use a camera ID that is identification information of the own imaging apparatus 10, in place of the store ID described above.

As described above, by performing analysis of an image in a store in the information apparatus 100, and transmitting the analysis result to the information processing apparatus 100, it is possible to reduce a traffic amount at the time of information transmission by the imaging apparatus 10 to the information processing apparatus 100. Moreover, because the information transmitted to the information processing apparatus 100 by the imaging apparatus 10 indicates only the number of customers, not including information to identify an individual, such as a character, privacy can be protected.

Configuration of Information Processing Apparatus

Figure 5B:
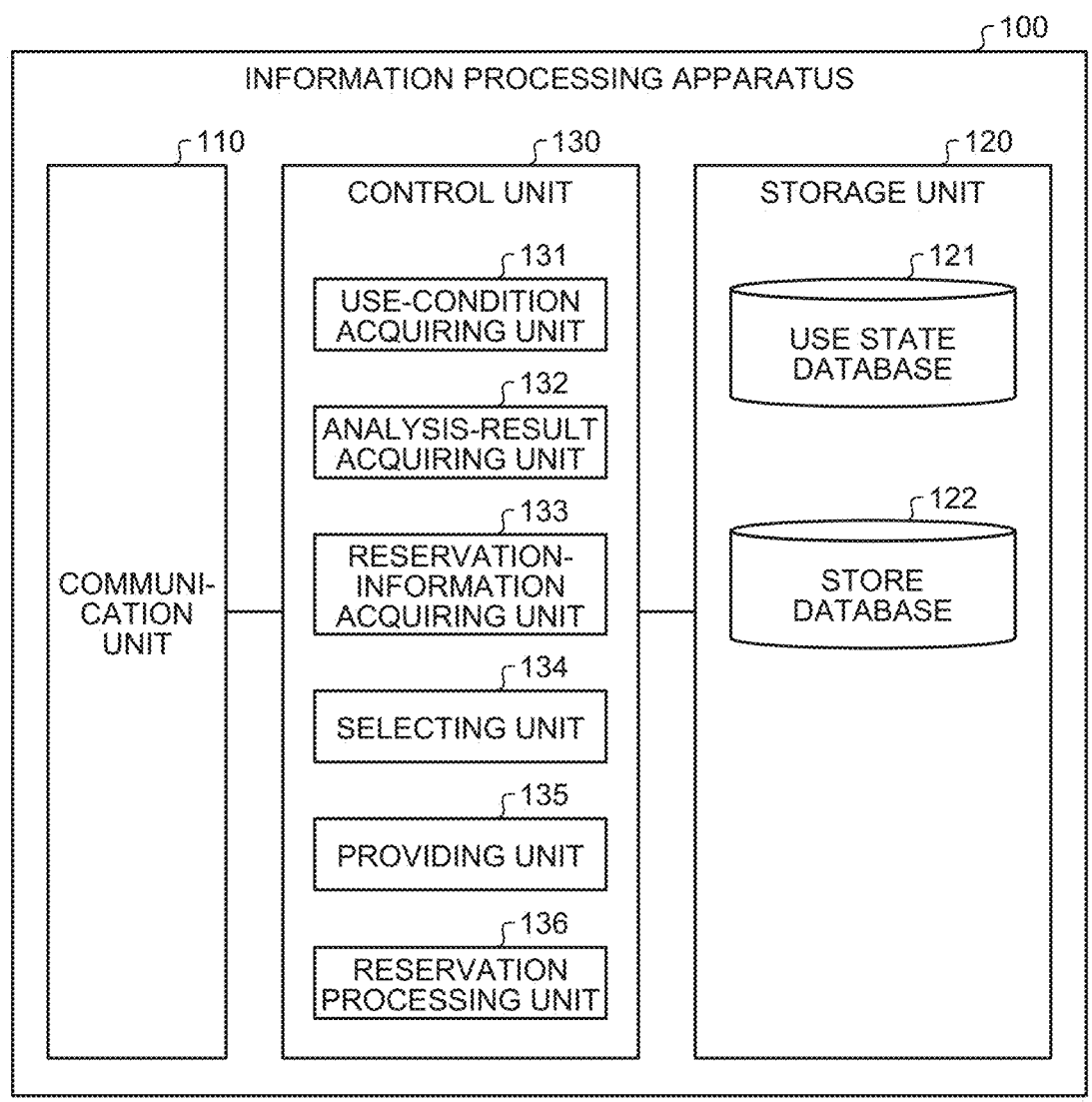
FIG. 5B is a diagram illustrating a configuration example of the information processing apparatus according to the first embodiment.

Next, a configuration of the information processing apparatus 100 according to the first embodiment will be explained by using FIG. 5B. FIG. 5B is a diagram illustrating a configuration example of the information processing apparatus 100 according to the first embodiment. As illustrated in FIG. 5B, the information processing apparatus 100 includes a communication unit 110, a storage unit 120, and a control unit 130.

The communication unit 110 is implemented by, for example, an NIC, or the like. The communication unit 110 is connected wiredly or wirelessly to a network, and transmits and receives information with the imaging apparatus 10, the user terminal 20, and the store reservation server 30.

The storage unit 120 is implemented by, for example, a semiconductor memory device, such as a RAM and a flash memory, or a storage device, such as a hard disk and an optical disk. The storage unit 120 has a use state database 121 and a store database 122.

The use state database 121 stores information relating to the number of customers of a store transmitted from the imaging apparatus 10. FIG. 6 is a diagram illustrating an example of the use state database 121 according to the first embodiment. In the example illustrated in FIG. 6, the use state database 121 includes items of "STORE ID", "NUMBER OF CUSTOMERS", and "IMAGING DATE AND TIME".

For example, it is indicated that the number of customers at "2019/9/17:00 10:00" in the store E1 identified by the store ID is "12 PEOPLE" in FIG. 6.

The store database 122 stores store information of respective stores. FIG. 7 illustrates an example of the store database 122 according to the embodiment. The store information includes items of "STORE ID2", "TYPE OF CUISINE", "BUDGET", "ATMOSPHERE", "LOCATION", and "NUMBER OF SEATS of seats" as illustrated in FIG. 7.

For example, it is indicated that the type of cuisine of the store of the store aid "E1" is "JAPANESE", the budget is "xxx TO yyy YEN", the atmosphere is "SUITABLE FOR DATE", the location is "x-x-x SHINBASHI", and the number of seats is "xx" in FIG. 7.

Returning back to explanation of FIG. 5B, the control unit 130 is a controller, and is implemented by executing various kinds of programs (corresponding to one example of information processing program) stored in a storage device in the information processing apparatus 100 by a central processing unit (CPU), a micro processing unit (MPU), or the like by using the RAM as its work area. Moreover, the control unit 130 is a controller, and is implemented by, for example, an integrated circuit, such as an application specific integrated circuit (ASIC and a field programmable gate array (FPGA).

The control unit 130 includes a use-condition acquiring unit 131, an analysis-result acquiring unit 132, a reservation-information acquiring unit 133, a selecting unit 134, a providing unit 135, and a reservation processing unit 136.

The use-condition acquiring unit 131 acquires a use condition of a store from the user terminal 20. This use condition of a store includes, for example, information about date and time of use of a store the user wishes to use (visiting time), location, type of cuisine, the number of people, budget, atmosphere, and the like.

The analysis-result acquiring unit 132 acquires an analysis result of an image in the store E from the imaging apparatus 10. Specifically, the analysis-result acquiring unit 132 acquires, for the respective plural stores E, information about the number of customers of the store E transmitted from the imaging apparatuses 10 in the respective stores E. The analysis-result acquiring unit 132 stores the acquired information in the use condition database 121.

The reservation-information acquiring unit 133 acquires reservation information of a store from the store reservation database 31 of the store reservation server 30.

The selecting unit 134 selects a store (store candidate) that is estimated to have seats available for the number of people input in the use condition, at the time and date indicated in the use condition acquired from the user terminal 20, based on the number of customers in a store and on the reservation information of the store.

For example, the selecting unit 134 judges the table availability in the store based on the number of customers (the latest number of customers) of the store stored in the use condition database 121 and the number of table of the store indicated in the store database 122. The selecting unit 134 then selects a store estimated to have seats available for the number of people input in the use condition at the date and time (for example, 10 minutes later) indicated in the use condition described above, based on the judged table availability in the store and the reservation information of the store acquired by the reservation-information acquiring unit 133.

For example, the selecting unit 134 considers a case in which the date and time of use indicated in the use condition is 10 minutes later, and the number of people is four. In this case, when it is judged that there are available seats for four people in the store based on the number of customers (the latest number of customers) of the store stored in the use-state database 121 and the number of seats of the store indicated in the store database 122, the selecting unit 134 refers to reservation information of the store acquired by the reservation-information acquiring unit 133, and checks whether seats for four people are still available after 10 minutes in the store. When it is confirmed that seats for four people are still available after 10 minutes in the store, the selecting unit 134 estimates that the store is usable.

Moreover, the selecting unit 134 may make a selection, for example, considering other conditions (for example, location of a store, type of cuisine, budget, atmosphere, and the like) included in the use condition also when selecting a store.

For example, the selecting unit 134 refers to store information of the store database 122 if a location of a store, a type of cuisine, a budget, atmosphere, and the like are included in the use condition, and selects stores that satisfy these conditions. Thus, the selecting unit 134 can select a store, considering conditions, such as a location of a store, a type of cuisine, a budget, and atmosphere indicated in the use condition.

The providing unit 135 provides information of the stores selected by the selecting unit 134 to the user terminal 20. For example, the providing unit 135 transmits information of the stores selected by the selecting unit 134 to the user terminal that is a transmission source of the use condition.

The reservation processing unit 136 performs reservation processing of a store. For example, when reservation information of the store is received from the user terminal 20 after the providing unit 135 transmits the information of a store to the user terminal 20, the reservation processing unit 136 performs reservation processing of a store with respect to the reservation server 30 based on the reservation information.

Configuration of User Terminal

Figure 8:
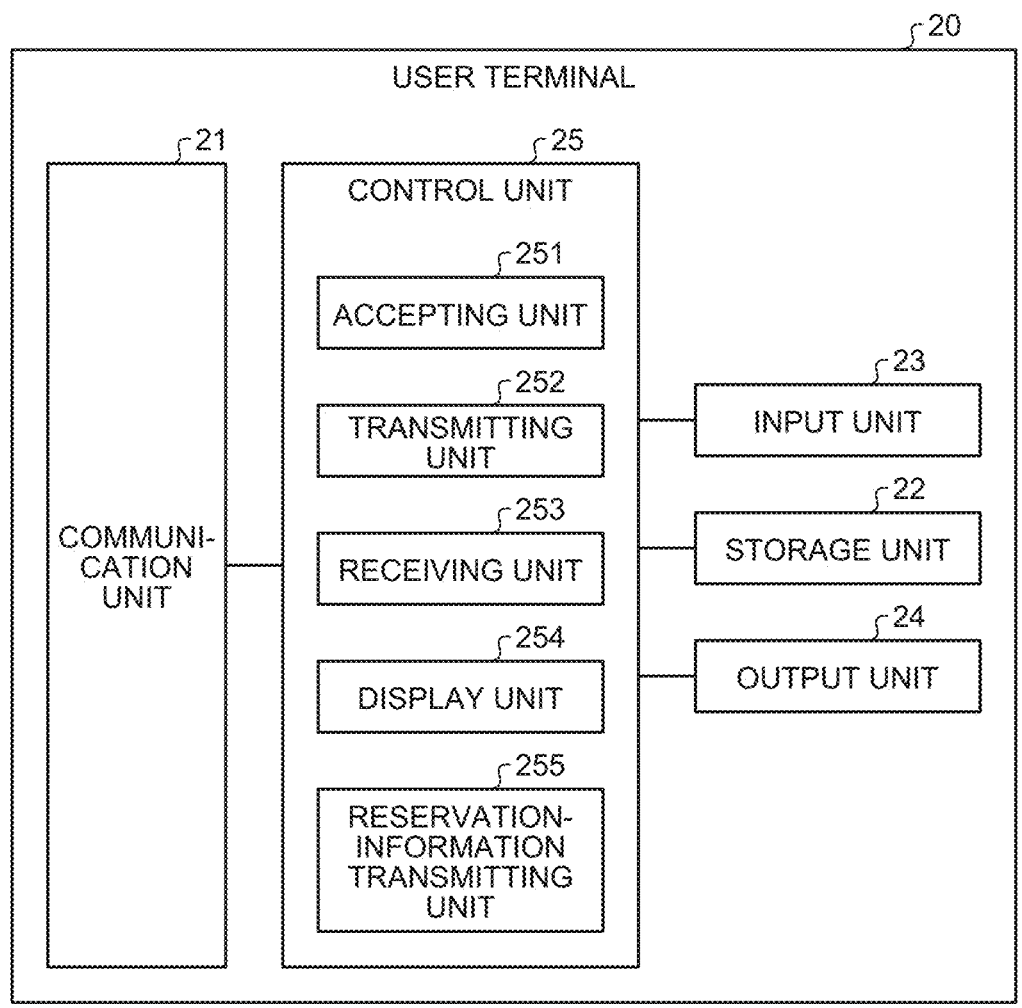
FIG. 8 is a diagram illustrating a configuration example of a user terminal according to the first embodiment.

Next, a configuration of the user terminal 20 according to the first embodiment will be explained by using FIG. 8. FIG. 8 is a diagram illustrating a configuration example of the user terminal 20 according to the first embodiment. As illustrated in FIG. 8, the user terminal 20 includes a communication unit 21, a storage unit 22, an input unit 23, an output unit 24, and a control unit 25.

The communication unit 21 is an interface, such as a NIC, that performs communication with the information processing apparatus 100 connected to the network N in a communication-enabled manner.

The storage unit 22 is implemented by, for example, a semiconductor memory device, such as a RAM and a flash memory, or a storage device, such as a hard disk and an optical disk.

The input unit 23 is an input device that accepts various kinds of operations from a user. For example, the input unit 23 is implemented by a keyboard, a mouse, an operating key, and the like. The output unit 24 is a display device to display various kinds of information. For example, the output unit 24 is implemented by a liquid crystal display, or the like. When a touch panel is used for the user terminal 20, the input unit 23 and the output unit 24 are integrated.

The control unit 25 is a controller, and is implemented by executing various kinds of programs (corresponding to one example of terminal-device control program) stored in the storage device in the user terminal 20, for example, by a CPU, an MPU, or the like by using the RAM as a work area. Moreover, the control unit 25 is a controller, and is implemented by, for example, an integrated circuit, such as an ASIC and an FPGA.

The control unit 25 includes an accepting unit 251, a transmitting unit 252, a receiving unit 253, and a display unit 254.

The accepting unit 251 accepts an input of a use condition of the store E. The accepting unit 251 accepts an input of the use condition, for example, from a use condition accepting screen described below.

Figure 9:
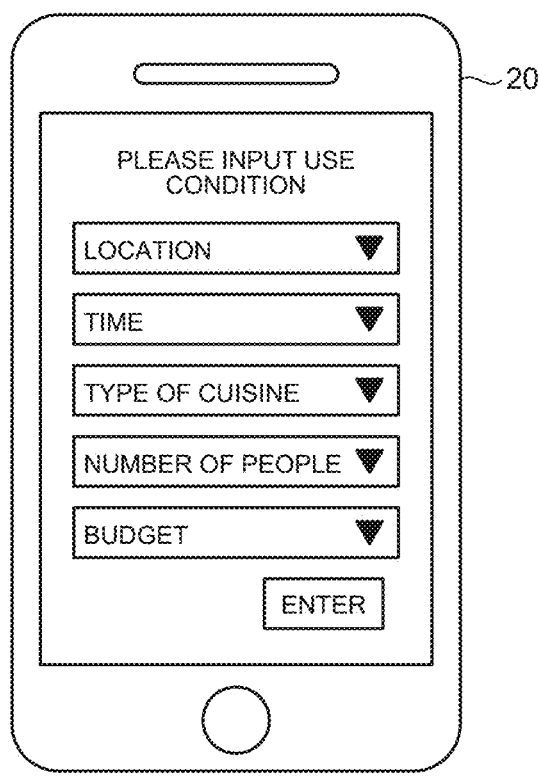
FIG. 9 is a diagram illustrating an example of a use-condition accepting screen in the user terminal according to the first embodiment.

FIG. 9 is a diagram illustrating an example of a use-condition accepting screen in the user terminal according to the first embodiment. When a predetermined application is started, the accepting unit 251 displays, for example, information indicating "PLEASE INPUT USE CONDITION", and a pull-down display for "LOCATION", a pull-down display, for "TIME", a pull-down display for "TYPE OF CUISINE", a pull-down display for "NUMBER OF PEOPLE", a pull-down display for "BUDGET", and an enter button on the display unit 24 as illustrated in FIG. 9. Having accepted the input of a use condition from the use-condition accepting screen described above, and an input to the enter button, the accepting unit 251 outputs the input use condition to the transmitting unit 252.

The transmitting unit 252 transmits the use condition accepted by the accepting unit 251 described above, to the information processing apparatus 100. The receiving unit 253 receives information of a store selected by the information processing apparatus 100 (information of a store that matches the use condition).

Figure 10:
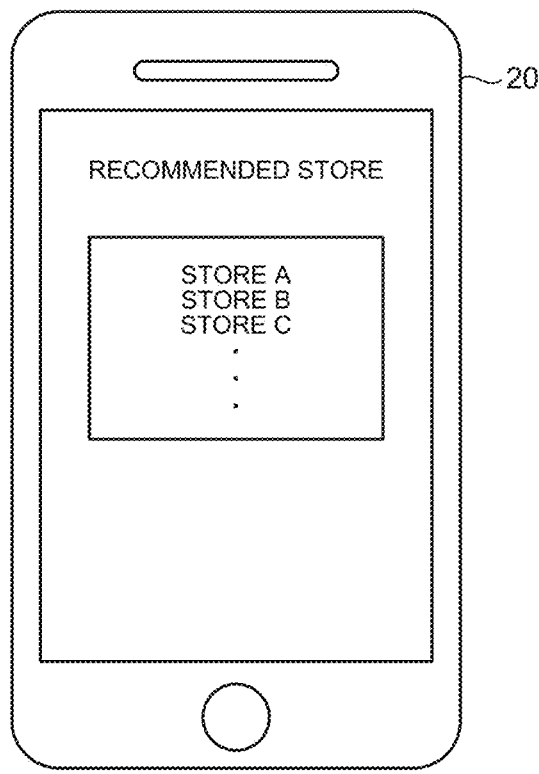
FIG. 10 is a diagram illustrating an example of a display screen of information of a store in the user terminal according to the first embodiment.

The display unit 254 displays the information of a store received by the receiving unit 253 on the output unit 24. FIG. 10 is a diagram illustrating an example of a display screen of information of a store in the user terminal 20 according to the embodiment. For example, the display unit 254 displays a list of stores selected by the information processing apparatus 100 as "RECOMMENDED STORES" on the output unit 24 as illustrated in FIG. 10.

Returning back to explanation of FIG. 8, the reservation-information transmitting unit 255 transmits reservation information of a store to the information processing apparatus 100. For example, a selection input of a store to be reserved is received from a user through the input unit 23 after the display unit 254 displays information on a store selected by the information processing apparatus 100 on the output unit 24, the reservation-information transmitting unit 255 transmits reservation information or the store to the information processing apparatus 100.

It has been explained that the imaging apparatus 10 transmits information about the number of customers of a store to the information processing apparatus as a result of image analysis of the store, but it is not limited thereto. For example, the image analyzing unit 15 of the imaging apparatus 10 analyzes an image of a store, and judges table availability of the store (how many customers are there with respect to the number of seats in the store). The analysis-result transmitting unit 16 may transmit the table availability of the store as a result of the image analysis to the information processing apparatus 100. In this case, it is not necessary to judge table availability on the information processing apparatus 100 side.

Processing Procedure

Figure 11:
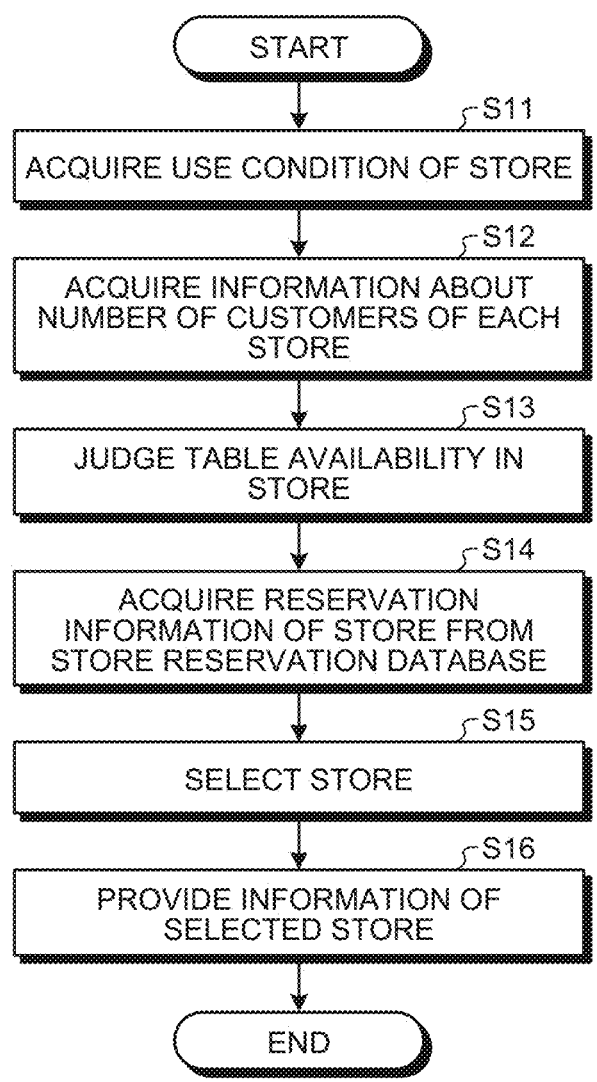
FIG. 11 is a flowchart illustrating an example of a procedure of information processing in the information processing apparatus according to the first embodiment.

Next, a procedure of information processing of the information processing apparatus 100 according to the first embodiment will be explained by using FIG. 11. FIG. 11 is a flowchart illustrating an example of a procedure of information processing of the information processing apparatus 100 according to the first embodiment.

As illustrated in FIG. 11, the use-condition acquiring unit 131 acquires a use condition of a store from the user terminal 20 (step S11). Moreover, the analysis-result acquiring unit 132 acquires information relating to the number of customers of respective stores from the respective imaging apparatuses 10 (step S12). The analysis-result acquiring unit 132 stores the acquired information relating to the number of customers of the respective stores in the use state database 121. Thereafter, the selecting unit 134 judges table availability an a store in the respective stores based on the latest number of customers of the respective stores stored in the use state database 121 and the number of seats of the respective stores indicated in the store database 122 (step S13). Furthermore, the reservation-information processing unit 133 acquires reservation information of the respective stores from the store reservation database 31 (step S14).

Subsequently, the selecting unit 134 selects a store that satisfies the use condition acquired at S11 based on the table availability in the store judged at S13, the reservation information of the store acquired at S14, and the store information in the store database 122 (step S15). Thereafter, the providing unit 135 provides information of the store selected at S15 to the user terminal 20 (step S16).

Although explanation is omitted in FIG. 11, after S16, when the reservation processing unit 136 receives reservation information of a store from the user terminal, the reservation processing unit 136 performs reservation process of a store based on the reservation information.

Figure 12:
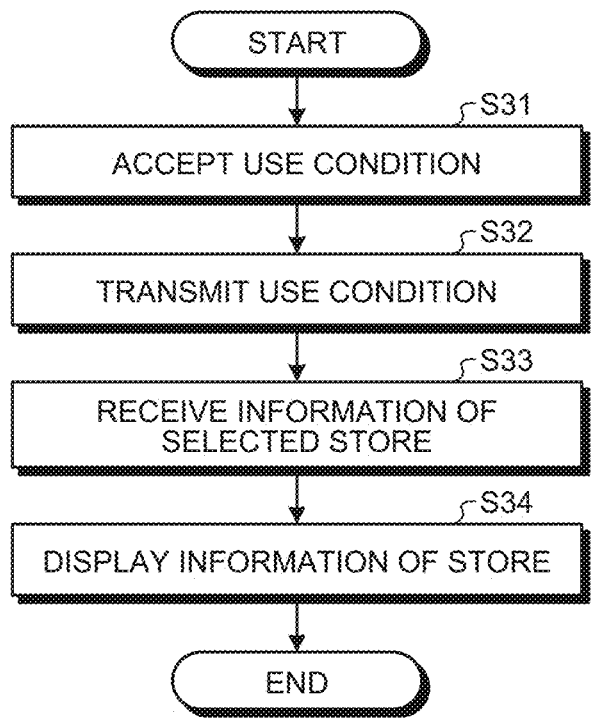
FIG. 12 is a flowchart illustrating an example of a procedure of information processing in the user terminal according to the first embodiment.

Next, a procedure of information processing of the user terminal 20 according to the first embodiment will be explained by using FIG. 12. FIG. 12 is a flowchart illustrating an example of a procedure of information processing in the user terminal 20 according to the first embodiment.

As illustrated in FIG. 12, the accepting unit 251 accepts a use condition of the store E (step S31).

The transmitting unit 252 transmits the use condition to the information processing apparatus 100 (step S32). When accepting the use condition from the user terminal 20, the information processing apparatus 100 selects a store based on the use condition, the image of the respective stores, and the reservation information of the respective stores. The information processing apparatus 100 then transmits the selected store to the user terminal 20.

The receiving unit 253 receives information of a store selected by the information processing apparatus 100 (step S33).

The display unit 254 displays the information of a store received by the receiving unit 253 on the output unit 24 (step S34).

Although explanation is omitted in FIG. 12, after S34, when the reservation-information transmitting unit 255 accepts a selection input of information of a store to be reserved from the information of a store displayed on the output unit 24, the reservation-information transmitting unit 255 transmits the reservation information of the store to the information processing apparatus 100.

Second Embodiment

Note that the information processing system S may use an imaging apparatus that does not have an image analysis function. In this case, the image analysis of respective stores is performed on the information processing apparatus 100 side. For example, having captured a state in a store, the imaging apparatus transmits information in which a store ID (or a camera ID of the imaging apparatus itself) and a time stamp (imaging date and time) are added to the image, to the information processing apparatus. The information processing apparatus 100 performs analysis of an image of a store transmitted from the respective imaging apparatuses, and judges table availability of the respective stores based on the analysis result. It will be explained using the information processing system S in such a case as a second embodiment. Like reference signs are assigned to like parts components as the first embodiment, and explanation thereof will be omitted.

An information processing apparatus 100a according to the second embodiment will be explained by using FIG. 13. The information processing apparatus 100a includes an image acquiring unit 132a in place of the analysis-result acquiring unit 132 (refer to FIG. 5B), and includes an image database 121a in place of the use state database 121 (refer to FIG. 5B). Furthermore, the information processing apparatus 100a includes a selecting unit 134a in place of the selecting unit 134 (refer to FIG. 5B).

The image acquiring unit 132a acquires an image capturing a state in a store from the imaging apparatus. Specifically, the image acquiring unit 132a acquires, for each of plural stores, an image capturing a state of a store from the imaging apparatus in each store. The image acquiring unit 132a stores the acquired image in the image database 121a. For example, the image acquiring unit 132a acquires an image of each of the stores in real time from each of the imaging apparatuses, and stores it in the image database 121a.

The image database 121a stores an image of a store transmitted from the imaging apparatus. FIG. 14 is a diagram illustrating an example of an image database 121a according to the second embodiment. In the example illustrated in FIG. 14, the image database 121a has items of "STORE ID", "IMAGE", and "IMAGING DATE AND TIME". For example, in FIG. 14, it is indicated that an imaging date and time of an image "IMAGE #3" of the store ID "STORE E1" is "2019/9/17:00 10:00".

The selecting unit 134a selects a store (candidate store) that is estimated to have seats for the number of people indicated in the use condition on the visiting date indicated in the use condition described above acquired from the user terminal 20, based on the image of the store and the reservation information of the store.

For example, the selecting unit 134a analyzes a real time image of a store that is acquired from the image acquiring unit 132a, and judges table availability of the store. The selecting unit 134a then selects a store that is estimated to have seats for the number of people indicated in the use condition at the date and time (for example, 10 minutes Later) indicated in the use condition described above, based on the table availability in the judged store, and the reservation information of the store acquired from the reservation-information acquiring unit 133.

For example, the selecting unit 134a considers a case in which the time and date indicated in the use condition is 10 minutes later, and the number of people is four. In this case, when it is judged that that seats for four people are available in the store from the analysis result of the real time image of the store, the selecting unit 134a refers to the reservation information of the store acquired by the reservation-information acquiring unit 133, and checks whether the seats for four people are still available in the store after 10 minutes. When it is confirmed that the seats for four people are still available in the store after 10 minutes, the selecting unit 134a estimates that the store can be used.

Processing Procedure

Figure 15:
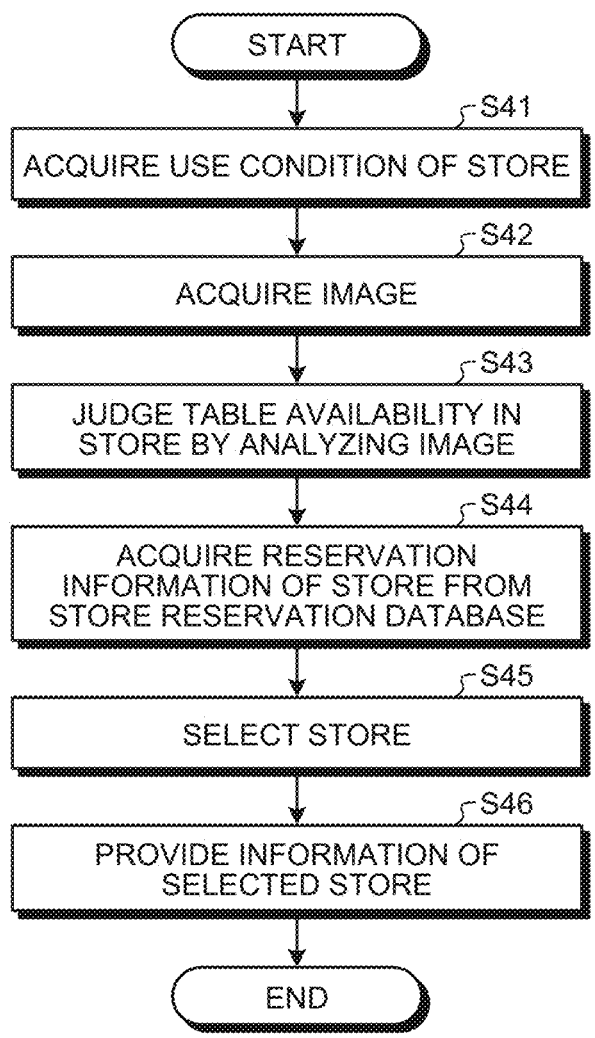
FIG. 15 is a flowchart illustrating an example of a procedure of information processing of an information processing apparatus according to the second embodiment.

Next, a procedure of information processing of the information processing apparatus 100a according to the second embodiment will be explained by using FIG. 15. FIG. 15 is a flowchart illustrating an example of a procedure of information processing of an information processing apparatus 100a according to the second embodiment.

Because processing at S41 in FIG. 15 is the same processing as that at S11 in FIG. 11, explanation thereof is omitted, and it is explained from S42 in FIG. 15. The image acquiring 132a of the information processing apparatus 100a acquires images of the respective stores from the respective imaging apparatuses (step S42 in FIG. 15). The image acquiring unit 132a then stores the acquired images of the respective stores in the image database 121a. Thereafter, the selecting unit 134a analyzes the images acquired at S42, and judges table availability in a store of the respective stores (step S43). Because processing at S44 to S46 is identical to that of S14 to S16 in FIG. 11, explanation thereof is omitted.

By thus processing, the information processing system S can select a store that matches a use condition input by a user of a store based on an image of each of stores captured by the imaging apparatus and on the store reservation database 31.

Modification

When the selecting units 134, 134a described above select a store, a store, a distance of which from the user terminal 20 of a transmission source of a use condition is within a predetermined value may be selected.

In this case, for example, the user terminal 20 transmits position information (for example, global positioning system (GPS) information) of the user terminal 20 also, when transmitting a use condition to the information processing apparatuses 100, 100a. When the selecting unit 134 of the information processing apparatus 100 selects a store, a store that satisfies the use condition described above, and the distance of which from the user terminal 20 is within the predetermined value is selected by using the position information the providing unit 135 transmit information about the selected store to the user terminal 20.

By thus processing, the user can acquire information of a store that satisfies the use condition described above, and that, at the same time, is relatively close from a place at which the user is present.

Moreover, the user terminal 20 may display a screen in which a position of a store that has been transmitted from the information processing apparatus 100 is mapped on a map. For example, the display unit 254 of the user terminal 20 displays a screen in which a current position of the user terminal 20 and a position of a store that has been transmitted from the information processing apparatus 100 are mapped on a map as illustrated in FIG. 13. By thus processing, the user can see a position of a store that satisfies the use condition described above, and that, at the same time, is relatively close from the place in which the user is present on the map. The user terminal 20 may display information of the store, or may perform reservation process for the store, or the like when an input of selection of a store on the map is accepted.

Furthermore, when the information processing apparatus 100 selects a store, selection may be made without using the use condition described above.

For example, the information processing apparatus 100 selects a store that is estimated to be usable from among stores, the distance of which from the user terminal 20 is within a predetermined value, based on the position information of the user terminal 20, real time images of stores, and reservation information of the stores. The information processing apparatus 100 then transmits information of the selected store to the user terminal 20. Thereafter, for example, the user terminal 20 displays the information of the store received from the information processing apparatus 100 on a screen (for example, on a map. Moreover, when a use condition is received from the user terminal 20 after transmitting the information of the selected store to the user terminal 20, the information processing apparatus 100 may select a store that satisfies the use condition described above from among the selected stores, and may transmit it to the user terminal 20.

By thus processing, the user can select a store, after seeing usable stores that are relatively close from a place in which the user is present.

Moreover, the selecting units 134, 134a select a store, a store may be selected by using position information specified by the user terminal 20. This position information may be included in use condition when the user terminal 20 transmits the use condition to the information processing apparatus 100, or may be transmitted separately from the use condition. Furthermore, the position information specified by using a name of a place (for example, Shinjuku, Shinbashi, or the like), or may be specified on a map.

Moreover, for example, when selecting a store, the selecting units 134, 134a may rank stores according to a matching degree with a use condition, and may output information of a store including the rank to the providing unit 135. In this case, the selecting units 134, 134a may give a higher rank to a predetermined store that is specified by a gourmet site or the like.

Although the reservation process of a store is performed by the information processing apparatuses 100, 100a in the respective embodiments described above, it is not limited thereto. For example, a reservation may be made by the user terminal 20 by making a phone call to a store, or by accessing the store reservation server 30. In this case, the reservation processing unit 136 in the information processing apparatuses 100, 100a is not necessary, and the reservation-information transmitting unit 255 in the user terminal 20 is not necessary, either.

Effect

As described above, the information processing apparatus 100 according to the present embodiment includes the use-condition acquiring unit 131, the analysis-result acquiring unit 132, the reservation-information acquiring unit. 133, and the selecting unit 134. The use-condition acquiring unit 131 acquires a use condition of a store including date and time of use of a store and the number of people. The analysis-result acquiring unit 132 acquires an image that is obtained by capturing a state in a store. The reservation-information acquiring unit 133 acquires reservation information of a store including a reservation date and time, and the number of people. The selecting unit 134 selects a store that is estimated to have seats for the number of people at the date and time of use indicated in the use condition, based on the acquired image of a store and the reservation information of the store.

Moreover, the selecting unit 134 judges table availability in the store by analyzing a real time image of the store, and selects a store that is estimated to have seats available for the number of people at the date and time indicated in the use condition, based on the judged table availability in the store, and the reservation information of the store.

Thus, the information processing apparatus 100 according to the present embodiment can select a store that is estimated to have seats available for the number of people at date and time indicated in a use condition. This enables to reduce time and effort for a user when finding a store.

Moreover, the use condition of a store further includes at least either one of a location, a type of cuisine, and a budget of a store. The selecting unit 134 selects a store that is estimated to have seats available for the number of people at date and time of use indicated in the use condition, and that, at the same time, satisfies at least either one of conditions of the location, the type of cuisine, and the budget at the time of use when selecting a store.

Thus, the information processing apparatus 100 according to the present embodiment can select a store, considering the location of a store, a type of cuisine, a budget at the time of use, and the like desired by a user Accordingly, the information processing apparatus 100 can select a store that suits preferences of a user.

The information processing apparatus 100 according to the present embodiment further includes the providing unit 135 that provides information of a store selected by the selecting unit 134.

Thus, the information processing apparatus 100 according to the present embodiment can provide the information of a selected store.

Moreover, the user terminal 20 according to the present embodiment includes the accepting unit 251, the transmitting unit 252, the receiving unit 253, and the display unit 254. The accepting unit 251 accepts an input of a use condition of a store including date and time of use of a store and the number people. The transmitting unit 252 transmits the use condition of a store to the information processing apparatus that selects a store estimated to have seats available for the number of people at date and the time of use indicated the use condition based on the image obtained by capturing a state in a store and the reservation information of the store. The receiving unit 253 receives information of a store selected by the information processing apparatus 100. The display unit 254 displays the received information of the store.

Thus, the user terminal 20 according to the present embodiment can display information of the store selected by the information processing apparatus 100.

Moreover, the user terminal 20 according to the present embodiment further includes the reservation-information transmitting unit 255 that transmits reservation information of a store that has been selected from the displayed information of a store.

Thus, the user terminal 20 according to the present embodiment can make a reservation for the store selected by the information processing apparatus 100.

Hardware Configuration

Figure 13:
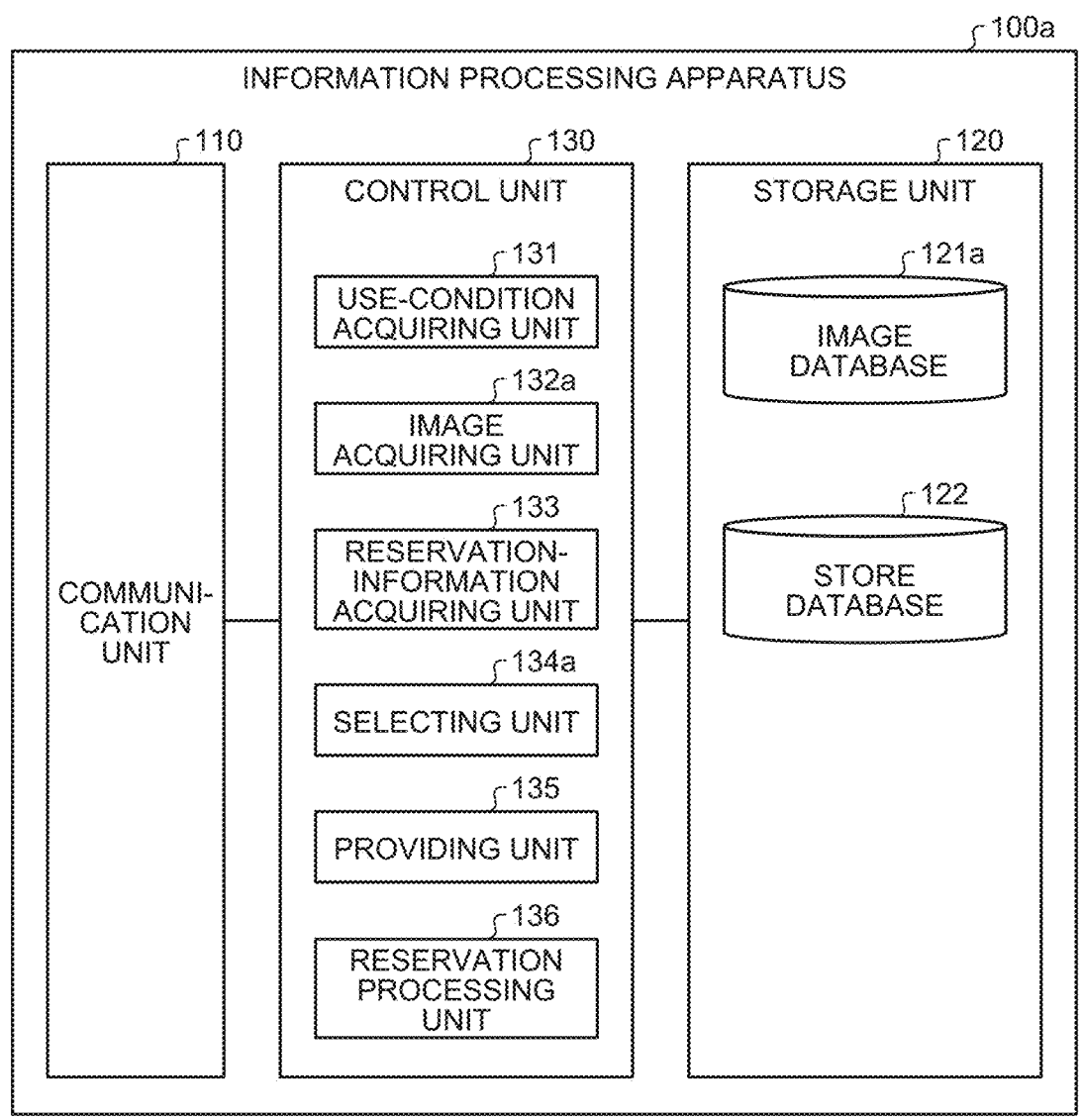
FIG. 13 is a diagram illustrating a configuration example of an information processing system according to a second embodiment.

The information processing apparatus, the user terminal, or the imaging apparatus according to the respective embodiments described above are implemented by, for example, a computer 1000 having a configuration as illustrated in FIG. 13. Hereinafter, the information processing apparatus 100 will be explained as an example. FIG. 13 is a hardware configuration diagram illustrating an example of a computer that implements the functions of the information processing apparatus 100. The computer 1000 includes a CPU 1100, a RAM 1200, a RUM 1300, an HDD 1400, a communication interface (I/F) 1500, an input/output interface (I/F) 1600, and a media interface (I/F) 1700.

The CPU 1100 operates based on a program stored in the ROM 1300 or the HDD 1400, and controls the respective components. The ROM 1300 stores a boot program that is executed by the CPU 1100 at the time of starting the computer 1000, a program dependent on hardware of the computer 1000, and the like.

The HDD 1400 stores a program that is executed by the CPU 1100, data that is used by the program, and the like. The communication interface 1500 receives data from other devices through a predetermined communication network to send to the CPU 1100, and transmits data generated by the CPU 1100 to other devices through a predetermined communication network.

The CPU 1100 controls an output device, such as a display and a printer, and an input device, such as a keyboard and a mouse, through the input/output interface 1600. The CPU 1100 acquires data from the input device through the input/output interface 1600. Moreover, the CPU 1100 outputs generated data to the output device through the input/output interface 1600.

The media interface 1700 reads a program or data stored in a recording medium 1800, and provides it to the CPU 1100 through the RAM 1200. The CPU 1100 loads the program on the RAM 1200 from the recording medium 1800 through the media interface 1700, to execute the loaded program. The recording medium 1800 is, for example, an optical recording medium, such as a digital versatile disc (DVD) and a phase change rewritable disk (PD), a magneto-optical recording medium, such as a magneto-optical disk (MO), a tape medium, a magnetic recording medium, a semiconductor memory, or the like.

For example, when the computer 1000 functions as the information processing apparatus 100 according to the embodiment, the CPU 1100 of the computer 1000 implements the function of the control unit 130 by executing a program loaded in the RAM 1200. The CPU 1100 of the computer 1000 executes these programs by reading from the recording medium 1800, but as another example, these programs may be acquired from other devices through a predetermined communication network.

Others

Moreover, out of the respective processing explained in the above embodiments and modifications, all or some of processing explained to be performed automatically can also be performed manually, or all or some o processing explained to be performed manually can also be performed automatically by a publicly-known method. Besides, the procedure of processing, the specific names, and the information including various kinds of data and parameters described in the above document or in the drawings can be arbitrarily changed, unless otherwise specified. For example, the respective information illustrated in the respective drawings is not limited to the information illustrated.

Furthermore, the respective components of the respective devices illustrated are of functional concept, and it is not necessarily required to be configured physically as illustrated. That is, specific forms of distribution and integration of the respective devices are not limited to the ones illustrated, and all or some thereof can be configured to be distributed or integrated functionally or physically in arbitrary units according to various kinds of loads, use conditions, and the like.

Moreover, the embodiments and the modifications described above can be arbitrarily combined within a range not causing a contradiction in the processing.

Some of embodiments of the present application have so far been explained in detail with reference to the drawings, but these are examples and the present invention can be implemented by other forms in which various modifications and improvements are made therein including modes described in a field of disclosure of the invention based on knowledge of those skilled in the art.

Furthermore, the term "section, module, unit" described above can be replaced with "means", "circuit", or the like. For example, the acquiring unit can be read as acquiring means or acquiring circuit.

In the respective embodiments described above, a customer attracting service in which a store estimated to be usable based on an image in which a state in a store is captured by an imaging apparatus and reservation information of the store, and information about the selected store is provided to a user has been explained. In addition, information processing to achieve a cycle of visiting a store in future by using the relevant customer attracting service by providing a predetermined incentive to a user that has actually visited a store using the customer attracting service may further be combined in a third embodiment below, this kind of information processing will be explained.

Third Embodiment

Overview of Information Processing

First, an overview of information processing performed by an information processing system according to the third embodiment will be explained with preconditions. For example, a customer attracting service (for example, a gourmet site, or the like) that supports store search by a user e by providing various kinds of information about stores is available. In such a customer attracting service, for example, it is aimed to attract customers effectively to a store by providing store information preferred by a user, or by combining a reservation service also, and the like, but it is not necessarily possible to create customers (customer creation) effectively only by these. Therefore, in the information processing system according to the third embodiment, such a cycle is implemented that a user that has actually visited a store through a predetermined customer attracting service is detected, and an incentive is provided to the user that has visited the store, to thereby encourage the user to a store by using this predetermined customer attracting service in future also. Thus, the information processing system according to the third embodiment is intended to achieve customer attracting service that is capable of attracting a customer and creating a customer effectively. One example of the information processing system according to the third embodiment will be explained by using FIG. 19 to FIG. 21.

Information Processing System

Before explanation of FIG. 19 to FIG. 21, the information processing system according to the third embodiment will be explained by using FIG. 22 first. FIG. 22 is a diagram illustrating a configuration example of an information processing system S1 according to the third embodiment. The information processing system S1 according to the third embodiment includes, as illustrated in FIG. 22, a terminal device T10, an external device 60, an information processing apparatus 100-1, and a payment device 200-1. The terminal device T10, the external device 60, the information processing apparatus 100-1, the payment device 200-1 are wiredly or wirelessly connected to be able to communicate with one another through a network N1.

The terminal device T10 is an information processing terminal used by a user. The terminal device T10 is, for example, a smartphone, a tablet terminal, a laptop personal computer (PC), a desktop PC, a mobile phone, a personal digital assistant (PDA), or the like. For example, the terminal device T10 transmits store visit information indicating that a user has visited a store presented by a predetermined customer attracting service to the information processing apparatus 100-1 according to an operation performed by the user.

The external device 60 is a server device that charges a fee to a store subject to be charged, according to charge processing performed with respect to the information processing apparatus 100-1. The fee will be described later.

The payment device 200-1 is a server device that corresponds to a predetermined payment service (hereinafter, denoted as "payment service KSV" as appropriate). The processing performed between the information processing apparatus 100-1 and the payment device 200-1 will be explained later by using FIG. 20.

The information processing apparatus 100-1 is a server device that performs information processing according to the third embodiment as described above. Specifically, when receiving the store visit information transmitted by the terminal device T10, the information processing apparatus 100-1 calculates the number of customers of a store corresponding to this store visit information based on the store visit information, and calculates a fee according to the calculated number of customers as a fee to be charged to this store. Moreover, the information processing apparatus 100-1 gives a reward for transmission of the store visit information to this user. Furthermore, the information processing apparatus 100-1 judges whether the user has visited the store based on a use status of the user with respect to the predetermined customer attracting service, and causes the terminal device T10 to perform predetermined control processing by transmitting a judgement result to the terminal device T10.

Moreover, in the following embodiment, a customer attracting service GSV is exemplified as one example of the predetermined customer attracting service. The customer attracting service GSV is a customer attracting service according to the third embodiment, and the information processing apparatus 100-1 is a server device supporting this customer attracting service GSV. Meanwhile, the server device supporting the customer attracting service GSV may be a server device other than the information processing apparatus 100-1 and the information processing apparatus 100-1 may be configured to cooperate with this server device, the former example is adopted for simplification of explanation in the present embodiment. Furthermore, a business owner that manages and operates the customer attracting service and a business owner that operates and manages the information processing apparatus 100-1 may be identical, or may be different.

About Terminal Program

The terminal device T10 described above acts according to a control of a terminal program according to the embodiment. The terminal program according to the embodiment is supposed to be an application corresponding to the customer attracting service GSV (hereinafter denoted as "app AP" as appropriate). Therefore, in the terminal device T10, the app AP is supposed to be installed in advance. Moreover, the terminal device T10 thus performs information processing according to the following embodiment according to a control of the app AP.

Specifically, the terminal device T10 transmits the store visit information indicating that a user of the own device has visited a store presented by the customer attracting service GSV to the information processing apparatus 100-1, according to an operation made by the user. For example, when it is judged that a user that has performed store search using the customer attracting service GSV visits either one of stores presented as a search result, the terminal device T10 transmits the store visit information indicating that the user has visited this store to the information processing apparatus 100-1. Moreover, for example, when it is judged that a user that has made a store reservation by using the customer attracting service GSV visits the reserved store, the terminal device T10 transmits the store visit information indicating that the user has visited this store to the information processing apparatus 100-1. As described, when it is judged that a user that has used the customer attracting service GSV has visited a store supported by the customer attracting service GSV, the terminal device T10 transmits the store visit information indicating that the user has visited this store to the information processing apparatus 100-1.

It will be explained in more detail. The information processing apparatus 100-1 judges whether a user has visited a store being a subject in the customer attracting service GSV, based on the use status of the user with respect to the customer attracting service GSV. For example, the information processing apparatus 100-1 judges whether indication of intension indicating a visit of the store being a subject in the customer attracting service GSV (check-in) has been made using the customer attracting service GSV, and judges that the user has visited the store when it is judged that the intention indication has been made. As one example, the information processing apparatus 100-1 judges whether the user has made an indication of intension indicating that the user has visited this store in this store based on the position information of the store being a subject in the customer attracting service GSV and the position information of the user. The information processing apparatus 100-1 responds to the terminal device T10 with a judgment result by performing store-visit judgement processing as described.

When it is judged that the user has visited the store, the terminal device T10 controls to be in a state enabling transmission such that the user can transmit the store visit information. For example, the terminal device T10 controls to be in a state enabling to read the store visit information from code information placed at the store according to the control of the app AP. For example, the terminal device T10 turns ON a camera function CM supporting the app AP according to a control of the app AP, and thereby turns into a state enabling the user to capture the code information by using the camera function.

Moreover, the terminal device T10 may control to enable mutual communication with a predetermined sensor (for example, a beacon) installed in the store according to a control of the app AP, and thereby transmit the store visit information dynamically, regardless of an operation of the user. For example, the terminal device T10 turns ON a near-field wireless communication function NFC according to a control of the app AP to enable mutual communication with a predetermined sensor. The terminal device T10 then transmits the store visit information acquired by the mutual communication to the information processing apparatus 100-1.

About Customer Attracting Service

Figure 18:
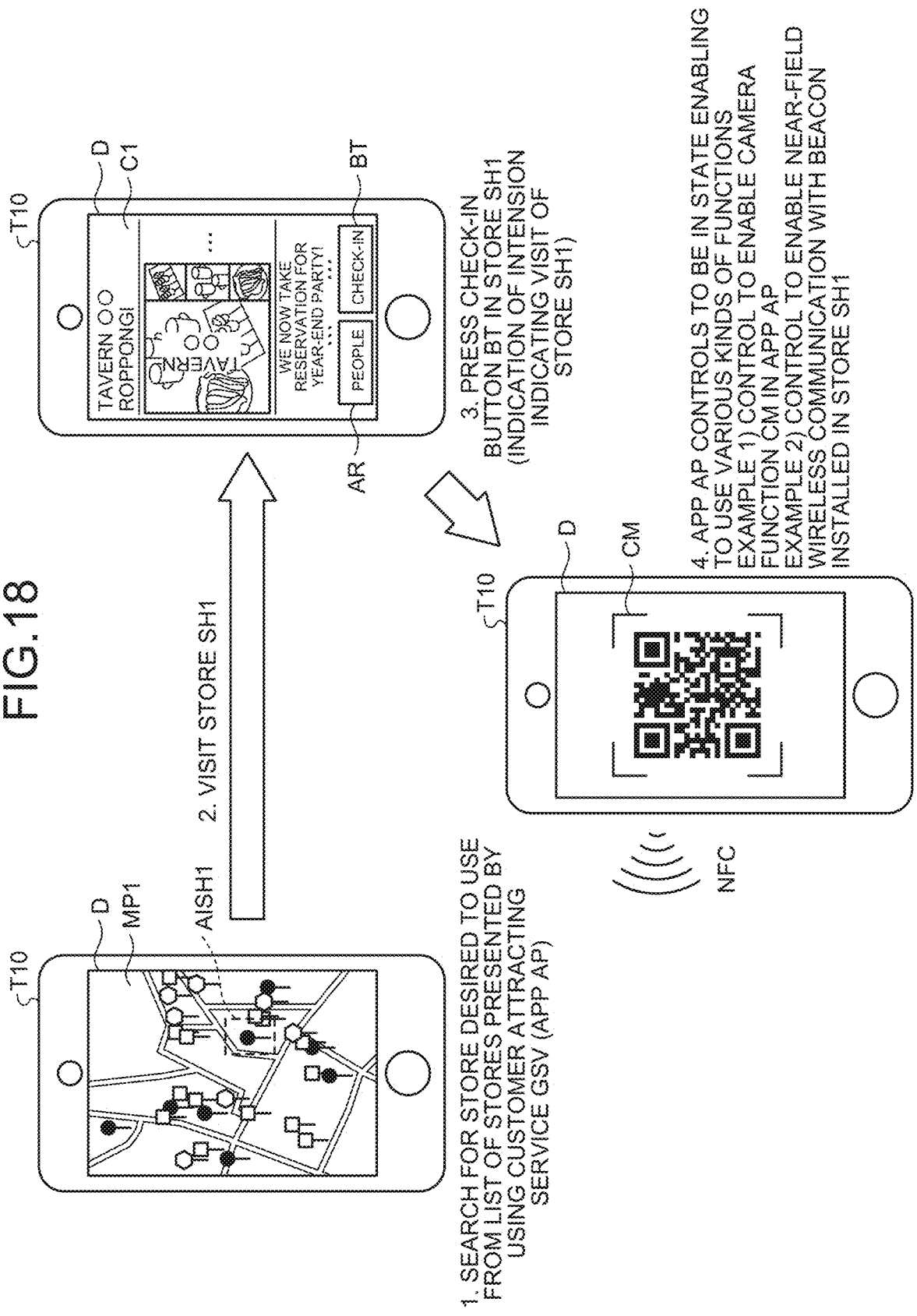
FIG. 18 is a diagram illustrating an example of customer attracting service according to a third embodiment.

Hereinafter, the customer attracting service GSV according to the third embodiment will be explained by using FIG. 18. FIG. 18 is a diagram illustrating an example of the customer attracting service GSV according to the third embodiment. The customer attracting service GSV is a service for supporting store search, and presents store information indicating a store according to information of a user (for example, position information of the user or search conditions input by the user) as a search result to the user. That is, the information processing apparatus 100-1 performs store search based on the information of a user (for example, position information of the user and search conditions input by the user), and causes the terminal device T10 of the user to display store information indicating a searched store as a search result.

For example, a store of a member of the customer attracting service GSV, an imaging apparatus (for example, a camera) that captures a state in the store is installed. The camera captures a state in the store in real time, and transmits the capture image acquired by capturing to the information processing apparatus 100-1 one by one. Thus, the information processing apparatus 100-1 searches for a store that is, for example, positioned near a current position of the user, and calculates the degree of crowdedness of the store based on the captured image transmitted from the imaging apparatus of the store, for each of searched stores. The information processing apparatus 100-1 then displays index marks indicating the crowdedness of the respective searched stores on map information near the user in a superimposed manner. For example, the information processing apparatus 100-1 displays the index marks colored according to the degree of crowdedness at a position corresponding to the address of the searched stores, which is at a position on the map information near the user. Thus, the user can grasp easily which store is not crowded and which store is crowded among stores present near the user and, therefore, can find a less-crowded store easily. Moreover, from these points, the customer attracting service GSV according to the embodiment can be regarded as a service that supports store search by providing the crowdedness of each store.

Note that the customer attracting service GSV according to the third embodiment is not limited to provide this type of service, but may provide, for example, store information indicating a store suitable for a search condition relating to a use purpose ("store for a second party", or the like). In such a case, the information processing apparatus 100-1 estimates information relating to a use purpose of the store based on the captured image of the store for each store. When a search condition relating to a use purpose is accepted from a user in such a state, the information processing apparatus 100-1 presents store information indicating a store for which a use purpose matching the accepted search condition has been estimated. Moreover, for example, the information processing apparatus 100-1 may select a store that is estimated to be usable on date and time indicated in a use condition based on the captured image of the store and the reservation information from among stores for which a use purpose matching the accepted search condition has been estimated, and may provide store information of the selected store to the user.

Furthermore, the customer attracting service GSV according to the third embodiment may combine a reservation service that accepts a reservation for an arbitrary store from among the presented store. Moreover, although the information processing apparatus 100-1 according to the third embodiment provides a service to a user by performing information processing corresponding to the customer attracting service GSV according to the above example, the processing may be performed by a server device other than the information processing apparatus 100-1.

Hereinafter, the customer attracting service GSV according to the third embodiment is supposed to be a service supporting store search by presenting the crowdedness per store, and one example of this case will be explained in detail by using FIG. 18. Moreover, in this example, a user U1-1 is to be one example of the user.

In the example of FIG. 18, the user U1-1 transmits a search condition (for example, "current position") to the information processing apparatus 100-1 corresponding to the customer attracting service GSV through the app AP. Moreover, as this is performed, on a display screen D of the terminal device T10 of the user U1-1, map information MP1 that is the map information around the current position of the user U1-1, and in which the index marks indicating the crowdedness of each of stores present around the current position of the user U1-1 are displayed in a superimposed manner is displayed. In other words, on the display screen D of the terminal device T10, the index marks indicating the crowdedness of the respective stores are listed to be displayed as the store information of the respective stores.

In such a state, the user U1-1 can find a store the user wishes to visit, for example, based on a distance from the current position of himself/herself and the crowdedness. For example, suppose that the user U1-1 selects an index mark AISH1 corresponding to a store SH1 for the reason that it is close and not crowded. In such a case, the information processing apparatus 100-1 presents a detail screen C1 in which detailed information of the store SH1 is indicated to the user U1-1, in response to selection of the index mark AISH1 corresponding to the store SH1.

Suppose that the user U1-1 actually visits the store SH1 because an interest in the store SH1 has increased after seeing the detail screen C1. If the user U1-1 wishes to receive a reward from the information processing apparatus 100-1 for visiting the store SH1, it is necessary to make an intention indication indicating that the user has visited the store SH1 by using the customer attracting service GSV. Specifically, when the user U1-1 wishes to receive a reward for visiting the store SH1 from the information processing apparatus 100-1, it is necessary to perform a check-in to the store SH1 by using the customer attracting service GSV. More specifically, the user U1-1 is needed to transmits check-in information indicating that the user has checked in the store SH1 to the information processing apparatus 100-1 by using customer attracting service GSV.

For example, the user U1-1 can transmit the check-in information to the information processing apparatus 100-1 by selecting the index mark AISH1 from the map information MP1, to make it transition to the detail screen C1, and by pressing a check-in button BT displayed in the detail screen C1, thereby virtually checking in the store SH1. In the example in FIG. 18, the user U1-1 is supposed to have checked in the store SH1 by pressing the check-in button BT.

Having received the check-in information, the information processing apparatus 100-1 performs store-visit judgement processing to judge whether the user U1-1 has visited the store SH1. Specifically, the information processing apparatus 100-1 judges whether the check-in button BT is pressed in a state in which the user U1-1 is visiting the store SH1. The information processing apparatus 100-1 then responds to the terminal device T10 of the user U1-1 with a judgement result from the store-visit judgement processing.

When it is judged that the user U1-1 has visited the store SH1 by the information processing apparatus 100-1, the terminal device T10 controls to be in a transmission-enabled state such that the user U1-1 can transmits the store visit information by using the own device. For example, the terminal device T10 controls to be in a state enabling to read the store visit information from code information placed in the store SH1 according to a control of the app AP. For example, the terminal device T10 turns ON the camera function CM supporting the app AP according to a control of the app AP, thereby turning into a state enabling the user U1-1 to image the code information by using the camera function CM.

Moreover, the terminal device T10 may control to be enable mutual communication with a predetermined sensor (for example, beacon) installed in the store SH1 according to a control of the app AP, and thereby transmit the store visit information dynamically regardless of an operation made by the user U1-1. For example, the terminal device 110 turns ON the near-field wireless communication function NFC according to a control of the app AP to perform the mutual communication with the predetermined sensor. The terminal device T10 transmits the store visit information acquired by the mutual communication to the information processing apparatus 100-1.

One Example of Information Processing According to Embodiment

Next, one example of the information processing according to the third embodiment will be explained by using FIG. 19. FIG. 19 is a diagram illustrating an example of the information processing according to the third embodiment. The information processing according to the third embodiment is performed by the information processing system S1 (from FIG. 22) that includes the terminal device T10 and the information processing apparatus 100-1. Moreover, in FIG. 19, the example in FIG. 18 is appropriately adopted. Specifically, in FIG. 19, similarly to the example in FIG. 18, suppose that the user U1-1 transmits a search condition (for example, a current position) to the information processing apparatus 100-1 by using the customer attracting service GSV (app AP), and thereby search for a store that the user wishes to use in a state in which the index marks indicating the crowdedness are listed to be displayed as the store information (*1). Moreover, suppose that the user U1-1 thinks he/she would like to use the store SH1 after a search operation (for example, operation of selecting an index mark at a position he/she is interested in, and of checking the detail screen of various stores), and visits the store SH1 (*2). Furthermore, suppose that the user U1-1 accesses the detail screen C1 again, wishing to receive a reward from the information processing apparatus 100-1 when visiting the store SH1, and presses the check-in button BT (*3). That is, it is supposed that the user U1-1 has made an intention indication indicating a visit of a store with respect to the information processing apparatus 100-1 by transmitting the check-in information to the information processing apparatus 100-1 by pressing the check-in button BT.

The user U1-1 may press the check-in button BT in a state in which the number of people that have visit the store in a number of people column AR included in the detail screen C1. For example, a group (For example, five or more people, or the like) including the user U1-1 visits the store, the reward can be received according to this number of people, but it is a trouble if each one belonging to the group needs to perform a check-in or imaging of the code information for this. To avoid such a situation, the information processing apparatus 100-1 has a system in which, when visiting in a group, if only one person (for example, the user U1-1) out of the group checks in for the input number of people, declaring the number of visiting people, it is regarded that check-in for the input number people is performed. In the example in FIG. 19, as a simple example, the user U1-1 presses the check-in button BT in a state in which "1" is input in the number of people column AR, and thereby transmits the check-in information to the information processing apparatus 100-1 to be regarded that the indication of intention of a visit of the store is performed with respect to the information processing apparatus 100-1.

In such an intention indication, when depression of the check-in button BT by the user U1-1 is detected, for example, the terminal device T10 transmits a store ID "SH1" identifying the store SH and a user ID "U1-1" identifying the user U1 to the information processing apparatus 100-1 (step S1901). The user ID transmitted herein is a user ID dedicated to the customer attracting service GSV issued by the customer attracting service GSV.

When receiving the check-in information (step S1902), the information processing apparatus 100-1 performs the store-visit judgement processing to judge whether the user U1-1 has visited the store SH1 (step S1903). For example, the information processing apparatus 100-1 judges whether the user U1-1 has visited the store SH1 based on the use status of the user U1-1 with respect to the customer attracting service GSV. As a simple example, the information processing apparatus 100-1 may judge whether the user U1-1 has visited the store SH1 based on whether an intention indication indicating a visit of the store SH1 by the user U1-1 is detected by receiving the check-in information corresponding to the user U1-1. For example, the information processing apparatus 100-1 judges that the user U1-1 has visited the store when an intention indication indicating a visit of the store SH1 by the user U1-1 is detected, by receiving the check-in information corresponding to the user U1-1.

Furthermore, the information processing apparatus 100-1 may combine the position information of the user U1-1 to improve the accuracy of store-visit judgement processing.

For example, the information processing apparatus 100-1 judges whether the user U1-1 has visited the store SH1 by judging whether the user U1-1 has made the intention indication of indicating a visit of the store SH1 in a state in which the user U1-1 is visiting the store SH1 by matching the position information of the store SH1 and the position information of the user U1-1. For example, the information processing apparatus 100-1 judges that the intention indication indicating a visit of the store SH1 has been made in a state in which the user U1-1 is visiting the store SH1 when the position information of the store SH1 and the position information of the user U1-1 match. That is, the information processing apparatus 100-1 judges that the user U1-1 has visited the store SH1. Moreover, to perform this store-visit judgement processing, for example, the terminal device T10 may transmit check-in information further including position information derived from the GPS at step S11.

Moreover, although the store-visit judgement processing is performed by the information processing apparatus 100-1 in the present embodiment, it may be performed by the terminal device T10. For example, when it detected that the check-in button BT included in the detail screen C1 is pressed, the terminal device T10 may judge that the user U1-1 has visited the store SH1. Moreover, when it is detected that the check-in button BT included in the detail screen C1 is pressed, the terminal device T10 may judge whether the user U1-1 has visited the store SH1 by matching the position information of the store SH1 and the position information of the user U1-1.

Returning back to explanation of FIG. 2, the information processing apparatus 100-1 responds to the terminal device T10 with a judgement result from the store-visit judgement processing (step S1904). Accordingly, the terminal device T10 receives the judgement result (step S1905), and controls the own device to be in a state enabling transmission of the store visit information indicating that the user U1-1 has visited the store SH1 according to the judgement result (step S1906). In FIG. 19, suppose that the information processing apparatus 100-1 judges that the user U1-1 has visited the store SH1. Accordingly, a transmission control unit T15d (FIG. 23) that is implemented by running the app AP in the terminal device T10 controls to bring into a state enabling transmission so that the user U1-1 can transmit the store visit information indicating a visit of the store SH1 to the information processing apparatus 100-1 by using the terminal device T10. For example, the transmission control unit T15d brings into a state enabling the user U1-1 to image of the code information placed in the store SH1 by using the camera function CM, by turning ON the camera function CM supporting the app AP. For example, the transmission control unit T15d brings into a state enabling the user U1-1 to image the code information by automatically starting the camera function CM corresponding to the app AP.

The code information herein may be a QR code (registered trademark), or may be a barcode. In the example in FIG. 19, the code information is a QR code. Moreover, in the example in FIG. 19, the QR code place in the store SH1 is a QR code QR1. The QR code QR1 is code information supporting the customer attracting service GSV (dedicated to the customer attracting service GSV).

Figure 16:
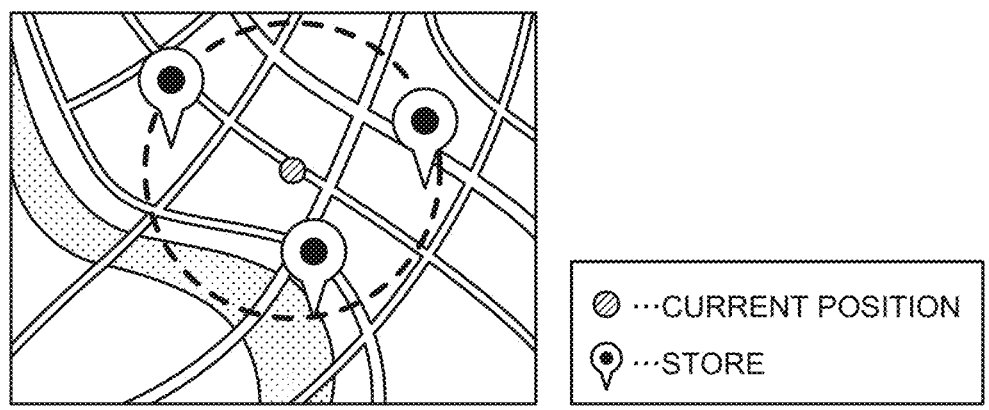
FIG. 16 is a diagram illustrating an example of a display screen in the user terminal according to the respective embodiments.
Figure 17:
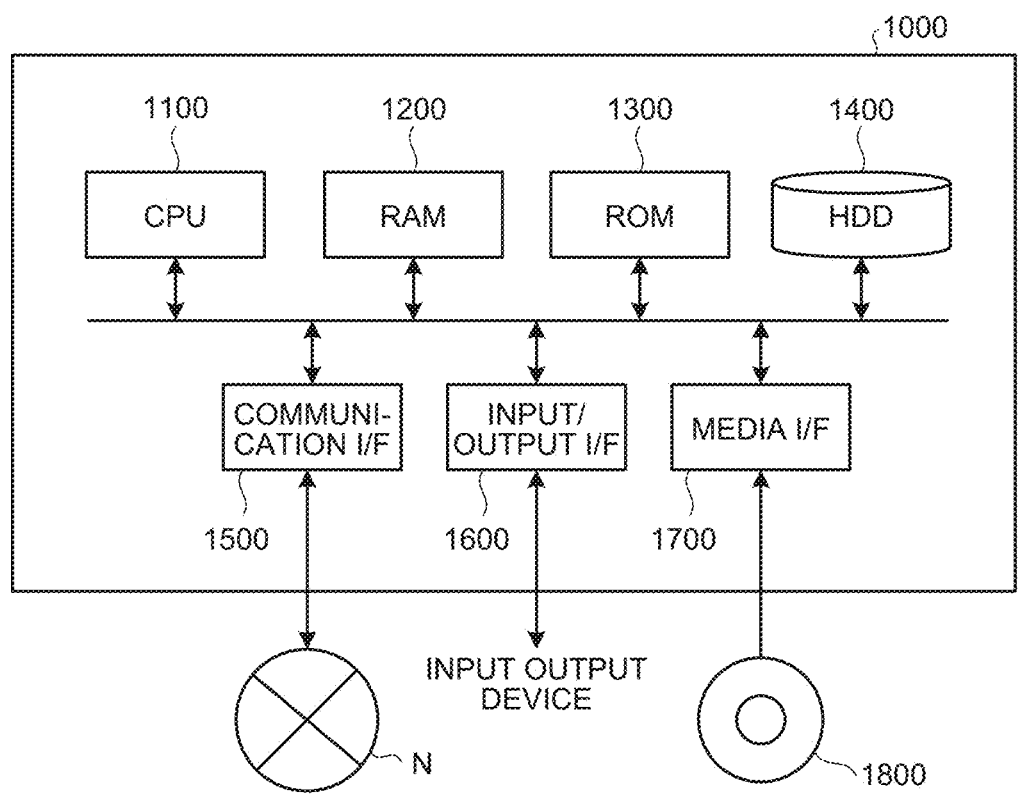
FIG. 17 is a hardware configuration diagram illustrating an example of a computer that implements functions of the information processing apparatus.

Furthermore, in such a state, the user U1-1 captures the QR code QR1 by using the camera function CM. Having detected the QR code QR1, the terminal device T10 reads the store visit information from the QR code Q1 (step S1907). The store visit information includes the store ID "SH1" identifying the store SH1. Therefore, the terminal device T10 transmits the store visit information including the store ID "SH1" identifying the store SH1, the user ID "U1-1" identifying the user U1-1 in the customer attracting service GSV, and the number of people visiting the store "1", to the information processing apparatus 100-1 (step S1908). For example, a second transmitting unit 15e (FIG. 16) that is implemented by running the app AP in the information processing apparatus 100-1 transmits the store visit information including the store ID "SH1" identifying the store SH1, the user ID "U1-1", and the number of people visiting the store "1" to the information processing apparatus 100.

The transmission control unit T15d may be configured to control to enable mutual communication with a predetermined sensor (for example, a beacon) installed in the store SH1, at step S1906, and thereby control the store visit information to be dynamically transmitted regardless of an operation by the user U1-1. For example, the transmission control unit T15d implements the mutual communication with the predetermined sensor by turning ON the near-field wireless communication function DEC. When it is thus controlled, the second transmitting unit T15e acquires the store visit information by the mutual communication, and transmits the acquired store visit information to the information processing apparatus 100-1. When the configuration in which the store visit information is automatically transmitted is adopted as described, it is preferable to be configured to disable input of the number of people visiting a store in the detail screen or the like because the store visit information is automatically transmitted by the terminal device T10 of each user.

When the store visit information is received (step S1909), the information processing apparatus 100-1 adds the number of customer of this visit to the "NUMBER OF VISITING CUSTOMERS" corresponding to the store SH1 (STORE ID "SH1") a store-information storage unit (step S1910).

Figure 24:
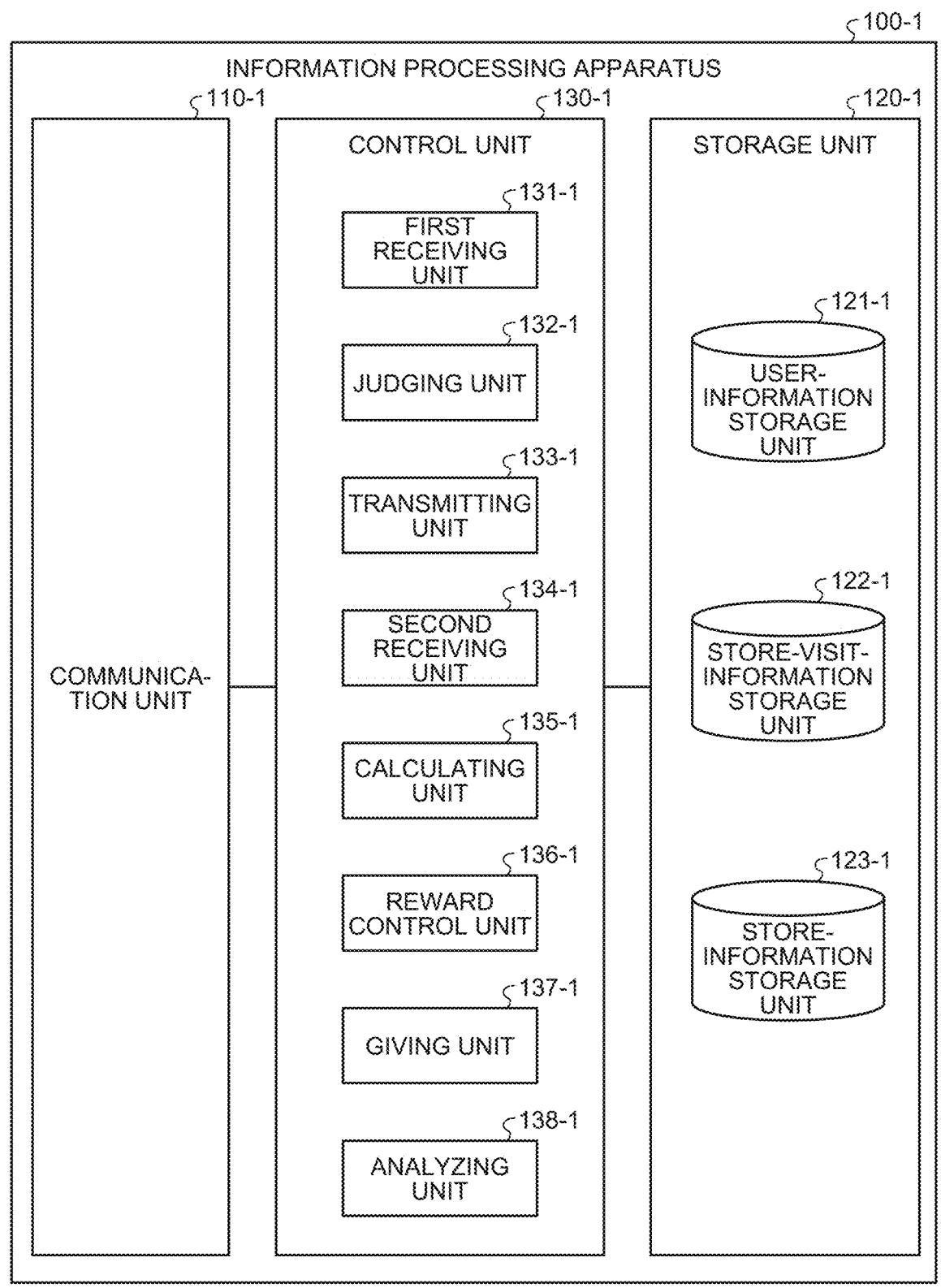
FIG. 24 is a diagram illustrating a configuration example of an information processing apparatus according to the third embodiment.

Next, the information processing apparatus 100-1 performs reward control processing to control a reward to be given to the user U1-1 (step S1911). Specifically, the information processing apparatus 100-1 performs the reward control processing to control a reward to be given to the user U1-1 because the store visit information is transmitted according to an operation by the user U1-1. The reward control processing is performed by, for example, a reward control unit 136-1 (FIG. 24).

For example, the information processing apparatus 100-1 performs the reward control processing to decide a reward to be given what kind of reward is to be given to the user U1-1. For example, the information processing apparatus 100-1 decides a reward according to the number of people visiting the store. When the reward is a coupon, the information processing apparatus 100-1 decides a coupon to be given to a coupon of a higher discount rate as the number of visiting people increases. Moreover, when the reward is a point, the information processing apparatus 100-1 decides a point to be given to a higher point relative to a basic point as the number of visiting people increases. In the example in FIG. 19, the information processing apparatus 100-1 decides the reward as described above based on the number of people "1" included in the store visit information. Furthermore, the information processing apparatus 100-1 may decide a reward to be given to a reward only usable in the store SH1.

Next, the information processing apparatus 100-1 gives the reward decided by the reward control processing to the user U1-1 (step 1912). Specifically, the information processing apparatus 100-1 transmits the reward decided by the reward control processing to the terminal device T10 of the user U1-1. For example, when the reward is a coupon, the information processing apparatus 100-1 transmits this coupon to the terminal device T10. Thus, the terminal device T10 acquires the reward from the information processing apparatus 100-1 (step S1913).

Furthermore, the information processing apparatus 100-1 may enter reward information indicating the reward decided by the reward control processing in "REWARD INFORMATION" corresponding to the user U1 (USER ID "U1-1") in a store-visit information storage unit 122-1 so that the user U1 can acquire the coupon from the information processing apparatus 100-1 in arbitrary timing, for example, through the customer attracting service GSV. From this point of view, the processing of giving a reward includes a concept of transmitting a reward to the terminal device T10 and a concept of entering a reward in a storage unit.

Figure 19:
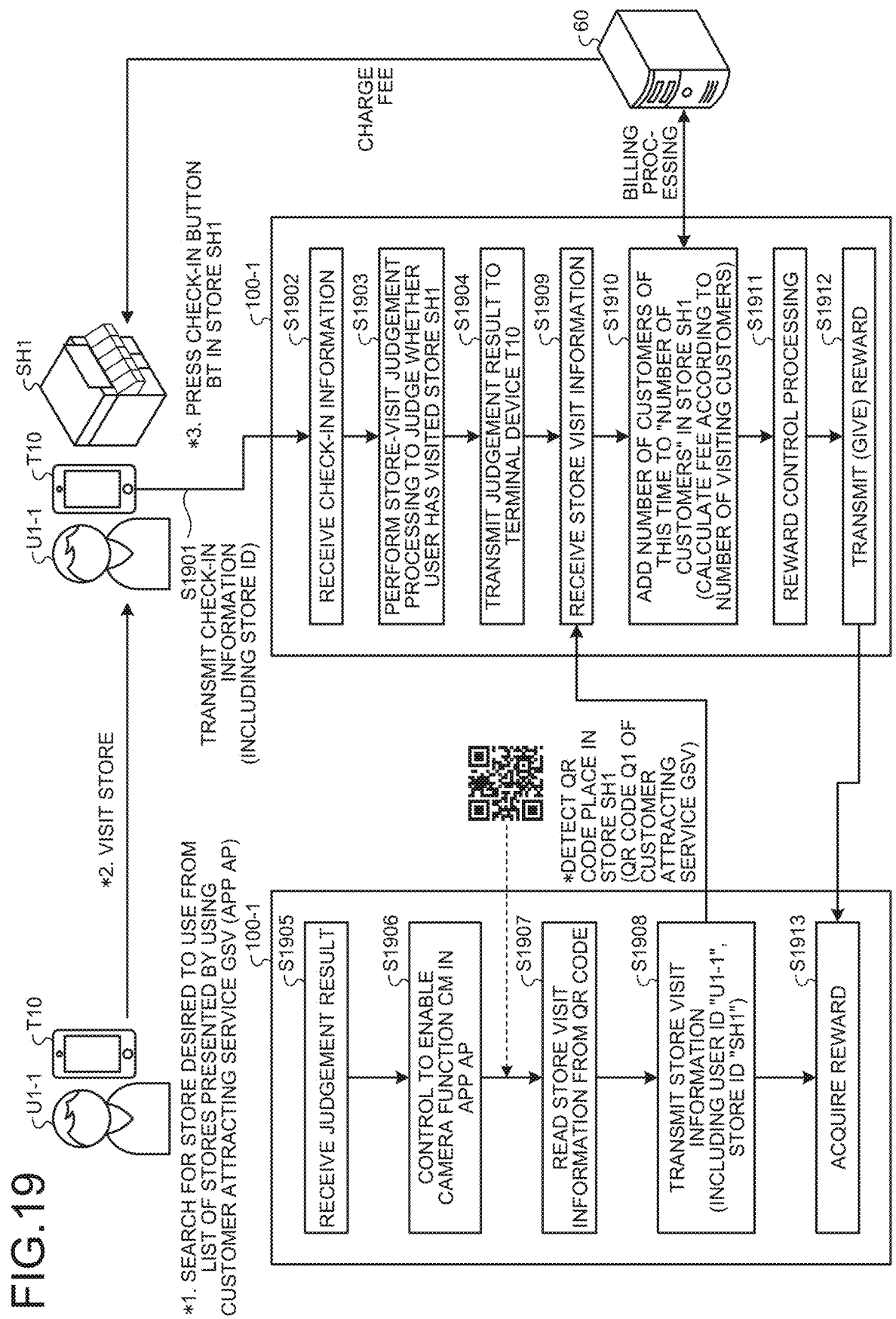
FIG. 19 is a diagram illustrating an example of information processing according to the third embodiment.

Moreover, in the example in FIG. 19, the information processing apparatus 100-1 calculates a fee to be charged to the store SH1, which is a fee according to the "NUMBER OF VISITING CUSTOMERS" of the store SH1. For example, the information processing apparatus 100-1 calculates the fee to be charged to the store SH1 based on the "NUMBER OF VISITING CUSTOMERS" in a predetermined period (for example, the last one month) out of the "NUMBER OF VISITING CUSTOMERS" corresponding to the store SH1 (STORE ID "SH1") in the store-information storage unit 123-1. Because there is a possibility for the store SH1 to attract more people by the effect of the customer attracting service GSV, the information processing apparatus 100-1 calculates the fee to be charged to the store SH1.

For example, the information processing apparatus 100-1 calculates the fee to be charged to the store SH1 by multiplying the number of customers by a predetermined amount (for example, 100 yen). Moreover, for example, receiving a payment of the fee from the store SH1, a business owner of the information processing apparatus 100-1 uses at least a part of this fee as a source of the reward to be given to a user. From this point of view, the information processing apparatus 100-1 calculates a fee, a part of which is to be a source of a reward to be given to a user, as the fee.

Furthermore, the information processing apparatus 100-1 performs billing process with the external device 60. For example, the information processing apparatus 100-1 controls the external device 60 to charge the store SH1 for the fee calculated for the store SH1. The external device 60 charges the fee to the store SH1 in accordance with the control by the information processing apparatus 100-1.

As explained so far with FIG. 19, the information processing system S1 according to the third embodiment includes the terminal device T10 used by a user, and the information processing apparatus 100-1. In the information processing system S1, the terminal device T10 transmits the store visit information indicating that a user has visited a store presented by the customer attracting service GSV, to the information processing apparatus 100-1. For example, the terminal device T10 controls to enable the user to receive a reward from the information processing apparatus 100-1 when it is judged that the user that has checked in has surely entered the store supported by the customer attracting service GSV, according to a check-in performed by using the customer attracting service GSV. For example, the terminal device T10 activates various kinds of functions in the own device so that the user can transmit the store visit information.

Having received the store visit information, the information processing apparatus 100-1 calculates a fee according to the number or visiting customers, which is the number or customers based on the store visit information, as a fee to be charged to the store. Moreover, the information processing apparatus 100-1 adds the reward to the user for transmission of the store visit information by the user.

According to the information processing system S1 as described above, because a reward for performing a check-in is given to a user that has actually visited a store through the customer attracting service GSV among users that perform a specific operation (for example, denoted as check-in), it is possible to effectively enhance the motivation for performing the check-in for the first thing after entering a store. Furthermore, because the information processing system S1 can acquire more store visit information according to the check-in as a user performs check-in more and mere, it can charge a higher amount of fee to stores. Because the fee is to be a source of rewards, the information processing system S1 can expand contents of rewards if it becomes possible to charge a more amount of fee to stores. As a result, the information processing system S1 can achieve a cycle of having customers to visit a store by using the customer attracting service GSV and, therefore, can implement a service effectively attracting customers and creating customers. Moreover, from this point of view, the information processing system S1 can implement a useful service for both users and stores.

Variations of Information Processing According to Third Embodiment

The information processing system S1 according to the third embodiment may be implemented by various different forms other than the third embodiment. Accordingly, other embodiments of the information processing system S1 will be explained in the following.

Variation 1. Cooperation with Payment Service

In the above embodiment, an example in which the information processing apparatus 100-1 gives a reward that can be acquired through the app AP supporting the customer attracting service GSV by receiving the store visit information read from a QR code (the QR code QR1 in the example in FIG. 19) for the customer attracting service GSV has been described. However, the information processing apparatus 100-1 may give a reward usable for a predetermined payment service to a user as a reward for transmission of store visit information when the store visit information read from the code information supporting the predetermined payment service, which is a service different from the customer attracting service GSV, is transmitted by the terminal device T10.

This point will be explained by using FIG. 20. FIG. 20 is a diagram illustrating an example (1) of a modification according to the third embodiment. In the example in FIG.

20, a payment service KSV is considered as one example of a predetermined payment service. Moreover, the payment device 200-1 is a server device corresponding to the payment service KSV. Furthermore, as a variation of the information processing according to the third embodiment, a variation of the reward control processing explained at step S1911 in FIG. 3 will be explained. Moreover, the reward control processing explained in FIG. 20 is performed by, for example, the reward control unit 136-1 (FIG. 24).

Figure 20:
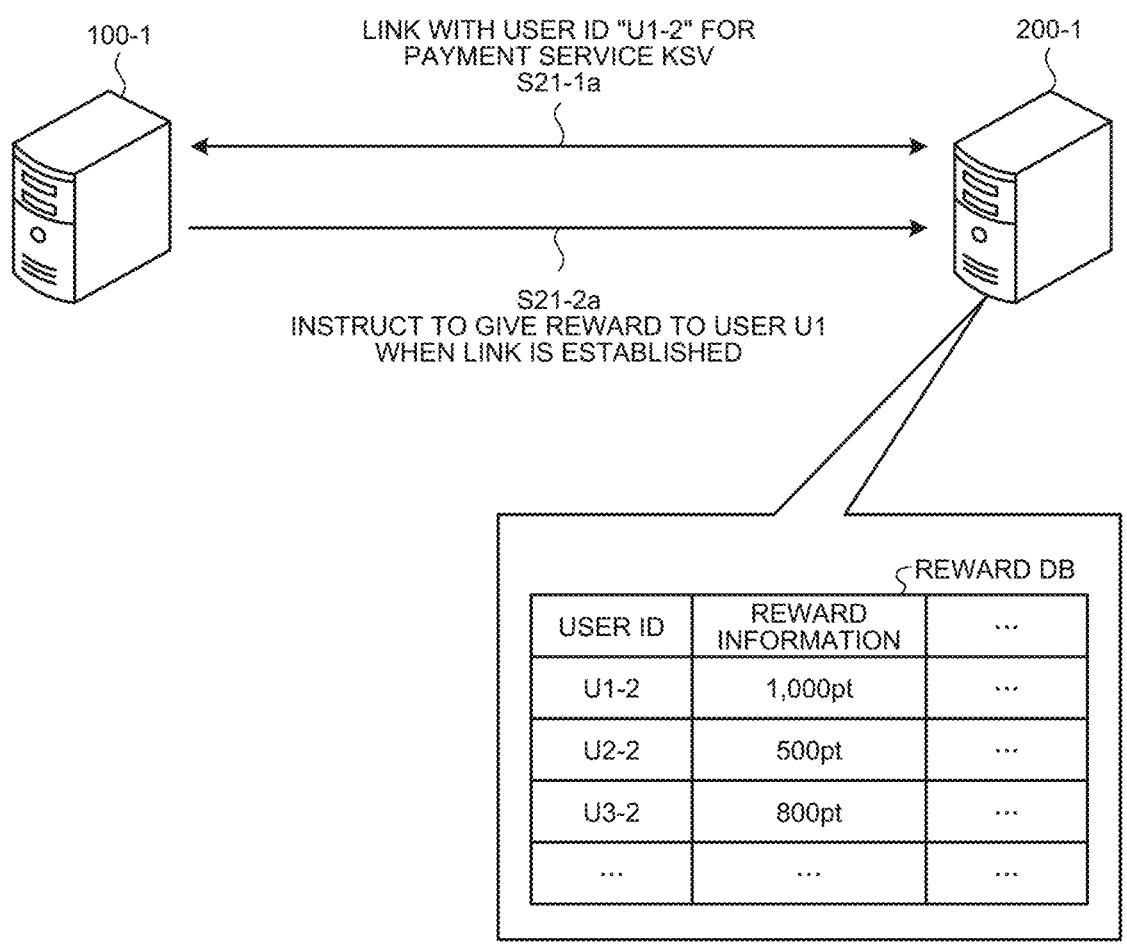
FIG. 20 is a diagram illustrating an example (1) of a modification according to the third embodiment.

Furthermore, in the example in FIG. 20, it is supposed that the user U1-1 has captured a QR code QR2 as code information corresponding to the payment service KSV (dedicated to the payment service KSV) as the camera function CM has been activated at step S1906 in FIG. 19. When the QR code QR2 is detected, the terminal device T10 reads the store visit information from the QR code Q2. The relevant store visit information also includes the store ID "SH1" identifying the store SH1. Therefore, the terminal device T10 transmits store information including the store ID "SH1" identifying the store SH1, a user ID "U1-2" identifying the user U1-1 in the payment service GSV, and the number of visiting people "1" to the information processing apparatus 100-1.

In such a state, when the store visit information is received, the information processing apparatus 100-1 performs the reward control processing according to the payment service KSV as the user ID "U1-2" supporting the payment service KSV is included in the store visit information. For example, the information processing apparatus 100-1 performs linkage with the payment device 200-1 using the user ID for the payment service KSV "U1-2" (step S21-1a). As illustrate in FIG. 20, the payment device 200-1 has a reward DB storing "USER ID" to identify a user that uses the payment service KSV, and "REWARD INFORMATION" that can be used by the user identified by "USER ID" only in the payment service KSV in an associated manner.

The payment device 200-1 performs matching between the user ID "U1-2" and "USER ID" entered in the reward DR in response to an access (linkage request) from the information processing apparatus 100-1 including the user ID "U1-2" supporting the payment service KSV. The payment device 200-1 establishes linkage according to a result of matching. For example, the payment device 200-1 establishes linkage with the information processing apparatus 100-1 when it is judged that there is an entry of the user ID "U1-2" in the reward DB by matching.

The information processing apparatus 100-1 decides a reward to be given to what kind of reward is to be given to the user U1 when the linkage with the payment device 200-1 is established, and instructs the payment device 200-1 to give the decided reward (step S21-2a). Suppose that the information processing apparatus 100-1 decides an electric money point usable in the payment service KSV to "500 pt". The information processing apparatus 100-1 then instructs the payment device 200-1 to give "500 pt" to the user U1-1. In such a case, the payment device 200-1 enters "500 pt" in "REWARD INFORMATION" corresponding to the user ID "U1-2" identifying the user U1-1 in the payment service KSV, in the reward DB.

Thus, the information processing system S1 can give a reward that redeemable in the payment service that a user is using and, therefore, can give a reward convenient for the user. Moreover, as a result, the information processing apparatus 100-1 can effectively motivate a user to perform the check-in and, therefore, can implement a service effectively attracting customers and creating customers.

Variation 2. Control Reward Winning Rate

In the above embodiment, an example in which the information processing apparatus 100-1 performs the reward control processing to decide a reward to be given in the information processing system S1 has been explained. However, the information processing apparatus 100-1 may control a winning rate of a reward. Specifically, the information processing apparatus 100-1 calculates the number or visit to a store by a user based on the store visit information, and controls a winning rate or a reward for the user based on the calculated number of visit. The information processing apparatus 100-1 performs drawing at the controlled rate, and gives a reward to the user when the user wins the reward. This point will be explained by using FIG. 21. FIG. 21 is a diagram illustrating an example of the modification according to the third embodiment.

Figure 21:
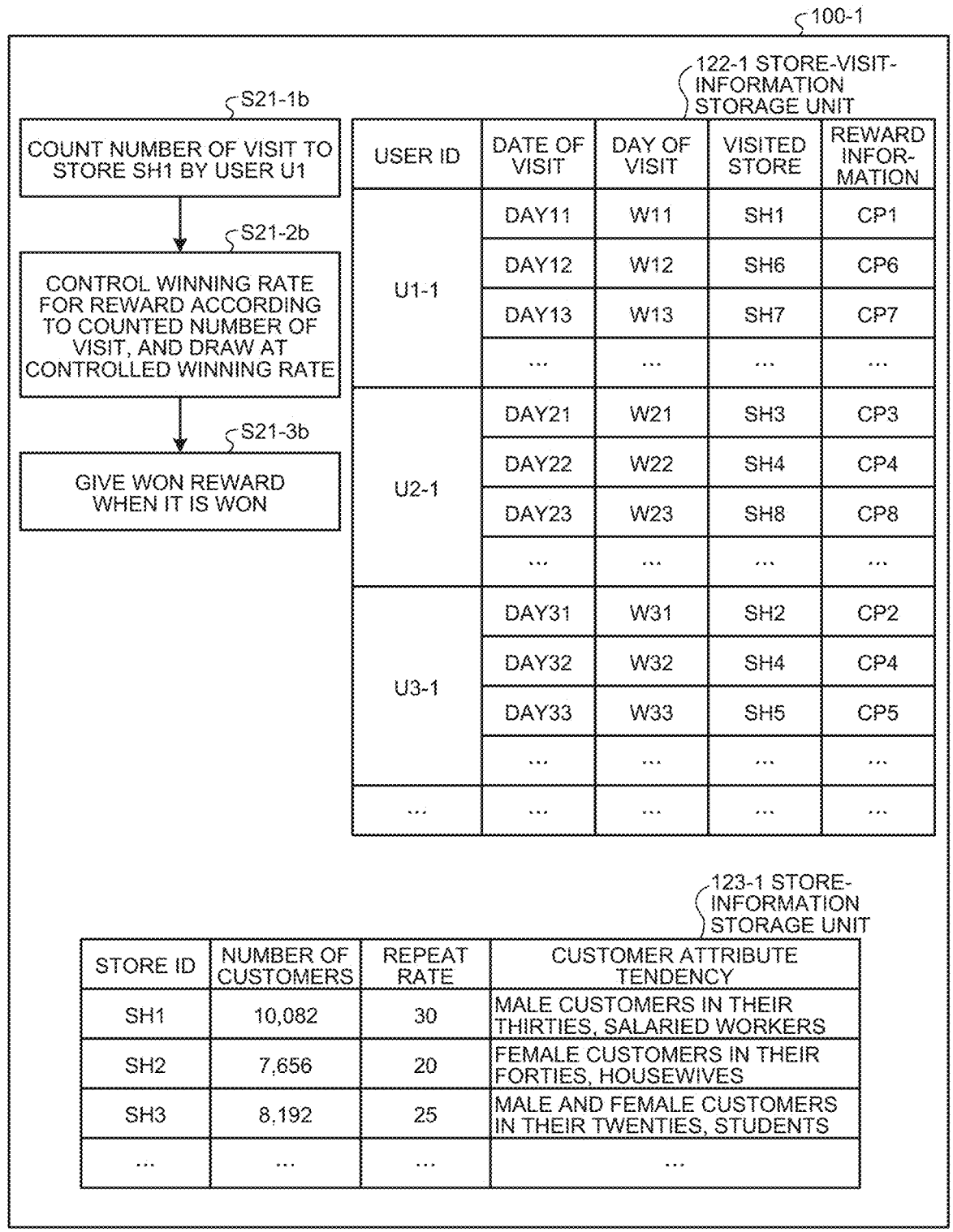
FIG. 21 is a diagram illustrating an example (2) of the modification according to the third embodiment.
Figure 22:
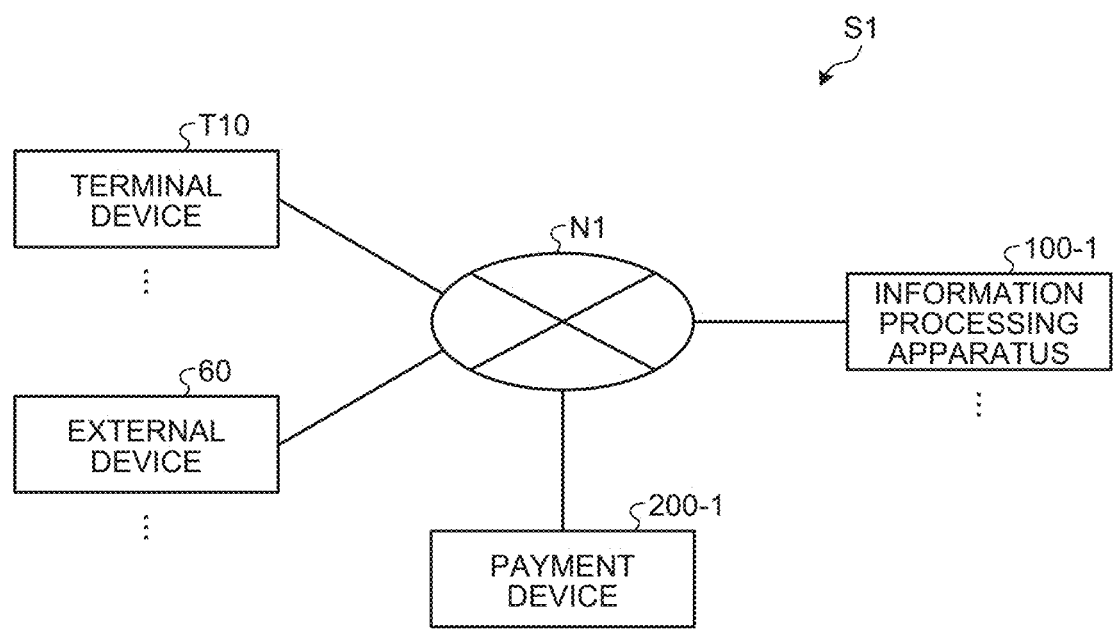
FIG. 22 is a diagram illustrating a configuration example of an information processing system according to the third embodiment.

Moreover, FIG. 21 is to explain a variation of the reward control processing explained at step S1911 in FIG. 19, as a variation of the information processing according to the third embodiment. Furthermore, the reward control processing explained in FIG. 21 is performed by, for example, the reward control unit 136-1 (FIG. 24).

First, the information processing apparatus 100-1 enters information indicating when and which store is visited by which user in the store-visit information storage unit 122-1 each time the store visit information is received from the terminal device T10 of a user. FIG. 21 illustrates an example of the store-visit information storage unit 122-1. In the example of FIG. 21, the store-visit information storage unit 122-1 has items of "USER ID", "DATE OF VISIT", "VISITED STORE", and "REWARD INFORMATION".

The "USER ID" indicates identification information to identify a user that uses the terminal device T10 that has transmitted the store visit information. Moreover, the "USER ID" is identification information supporting the customer attracting service GSV (dedicated to the customer attracting service GSV). Therefore, the user ID to identify the user U1 illustrated in FIG. 19 corresponds to the user ID "U1-1" in the example of the store-visit information storage unit 122-1 illustrated in FIG. 21. The "DATE OF VISIT" indicates a date on which the user identified by the "USER ID" visited the "VISITED STORE". In the example in the store-visit information storage unit 122-1 illustrated in FIG. 21, a conceptual symbol is used for "DATE OF VISIT", but a proper date is entered actually.

The "VISITED STORE" indicates identification information (store ID) to identify a store visited by the user identified by the "USER ID" on the "DATE OF VISIT". The "REWARD INFORMATION" indicates reward information indicating a reward determined to the user identified by the "USER ID".

That is, in the example of the store-visit information storage unit 122-1 illustrated in FIG. 21, an example in which the user identified by the user ID "U1-1" visited the store "SH1" on a date of visit "DAY11" is indicated. Moreover, in the example of the store-visit information storage unit 122-1 illustrated in FIG. 21, an example in which a reward indicated by reward information "CP1" is given to the user identified by the user ID "U1-1" is indicated.

In such a state, when receiving the store visit information from the terminal device T10 of the user U1-1 (step S1909), the information processing apparatus 100-1 counts the number of visit to the store (store SH2) identified by the store ID "SH1" by the user identified by the user ID "U1-1" because the store ID "SH1" and the user ID "U1-1" are included in the store visit information (step S21-1b). Specifically, the information processing apparatus 100-1 refers to the store-visit information storage unit 122-1, and counts the number of times the use U1-1 has visited the store SH1. For example, the information processing apparatus 100-1 counts the number of times the user U1-1 visited the store SH1 in a predetermined period (for example, the month including a date of reception of the store visit information).

The information processing apparatus 100-1 controls the winning rate of a reward according to the counted number of visits, and performs drawing at the controlled winning rate (step S21-2b). For example, the information processing apparatus 100-1 decides a reward to be given to the user U1-1, and controls the winning rate of the decided reward to be given. The information processing apparatus 100-1 controls the winning rate of the reward to be given, and performs drawing at the controlled winning rate. For example, the information processing apparatus 100-1 sets a higher winning rate relative to a basic winning rate as the number of visits increases, and performs drawing for a reward to be given at this set winning rate.

When a reward is won as a result of the drawing, the information processing apparatus 100-1 gives the won reward to the user U1-1 (step S21-3b). Note that when the result of drawing comes out be lost, the information processing apparatus 100-1 may determine a reward of a lower rank than the reward at the time of win, to the reward to be given, and may give this reward. For example, when the reward at the time of win is "500 discount coupon", the information processing apparatus 100-1 decides to "100 yen discount coupon" to the reward to be given when the drawing is lost, and thereby controls to give a reward in any case even though the rank is low.

Thus, the information processing system S1 can effectively motivate a user to visit a store again. Moreover, the store-visit information storage unit 122-1 may store "DAY OF VISIT" in addition to information of "DATE OF VISIT" as illustrated in FIG. 21. In this case, the store-visit information storage unit 122-1 stores a day of visit when the store visit information is received from the terminal device T10 of each user. When a user that has a tendency to visit a store on Saturdays or Sundays can be identified from the "DAY OF VISIT", for example, the information processing apparatus 100-1 may give a reward that can be used on a weekday (for example, Monday) on which customer visit less than Saturday and Sunday to this user, to stimulate creation of customers on a weekday (for example, Monday). Furthermore, when a user that has a tendency of visiting a store on a weekday other than Saturday and Sunday is identified, information processing apparatus 100-1 may maintain customer creation on weekdays by giving a preferential reward to this user than a user having a tendency of visiting on Saturday or Sunday.

Variation 3. Use in Marketing

Moreover, the information processing apparatus 100-1 may perform a marketing analysis based on the store visit information, and may register an analysis result as marketing data. For example, the information processing apparatus 100-1 counts the "number of visiting customers" to the store based on the store visit information of the store for each store. Moreover, the information processing apparatus 100-1 counts the "number of visit" so far for each of users that have visited a store. The information processing apparatus 100-1 calculates a repeat rate based on the "number of visiting customers" and the "number of visit". Furthermore, information processing apparatus 100-1 may analyze a "customer attribute tendency" indicating what kind of attribute tendency a customer has, based on the store visit information and attribute information of a user that is a transmission source of the store visit information.

Moreover, the information processing apparatus 100-1 enters an analysis result obtained by the marketing analysis as described above in the store-information storage unit 123-1. FIG. 21 illustrates an example of the store-information storage unit 123-1. In the example in FIG. 21, the store-information storage unit 123-1 has items of "TORE ID" "NUMBER OF VISITING CUSTOMERS", "REPEAT RATE", AND "CUSTOMER ATTRIBUTE TENDENCY".

The "STORE ID" indicates identification information to identify a store that is supported by the customer attracting service GSV. The "NUMBER OF VISITING CUSTOMERS" indicates the number of customers that have visited a store identified by the "STORE ID". According to the example in FIG. 19, when receiving the store visit information at step S1909, the information processing apparatus 100-1 adds the number of customers of this time corresponding to the "NUMBER OF VISITING CUSTOMERS" corresponding to the store SH1 (STORE ID "SH1") in the store-information storage unit 123-1.

The "REPEAT RATE" indicates a repeat rate of a customer for a store identified by the "STORE ID". Using the store SH1 as an example, the information processing apparatus 100-1 counts the "NUMBER OF VISITING CUSTOMERS" in a predetermined period (for example, last one month) based on the "NUMBER OF VISITING CUSTOMERS" corresponding to the store SH1 (STORE ID "SH1") in the store-information storage unit 123-1. Moreover, the information processing apparatus 100-1 counts, per user that has visited the store SH1 in a predetermined period (for example, last one month), the "NUMBER OF VISIT" in this predetermined period. The information processing apparatus 100-1 then calculates the "REPEAT RATE" of the store SH1 based on the "NUMBER OF VISITING CUSTOMERS" and the "NUMBER OF VISIT".

The "CUSTOMER ATTRIBUTE TENDENCY" indicates an attribute tendency of a customer visiting a store identified by the "STORE ID". For example, for the store SH1, the information processing apparatus 100 analyzes a customer attribute tendency indicating a customer of what kind of attribute tends to visit the store SH1. In the example in FIG. 21, the information processing apparatus 100-1 has acquired an analysis result indicating that "male customers in their thirties" and "salaried workers" tend to visit the store SH1 as customers.

Moreover, the information processing apparatus 100-1 may be configured to perform marketing analysis, and to enter an analysis result in the store-information storage unit 123-1 as marketing data, thereby providing marketing data to a client company (for example, an owner of a store). Thus, the information processing apparatus 100-1 can support marketing activity for the client company. Furthermore, the information processing apparatus 100-1 may provide marketing data to a user through the customer attracting service GSV. For example, the information processing apparatus 100-1 may display the "REPEAT RATE" on the detail screen. Thus, the information processing apparatus 100-1 can provide useful information for searching a store to the user and, therefore, can support store search effectively. The marketing analysis as described above is performed by, for example, a [the] analyzing unit 138-1 (FIG. 24).

Configuration of Terminal Device

Figure 23:
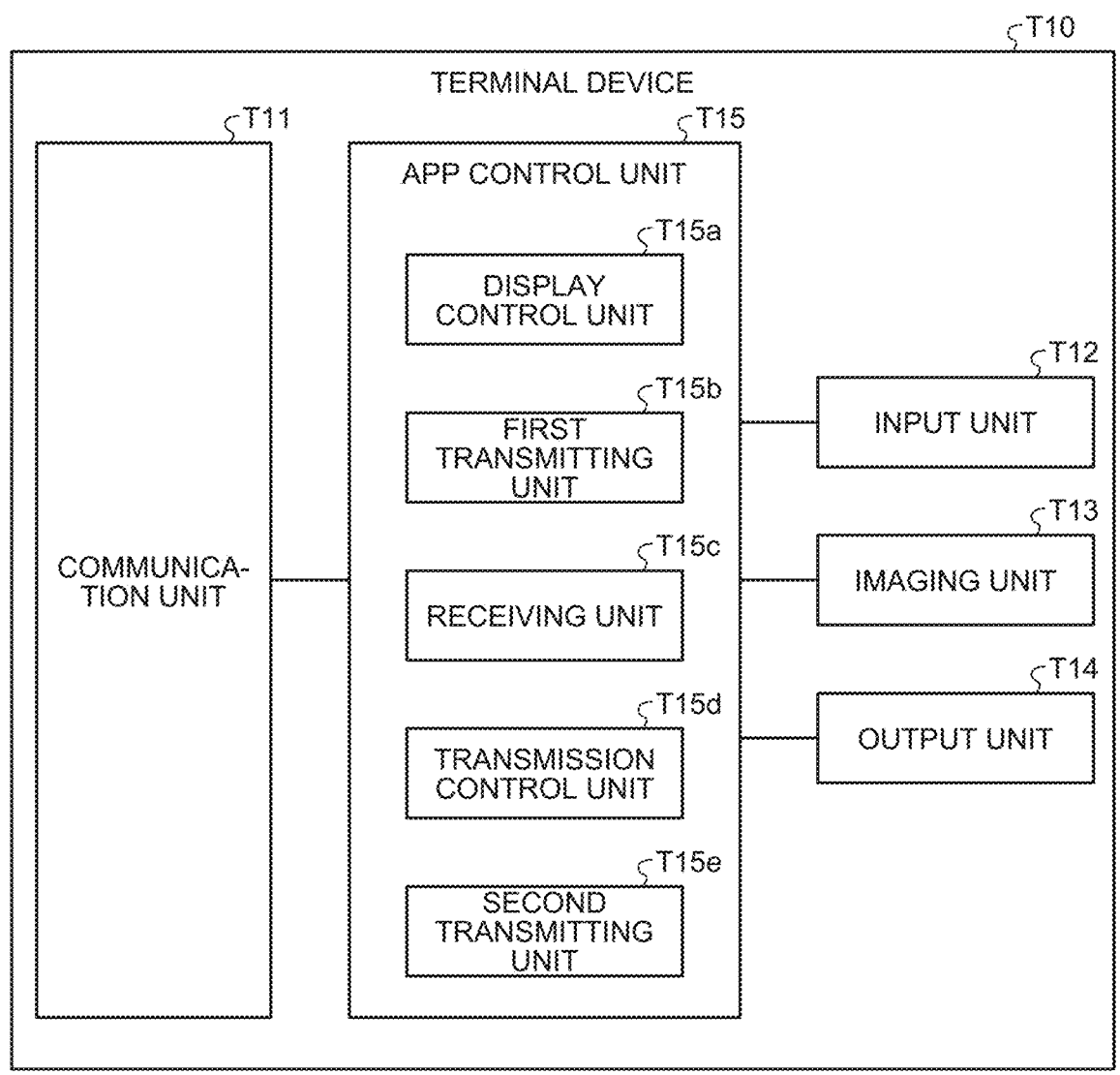
FIG. 23 is a diagram illustrating a configuration example of a terminal device according to the third embodiment.

Next, the terminal device T10 according to the third embodiment will be explained by using FIG. 23. FIG. 23 is a diagram illustrating a configuration example of a terminal device T10 according to the third embodiment. As illustrated in FIG. 23, the terminal device T10 includes a communication unit T11, an input unit T12, an imaging unit T13, an output unit T14, and an app control unit T15.

About Communication Unit T11

The communication unit T11 is implemented by, for example, a network interface card (NIC), or the like. The communication unit T11 is wiredly or wirelessly connected to the network N, and performed transmission and reception of information, for example, with the information processing apparatus 100-1.

About Input Unit T12, imaging Unit T13, Output Unit T14

The input unit T12 is an input device that accepts various kinds of operations from a user. For example, the input unit T12 is implemented by, for example, a keyboard, a mouse, and an operating key, and the like. The output unit T14 is a display device to display various kinds of information. For example, the output unit T14 is implemented by, for example, a liquid crystal display, or the like. When a touch panel is adopted to the terminal device T10, the input unit T12 and the output unit T14 are integrated. Moreover, the output unit T14 corresponds to, for example, the display screen D illustrated in FIG. 18. Furthermore, the imaging unit T13 corresponds to the camera function to capture a subject.

About App Control Unit T15

Returning back to FIG. 23, the app control unit T15 is implemented by executing various kinds of programs stored in the storage device in the terminal device T10 by a central processing unit (CPU), a micro processing unit (MPU), or the like using the RAM as a work area. Furthermore, the app control unit T15 is implemented by, for example, an integrated circuit, such as an application specific integrated circuit (ASIC) and a field programmable gate array (FPGA). Moreover, the app control unit T15 is, for example, a control unit that is loaded by executing the app AP.

As illustrated in FIG. 23, the app control unit T15 includes a display control unit T15a, a first transmitting unit T15b, a receiving unit T15c, a transmission control unit T15d, and a second transmitting unit T15e, and implements or performs functions and actions of information processing explained below. Note that an internal configuration of the app control unit T15 is not limited to the configuration illustrated in FIG. 23, and may be a different configuration as long as it is configured to perform the information processing described later. Moreover, a connection relationship among respective processing units included in the app control unit T15 is not limited to the connection relationship illustrated in FIG. 23, and may be a different connection relationship.

About Display Control Unit T15a

The display control unit T15a controls to display store information about a store supported by the customer attracting service GSV. For example, the display control unit T15a causes the output unit T14 (the display screen D) to display a search result corresponding to a search condition input by a user. In the example in FIG. 18, the display control unit T15a controls to display the index mark indicating the crowdedness of each store that has been searched according to the search condition on map information around the user in a superimposed manner. For example, the display control unit T15a controls to display the index mark colored differently according to the degree of crowdedness at a position on the map information around the user, and that corresponds to a location of the searched store. Moreover, by thus performing, the display control unit T15a controls to display a list of the index mark indicating the crowdedness of each store, as store information of each store.

Furthermore, when either one of the displayed index mark is selected as illustrated in FIG. 18, the display control unit T15a controls to display the detail screen in which details of a store corresponding to the selected index mark.

About First Transmitting Unit T15b

The first transmitting unit T15b transmits the check-in information to the information processing apparatus 100-1. When it is detected that the check-in button BT displayed on the detail screen is pressed, the first transmitting unit T15b transmits the check-in information including the store ID of a store corresponding to the check-in, and the user ID identifying a user that has pressed the check-in button BT to the information processing apparatus 100-1. Because a user presses the check-in button BT as an indication of intention of visiting the store, it can be regarded that the first transmitting unit T15b transmits information indicating an intension of indication of a visit.

About Receiving Unit T15c

The receiving unit T15c receives various kinds of information. For example, the receiving unit T15c receives various kinds of information from the information processing apparatus 100-1. For example, the receiving unit T15c receives a judgement result from the store-visit judgement processing by the information processing apparatus 100-1.

About Transmission Control Unit T15d

The transmission control unit T15d controls to be in a state enabling transmission of the store visit information according to a judgement result (received by the receiving unit T15c) judging whether a user has visited a store based on a use status of the customer attracting service GSV of the user. For example, the transmission control unit T15d controls to be in the state enabling transmission of store visit information when it is judged that the user has visited the store as an indication of intension indicating a visit of a store is made through the customer attracting service GSV. As one example, the transmission control unit T15d controls to be in the state enabling transmission of the store visit information when it is judged that the user has visited the store as it has been judged that an indication of intension has been made in the store based on position information of the store and position information of the user.

For example, the transmission control unit T15d controls to be in a state enabling the terminal device T10 to read store information from code information placed in the store, as the state enabling transmission of the store visit information. Moreover, for example, the transmission control unit T15d controls to enable mutual communication between a predetermined sensor provided in the store and the terminal device as the state enabling transmission of the store visit information.

About Second Transmitting Unit T15e

The second transmitting unit T15e transmits the store visit information indicating that the user has visited the store presented by the customer attracting service GSV according to an operation by the user. For example, the second transmitting unit 15e transmits the store visit information indicating that the user has visited the store presented by the customer attracting service GSV to the information processing apparatus 100-1 in response to the check-in done by the user.

For example, the second transmitting unit T15e transmits the store visit information to the information processing apparatus 100-1 when it is controlled to be in a state enabling transmission of the store visit information by the transmission control unit T15d. For example, when the store visit information is read from the code information by the, terminal device T10 according to an operation by a user, the second transmitting unit T15e transmits the read store visit information to the information processing apparatus 100-1. Moreover, for example, when mutual communication is performed by the terminal device T10 with the predetermined sensor, the second transmitting unit T15e transmits the store visit information based on the mutual communication, to the information processing apparatus 100-1.

Configuration of Information Processing Apparatus

Next, the information processing apparatus 100-1 according to the third embodiment will be explained by using FIG. 24. FIG. 24 is a diagram illustrating a configuration example of the information processing apparatus 100-1 according to the third embodiment. As illustrated in FIG. 24, the information processing apparatus 100-1 includes a communication unit 110-1, a storage unit 120-1, and a control unit 130-1.

About Communication Unit 110-1

The communication unit 110-1 is implemented by, for example, a NIC or the like. The communication unit 110-1 is wiredly or wirelessly connected to the network N, and performs transmission and reception of information, for example, with the terminal device T10, the external device 60, and the payment device 200-1.

About Storage Unit 120-1

The storage unit 120-1 is implemented by, for example, a semiconductor memory device, such as a random access memory (RAM) and a flash memory, or a storage device, such as a hard disk and an optical disk. The storage unit 120-1 includes a user-information storage unit 121-1, and a store-visit information storage unit 122-1, and the store-information storage unit 123-1. The user-information storage unit 121-1 stores various kinds of information (for example, attribute information) about users. The store-visit-information storage unit 122-1 and the store-information storage unit 123-1 are as explained in FIG. 21.

About Control Unit 130-1

Returning back to FIG. 24, the control unit 130-1 is implemented by executing various kinds of programs stored in the storage device in the information processing apparatus 100-1 by the CPU, the MPU, or the like, using the RAM as a work area. Moreover, the control unit 130-1 is implemented by, for example, an integrated circuit such as an ASIC and an FPGA.

As illustrated in FIG. 24, the control unit 130-1 includes a first receiving unit 131-1, a judging unit 132-1, a transmitting unit 133-1, a second receiving unit 134-1, a calculating unit 135-1, a reward control unit 136-1, a giving unit 137-1, and an analyzing unit 138-1, and implements or performs functions of information processing explained below. Note that an internal configuration of the control unit 130-1 is not limited to the configuration illustrated in FIG. 24, and it may be a different configuration as long as it is configured to perform the information processing described later. Moreover, a connection relationship among respective processing units included in the control unit 130-1 is not limited to the connection relationship illustrated in FIG. 24, and may be a different connection relationship.

About First Receiving Unit 131-1

The first receiving unit 131-1 receives various kinds of information from the terminal device T10. For example, the first receiving unit 131-1 receives the check-in information transmitted by the first transmitting unit T15b of the terminal device T10, About Judging Unit 132-1

The judging unit 132-1 performs the store-visit judgement processing to judge whether a user has visited a store presented by the customer attracting service GSV. For example, when the check-in information is received by the first receiving unit 131-4 based on a use status of the customer attracting service GSV by a user that has transmitted the check-in information, the judging unit 132-1 judges whether this user has visited a store identified by the check-in information.

For example, the judging unit 132-1 judges that the user has visited the store identified by the check-in information when it is detected that an indication of intension of a visit to the store identified by the check-in information has been made, that is, when the check-in information is received.

Furthermore, for example, the judging unit 132-1 may be configured to judge whether the user has visited the store by judging whether an indication of intension is made in a state in which the user is in the store by matching between position information of the store identified by the check-in information and position information of the user that has transmitted the check-in information. For example, when the position information of the store and the position information of the user match each other, the judging unit 132-1 judges that the indication of intension has been made in a state in which the user is in the store. That is, the judging unit 132-1 judges that the user has visited the store.

About Transmitting Unit 133-1

The transmitting unit 133-1 transmits a judgment result acquired by the judging unit 132-1 to the terminal device T10 that has transmitted the check-in information.

About Second Receiving Unit 134-1

The second receiving unit 134-1 receives the store visit information indicating that the user has visited the store presented by the customer attracting service GSV. For example, the second receiving unit 134-1 receives the store visit information transmitted by the second transmitting unit T15e of the terminal device T10, For example, the second receiving unit 134-1 receives the store visit information including at least identification. information (store ID) to identify a store.

About Calculating Unit 135-1

The calculating unit 135-1 calculates the number of visiting customers to the store per store based on the store visit information received by the second receiving unit 134-1. The calculating unit 135-1 calculates a fee according to the number of visiting customers to the store per store as a fee to be charged to the store based on the calculated number of visiting customers. For example, the calculating unit 135-1 calculates the fee by multiplying the number of customers by a predetermined amount.

In the example in FIG. 19, when the store visit information is received, the calculating unit 135-1 calculates the latest number of visiting customers by adding the number of customers of this time corresponding to the "NUMBER OF VISITING CUSTOMERS" corresponding to the store SH1 (STORE ID "SH1") in the store-information storage unit 123-1. Furthermore, when it is judged that it has become a time to charge a fee to the store SH1 (for example, end of month), the calculating unit 135-1 calculates a fee to be charged to the store SH1 based on the "NUMBER OF VISITING CUSTOMERS" of a predetermined period (for example, last one month).

Moreover, the calculating unit 135-1 performs billing process with the external device 60. For example, the calculating unit 135-1 controls the external device 60 to charge the store SH1 for the fee calculated for the store SH1. The external device 60 charges the fee to the store SH1 in accordance with the control by the calculating unit 135-1.

About Reward Control Unit 136-1

The reward control unit 136-1 performs the reward control processing to control a reward to be given to the user. Specifically, because the store visit information is transmitted in accordance with an operation by the user, the reward control unit 136-1 performs the reward control processing to control a reward to be given to the user as a reward for this transmission.

For example, the reward control unit 136-1 performs the reward control processing to decide a reward to be given indicating what kind of reward is to be given to the user. For example, the reward control unit 136-1 decides a reward according to the number of people visiting the store. For example, reward control unit 136-1 decides a coupon to be given to a coupon of a higher discount rate as the number of visiting people increases. Moreover, for example, the reward control unit 136-1 decides a point to be given to a higher point relative to a basic point as the number of visiting people increases.

Moreover, when the store visit information read from code information corresponding to a predetermined payment service is received by the second receiving unit 134-1, the reward control unit 136-1 controls such that a reward usable in the predetermined payment service is to be given to the user as a reward for transmission of this store visit information. Furthermore, the reward control unit 136-1 controls such that a reward usable only in the store identified by the store visit information is to be given to the user as a reward for transmission of this store visit information.

Furthermore, the reward control unit 136-1 calculates the number of visit to the store by the user based on the store visit information, and controls a winning rate for a reward for the user according to the calculated number of visits.

About Giving Unit 137-1

The giving unit 137-1 gives a user a reward for transmission of the store visit information by the user. For example, when the store visit information read from code information corresponding to a predetermined payment service is transmitted as the code information, the giving unit 137-1 gives a reward usable in the predetermined payment service as the reward for transmission of this store visit information, to the user.

Moreover, for example, the giving unit 137-1 gives a reward according to the number of people visiting the store to a user of a terminal device that has transmitted the store visit information as the reward for transmission of the store visit information. Furthermore, for example, the giving unit 137-1 gives a reward usable only in a store identified by the store visit information as the reward for transmission of the store visit information.

About Analyzing Unit 138-1

The analyzing unit 138-1 performs marketing analysis based on the store visit information, to enter an analysis result as marketing data. For example, the analyzing unit 138-1 counts, per store, the "NUMBER OF VISITING CUSTOMERS" to the store based on the store visit information of the store. Moreover, the analyzing unit 138-1 counts the "NUMBER OF VISIT" up to this point per user that has visited the store. The analyzing unit 138-1 then calculates a repeat rate based on the "NUMBER OF VISITING CUSTOMERS" and "NUMBER OF VISIT". Furthermore, the analyzing unit 138-1 analyzes the "CUSTOMER ATTRIBUTE TENDENCY" indicating what attribute to which a visiting customer tends to belong, based on the store visit information and the attribute information of the user of a transmission source of the store visit information.

Processing Procedure

Figure 25:
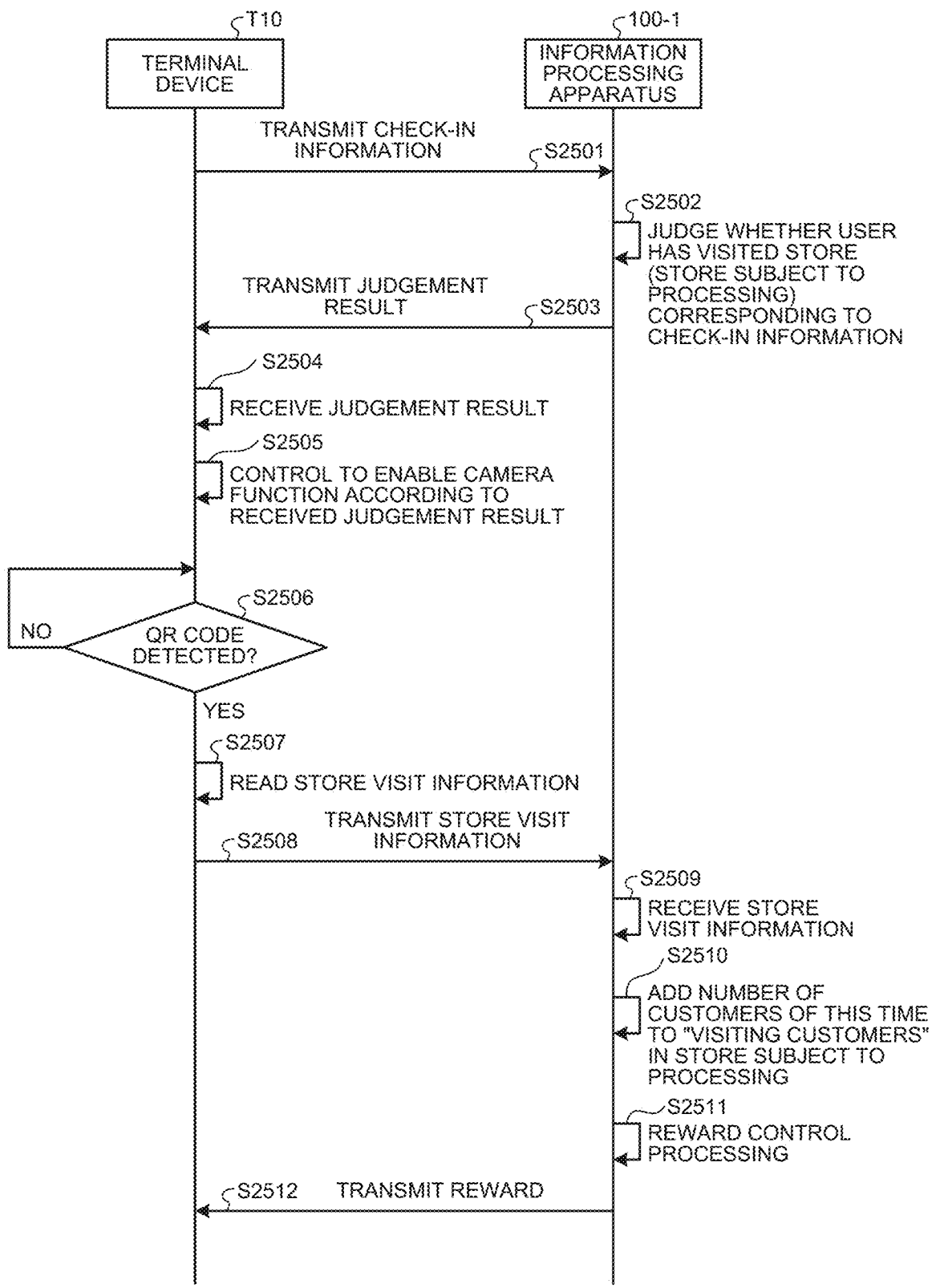
FIG. 25 is a sequence diagram illustrating a procedure of reward giving processing by the information processing system according to the third embodiment.
Figure 26:
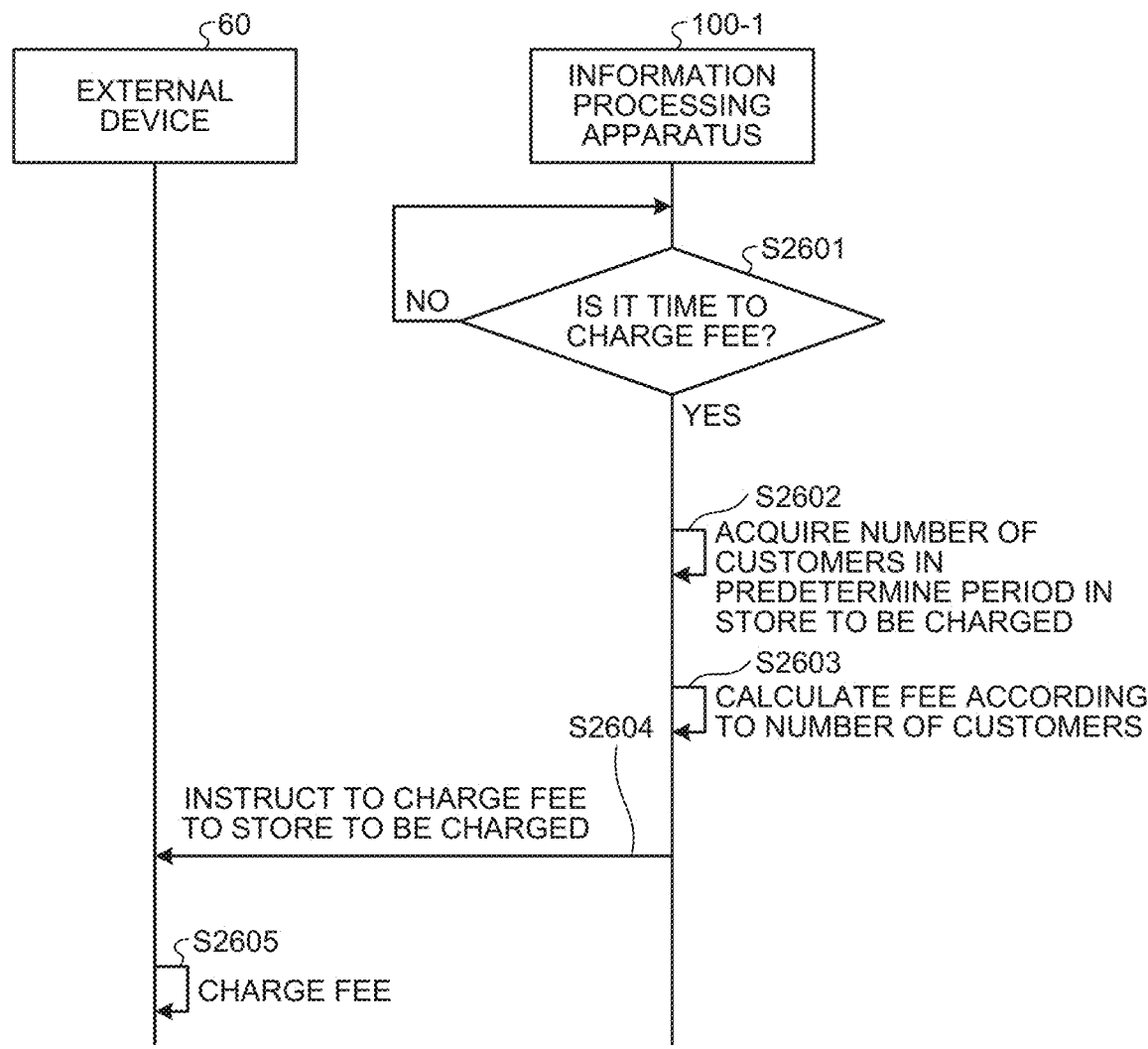
FIG. 26 is a sequence diagram illustrating a procedure of billing processing by the information processing system according to the third embodiment.

Next, a processing procedure by the information processing system S1 according to the third embodiment will be explained. In FIG. 25, out of the processing procedure by the information processing system S1 according to the third embodiment, an information processing procedure performed between the terminal device T10 and the information processing apparatus 100-1 will be explained. In FIG. 26, an information processing procedure performed between the external device 60 and the information processing apparatus 100-1 will be explained out of the processing procedure performed by the information processing system S1 according to the third embodiment.

Processing Procedure (1)

First, the information processing procedure by the information processing system S1 according to the third embodiment will be explained by using FIG. 25. FIG. 25 is a sequence diagram illustrating a procedure of reward giving processing by the information processing system according to the third embodiment.

First, when it is detected that the check-in button BT is pressed, the first transmitting unit T15*b* of the terminal device T10 transmits the check-in information to the information processing apparatus 100-1 (step S2501). When the check-in information is received by the first receiving unit 131-1, the judging unit 132-1 of the information processing apparatus 100-1 performs the store-visit judgement processing to judge whether the user of the terminal device T10 has visited the store corresponding to the received check-in information (store subject to processing) (step S2502). The transmitting unit 133-1 of the information processing apparatus 100-1 transmits a judgement result acquired by the judging unit 132-1 to the terminal device T10 (step S2503).

The receiving unit T15*c* of the terminal device T10 receives the judgement result transmitted by the transmitting unit 133-1 (step S2504). The transmission control unit T15*d* controls to be in a state enabling a use of the imaging unit T13 (the camera function CM) of the terminal device T10 according to the judgment result received by the receiving unit T15*c* (step S2505).

In such a state, the imaging unit T13 judges whether a QR code is detected (step S2506). When a QR code is not detected (step S2506: NO), the imaging unit T13 waits until it is detected. On the other hand, when a QR code is detected (step S2506: YES), the imaging unit T13 reads the store visit information from the QR code (step S2507). The second transmitting unit T15*e* of the terminal device T10 transmits the store visit information read by the imaging unit T13 to the information processing apparatus 100-1 (step S2508).

The second receiving unit 134-1 of the information processing apparatus 100-1 receives the store visit information transmitted by the second transmitting unit T15*e* (step S2509). The calculating unit 135-1 adds the number of customers of this time to the "NUMBER OF VISITING CUSTOMERS" of the store subject to processing (step S2510). Note that such addition may be performed by the second receiving unit 134-1.

Moreover, the reward control unit 136-1 of the information processing apparatus 100-1 performs the reward control processing to control (decide) a reward to be given to the user of the terminal device T10 (step S2511). The giving unit 137-1 transmits the reward information indicating a reward controlled by the reward control unit 136-1 to the terminal device T10 (step S2512).

Furthermore, for example, the receiving unit T15*c* of the terminal device T10 receives the reward information transmitted from the giving unit 137-1.

Processing Procedure (2)

Next, the information processing procedure by the information processing system S1 according to the third embodiment will be explained by using FIG. 26. FIG. 26 is a sequence diagram illustrating a procedure of billing process by the information processing system S1 according to the third embodiment.

First, the calculating unit 135-1 of the information processing apparatus 100-1 judges whether it has become time to charge a fee to a store (step S2601). When it is not yet time to charge a fee to a store (step S2601: NO), the calculating unit 135-1 waits until it becomes time to charge a fee to a store. On the other hand, when it is judged that it is time to charge a fee to a store (step S2601: YES), the calculating unit 135-1 refers to the store-information storage unit 123-1, and calculates the number of visiting customers in a predetermined period for the store to be charged (step S2602). The calculating unit 135-1 calculates a fee according to the calculated number of visiting customers (step S2603).

Next, the calculating unit 135-1 performs the billing process to instruct the external device 60 to charge the fee to the store to be charged (step S2604). The external device 60 charges the fee to the store to be charged in accordance with a control by the calculating unit 135-1 (step S2605).

Hardware Configuration

Figure 27:
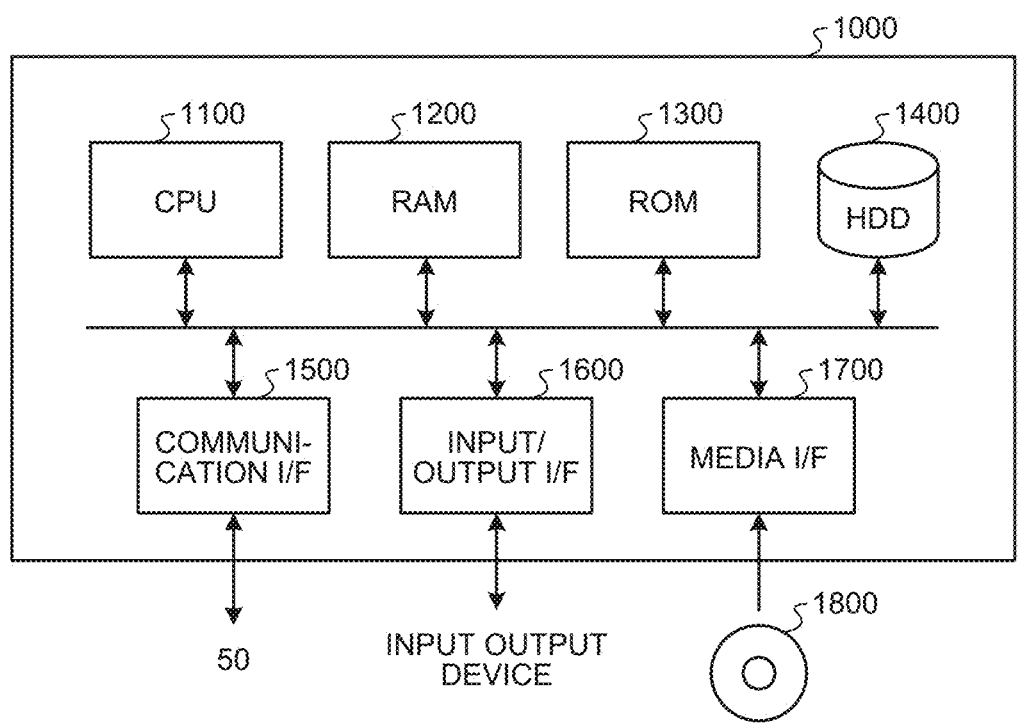
FIG. 27 is a hardware configuration diagram illustrating an example of a computer that implements functions of the information processing apparatus.

Moreover, the terminal device T10 and the information processing apparatus 100-1 included in the information processing system S1 according to the third embodiment are implemented by, for example, the computer 1000 having a configuration as illustrated in FIG. 27. Hereinafter, it will be explained with the information processing apparatus 100-1 as an example. FIG. 27 is a hardware configuration diagram illustrating an example of the computer 1000 that implements functions of the information processing apparatus 100-1. The computer 1000 includes the CPU 1100, the RAM 1200, the ROM 1300, the HDD 1400, the communication interface (I/F) 1500, the input/output interface (I/F) 1600, and the media interface (I/F) 1700.

The CPU 1100 operates based on a program stored in the ROM 1300 or the HDD 1400, and performs control of the respective components. The ROM 1300 stores a boot program that is executed by the CPU 1100 at the time of activation of the computer 1000, a program dependent on hardware of the computer 1000, and the like.

The HDD 1400 stores a program executed by the CPU 1100, data that is used by the program, and the like. The communication interface 1500 receives data from other devices through a communication network 50 to send it to the CPU 1100, and transmits data generated by the CPU 1100 to the other device through the communication network 50.

The CPU 1100 controls an output device, such as a display and a printer, and an input device, such as a keyboard and a mouse through the input/output interface 1600. The CPU 1100 acquires data from the input device through the input/output interface 1600. Moreover, the CPU 1100 outputs generated data to the output device through the input/output interface 1600.

The media interface 1700 reads a program or data stored in the recording medium 1800, to provide to the CPU 1100 through the RAM 1200. The CPU 1100 loads the program on the RAM 1200 from the recording medium 1800 through the media interface 1700, and executes the loaded program. The recording medium 1800 is, for example, an optical recording medium, such as a digital versatile disc (DVD) and a phase change rewritable disk (PD), a magneto-optical recording medium such as a magneto-optical disk (MO), tape medium, a magnetic recording medium, a semiconductor memory, or the like.

For example, when the computer 1000 functions as the information processing apparatus 100-1 according to the embodiment, the CPU 1100 of the computer 1000 executes a program loaded in the RAM 1200 to thereby implement the function of the control unit 130-1. Moreover, in the HDD 1400, data in the storage unit 120-1 is stored. The CPU 1100 of the computer 1000 reads these programs from the storage medium 1800 and execute but, as another example, may also acquire these program from other devices through the communication network 50.

Others

Moreover, the respective components of the respective devices illustrated are of functional concept, and it is not necessarily required to be configured physically as illustrated. That is, specific forms of distribution and integration of the respective devices are not limited to the ones illustrated, and all or some thereof can be configured to be distributed or integrated functionally or physically in arbitrary units according to various kinds of loads, use conditions, and the like.

In the above, the embodiments of the present application have been explained in detail based on some drawings, but these are only examples, and the present invention can be implemented by other embodiments achieved by giving various modifications and improvements based on knowledge of those skilled in the art in those including description in a column of disclosure of the invention.

Moreover, terms "section, module, unit" described above can be replaced with "means", "circuit", or the like. For example, the giving unit can be read as giving means or giving circuit.

Information processing of providing image capturing a state in a store, a sound, or information relating to a use purpose of a store estimated from an attribute may be further combined with the respective embodiments described above. In following fourth to seventh embodiments, such information processing will be explained.

Fourth Embodiment

One Example of Information Processing

Figure 28:
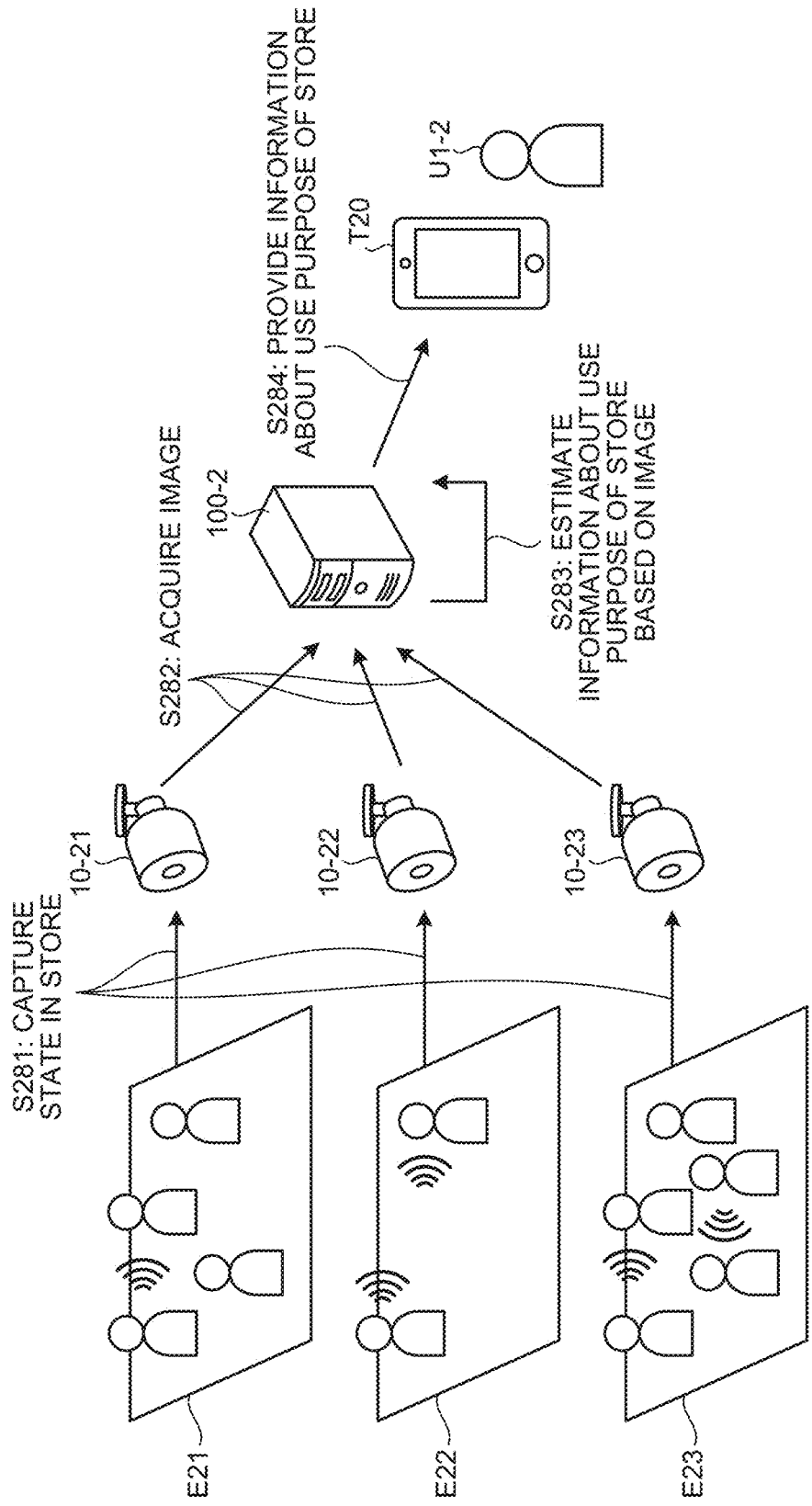
FIG. 28 is a diagram illustrating an example of information processing according to a fourth embodiment.

One example of information processing according to the fourth embodiment will be explained by using FIG. 28. FIG. 28 is a diagram illustrating an example of the information processing according to the fourth embodiment. In FIG. 28, information processing of estimating information about a use purpose of a store based on an image acquired by capturing a state of a store by an imaging apparatus, performed by an information processing apparatus 100-2 will be explained.

The imaging apparatus is, for example, a camera installed in a store, a camera held by a staff of the store, and the like. The imaging apparatus has a microphone function to collect sound, in addition to the imaging function. The store is, for example, an eating place, such as a coffee shop, a tavern, and a restaurant. The state of a store is a concept including, for example, an atmosphere (mood) in the store, an attribute of a customer in the store, and the like. The atmosphere in a store is a concept including, for example, calmness, brightness, and the like. The attribute of a customer in a store is a concept including, for example, a male to female ratio, an age group, the number of families, dwell time, and the like.

The information relating to a use purpose of a store is a concept including, for example, a use purpose itself of a store, and information used for estimation of a use purpose of a store and the like (for example, score described later). In the following, it will be explained with an example in which the imaging apparatuses 10-21 to 10-23 having a microphone function are installed in three stores E21 to E23, respectively. Moreover, in the following, the three stores E21 to E23 are collectively referred to as store E20 when not particularly distinguished from one another. Similarly, the three imaging apparatuses 10-21 to 10-23 are collectively referred to as imaging apparatus 10-2.

First, as illustrated in FIG. 28, the three imaging apparatuses 10-2 installed int eh three stores E20, respectively image a state in the respective corresponding stores E20 (step S281). In the example in FIG. 28, the imaging apparatus 10-21 installed in the store E21 captures a state in the store E21. Moreover, the imaging apparatus 10-22 installed in the store E22 captures a state in the store E22. Furthermore, the imaging apparatus 10-23 installed in the store E23 captures a state in the store E23.

Subsequently, the information processing apparatus 100-2 acquires an image acquired by capturing a state in the store E20 (step S282). Specifically, the information processing apparatus 100-2 acquires images acquired by capturing states in the corresponding one of the respective stores E20 by the three imaging apparatuses 10-21 to 10-23. More specifically, the information processing apparatus 100-2 acquires images including sound. In the example in FIG. 28, the information processing apparatus 100-2 acquires an image including voices of four customers that is acquired by capturing a state of the store E21 by the imaging apparatus 10-21. Moreover, the information processing apparatus 100-2 acquires an image including voices of two people that is acquired by capturing a state of the store E22 by the imaging apparatus 10-22. Furthermore, the information processing apparatus 100-2 acquires an image including voices of five customers that is acquired by capturing a state of the store E23 by the imaging apparatus 10-23.

Subsequently, the information processing apparatus 100-2 estimates information relating to a use purpose of the respective stores E based on the acquired images including sound (step S283). Specifically, the information processing apparatus 100-2 calculates one or plural scores indicating a state in the store by analysing the image. For example, the information processing apparatus 100-2 calculates one or plural scores indicating an atmosphere (for example, calmness and brightness) in the store E included in the image.

Moreover, for example, the information processing apparatus 100-2 calculates one or plural scores indicating an attribute (for example, a male to female ratio, an age group, the number of families, and dwell time) of a customer in the store E included in the image. The information processing apparatus 100-2 then estimates information relating to a use purpose of the store E20 based on a comparison result of the calculated score with a use purpose database in which use purposes of the store E20 are classified per condition that is to be satisfied by the score. In the example in FIG. 28, the information processing apparatus 100-2 searches for the use purpose database, and when a condition that a score indicating the calmness in the store E22 is equal to or lower than a predetermined value is satisfied, the information processing apparatus 100-2 estimates the use purpose of the store E22 as "suitable for client entertainment" corresponding to the condition.

Subsequently, the information processing apparatus 100-2 provides information about an estimated use purpose of the respective stores E20 (step S284). Specifically, the information processing apparatus 100-2 provides information about a use purpose of the respective stores E20 to the terminal device T20 that is being used by the user U1-2 to view the viewable information of the respective stores E20. In the example in FIG. 28, the information processing apparatus 100-2 provides text informing that "the store E22 is suitable for client entertainment" to the user terminal T20 based on the estimation result of a use purpose of the store E22.

As described, the information processing apparatus 100-2 according to the fourth embodiment acquires an image that is obtained by capturing a state in the store E20, and estimates information about a use purpose of the store E20 based on the acquired image. Thus, the information processing apparatus 100-2 according to the fourth embodiment can estimate information about a use purpose of the store E20 appropriately according to an actual state in the store E20.

Configuration of Information Processing System

Figure 29:
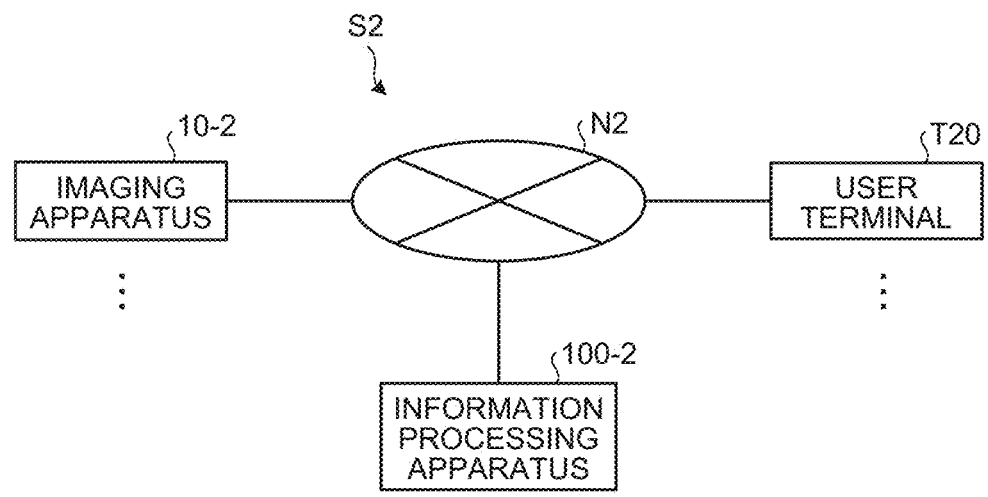
FIG. 29 is a diagram illustrating a configuration example of an information processing system according to the fourth embodiment.

Next, a configuration of an information processing system S2 according to the fourth embodiment will be explained by using FIG. 29. FIG. 29 is a diagram illustrating a configuration example of the information processing system S2 according to the fourth embodiment. As illustrated in FIG. 29, the information processing system S2 includes the imaging apparatus 10, the user terminal 20, and the information processing apparatus 100. The imaging apparatus 10-2, the user terminal T20, and the information processing apparatus 100-2 are wiredly or wirelessly connected to through a network N2 so as to be able to communicate with one another.

The imaging apparatus 10-2 is, for example, a camera installed in a store, a camera held by a staff of a store, and the like. The imaging apparatus 10-2 has a microphone function to collect sound, in addition to an imaging function.

The user terminal T20 is an information processing apparatus used by a user that views a viewable information of a store through an application or a web page. The user terminal T20 is, for example, a desktop personal computer (PC), a laptop PC, a tablet terminal, a mobile telephone, a personal digital assistant (PDA), and the like.

The information processing apparatus 100-2 is implemented, for example, by a server device, or the like. The information processing apparatus 100-2 acquires an image that is obtained by capturing a state in a store, and estimates information about a use purpose of the store based on the acquired image.

Configuration of Information Processing Apparatus

Figure 30:
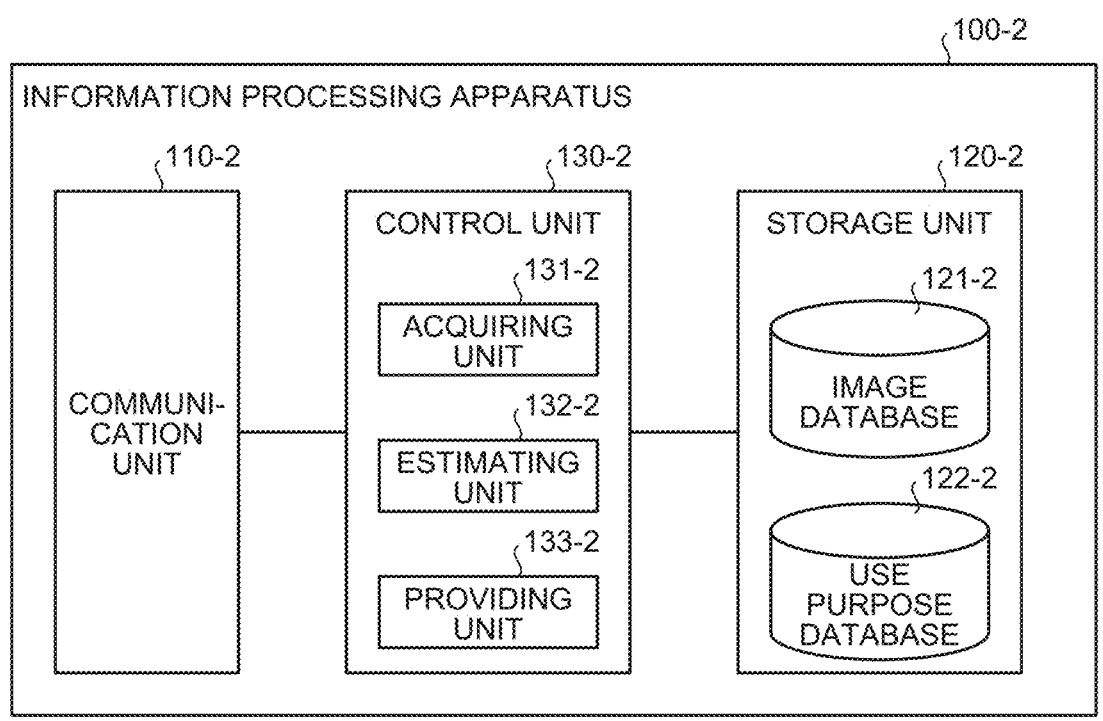
FIG. 30 is a diagram illustrating a configuration example of an information processing apparatus according to the fourth embodiment.

Next, a configuration of the information processing apparatus 100-2 according to the fourth embodiment will be explained by using FIG. 30. FIG. 30 is a diagram illustrating a configuration example of the information processing apparatus 100-2 according to the fourth embodiment. As illustrated in FIG. 30, the information processing apparatus 100-2 includes a communication unit 110-2, a storage unit 120-2, and the control unit 130-2.

The communication unit 110-2 is implemented by, for example, a network interface card (NIC), or the like. The communication unit 110-2 is connected wiredly or wirelessly to a network, and performs transmission and reception of information with the imaging apparatus 10-2 and the user terminal T20.

The storage unit 120-2 is implemented by, for example, a semiconductor memory, such as a random access memory (RAM) and a flash memory, or a storage device, such as a hard disk and an optical disk. The storage unit 120-2 has an image database 121-2 and a use purpose database 122-2.

The image database 121-2 stores information about images captured by the imaging apparatus 10-2. FIG. 31 illustrates one example of the image database 121-2 according to the fourth embodiment. In the example illustrated in FIG. 31, the image database 121-2 has items of "STORE ID" "IMAGE", and "IMAGING DATE AND TIME".

The "STORE ID" is identifier to identify a store in which the imaging apparatus 10-2 that captures an image is installed. The "IMAGE" is information relating to an image obtained by capturing a state in a store by the imaging apparatus 10-2 associated with the "STORE ID". The image is information relating to an image including sound. The "IMAGING DATE AND TIME" is information relating to imaging date and time of an image captured by the imaging apparatus 10-2 associated with the "STORE ID".

For example, in FIG. 31, it is indicated that an image "IMAGE #1" is captured by the imaging apparatus 10-2 installed in the store E1 identified by the store ID at imaging date and time "2019/9/14 10:00".

The use purpose database 122-2 is a database in which a use purpose of a store is classified according to a condition to be satisfied by one or plural scores indicating a state in a store. FIG. 32 illustrates one example of the use purpose database 122-2 according to the fourth embodiment. In the example illustrated in FIG. 43, the use purpose database 122-2 has items of "USE PURPOSE" and "CONDITION".

The "USE PURPOSE" indicates a use purpose of a store associated with the "CONDITION". The "CONDITION" indicates a condition to be satisfied by one or plural scores indicating a state in a store.

For example, in FIG. 32, a score indicating a state in a store satisfies a condition that "brightness is AA or lower and calmness is BB or lower", it is indicated that the use purpose of the store is "SUITABLE FOR DATE".

The control unit 130-2 is a controller, and is implemented by executing various kinds of programs (corresponding to one example of information processing program) stored in the storage device in the information processing apparatus 100-2, for example, by a central processing unit (CPU), a micro processing unit (MPU), or the like using the RAM as a work area. Moreover, the control unit 130-2 is a controller, and is implemented by, for example, an integrated circuit, such as an application specific integrated circuit (ASIC) and a field programmable gate array (FPGA).

The control unit 130-2 includes an acquiring unit 131-2, an estimating unit 132-2, and a providing unit 133-2.

The acquiring unit 131-2 acquires an image that is obtained by capturing a state in the store E20. Specifically, the acquiring unit 131-2 acquires an image that is obtained by capturing a state in the respective stores E20 for the respective stores E20. More specifically, the acquiring unit 131-2 acquires an image including sound. The acquiring unit 131-2 stores the acquired image in the image database 121-2.

Furthermore, the acquiring unit 131-2 acquires an image in real time, and stores the image in the image database 121-2, associating with an imaging date and time.

Moreover, the acquiring unit 131-2 acquires plural images, imaging date and time of which vary, and stores the respective images in the image database 121-2 for each of the stores E20 in which the respective images have been captured.

The estimating unit 132-2 estimates information about a use purpose of the respective store E20 based on the image (that is, the image including sound) acquired by the acquiring unit 131-2. Specifically, the estimating unit 132-2 calculates one or plural scores indicating a state in the store E20 by analyzing the image. For example, the estimating unit 132-2 calculates one or plural scores indicating an atmosphere (for example, calmness and brightness) in the store E20 included in the image. One or plural scores indicating the atmosphere of the store E20 (for example, calmness and brightness) are calculated by using illuminance of an illumination imaged in the image, a volume of sound included int eh image, and the like. The sound included in the image is extracted, for example, by a predetermined sound analysis. When extracting the sound included in the image by a predetermined sound analysis, the estimating unit 132-2 may separate BGM and noises in the store, and may calculate a score for each of the BGM and noises. Moreover, for example, the estimating unit 132-2 calculates one or plural scores indicating an attribute of a customer (for example, a male to female ratio, an age group, the number of families, and dwell time) in the store E20 included in the image. One or plural scores indicating an attribute (for example, a male to female ratio, an age group, the number of families, and dwell time) of a customer in the store E20 are calculated, for example, by pattern matching, or the like. Furthermore, for example, the estimating unit 132-2 may calculate one or plural scores indicating a state in the store E20 by using predetermined machine learning. The estimating unit 132-2 then estimates information relating to a use purpose of the store E20 based on a comparison result between the calculated score and the use purpose database 122-2. Specifically, the estimating unit 132-2 searches for a condition to be satisfied by the calculated score from plural conditions included the use purpose database 122-2, and estimates a use purpose corresponding to the satisfied condition as a use purpose of the store E20. For example, the estimating unit 132-2 searches the use purpose database 122-2, and when a condition that a score indicating calmness in the store E20 is lower than a predetermined value CC is satisfied, estimates "SUITABLE FOR CLIENT ENTERTAINMENT" corresponding to the relevant condition as the use purpose of the store E20. For example, in FIG. 28, suppose that a volume of a voice of two customers in the store E22 is low and, therefore, the score indicating calmness in the store E22 is equal to or lower than the predetermined value CC. In this case, the information processing apparatus 100-2 searches the use purpose database 122-2, and estimates the use purpose of the store E22 as "SUITABLE FOR CLIENT ENTERTAINMENT" because the condition that the score indicating calmness in the store E22 is equal to or lower than the predetermined value CC.

Moreover, the estimating unit 132-2 sequentially updates the use purpose of the store E20 that has been estimated, based on an image in real time acquired by the acquiring unit 131-2. Specifically, the estimating unit 132-2 sequentially updates the use purpose of the store E20 that has been estimated, based on an image, the imaging date and time of which is the latest among plural images of each of the stores E20 in the image database 121-2.

Furthermore, the estimating unit 132-2 estimates information about a use purpose of the store E20 in a predetermined period based on an image, the imaging date and time of which falls within the predetermined period out of plural images acquired by the acquiring unit 131-2. The predetermined period is, for example, a specified period specified by a user viewing viewable information of the store E20. As the specified period, for example, a weekday, a weekend, season, and the like are considered. A case in which plural images, the imaging date and time of which falls within the predetermined period is present is assumed. In this case, selecting an arbitrary image from among the plural images included in the predetermined period, the estimating unit 132-2 may estimate the information about a use purpose of the store E20 in the predetermined period based on the selected image. Moreover, the estimating unit 132-2 may estimate the information about a use purpose of the store E20 in the predetermined period based on an average image that is obtained by averaging the plural images included in the predetermined period.

The providing unit 133-2 provides the information about a use purpose of the respective stores E20 estimated by the estimating unit 132-2. Specifically, the providing unit 133-2 provides the information about a use purpose of the respective stores E20 to the terminal device T20 that is being used by the user U1-2 to view the viewable information of the respective stores E20. For example, the providing unit 133-2 provides text or a push notification telling an estimation result of a use purpose of the respective stores E20 to the user terminal T20. Moreover, for example, the providing unit 133-2 may provide an estimation result of a use purpose of the respective stores E20 through a webpage of the respective stores E. Furthermore, for example, the providing unit 133-2 may accept an update request of the estimation result from the user terminal T20 in real time, and may provide the latest estimation result by causing the estimating unit 132-2 to estimate a use purpose of the store E20 at the time when the update request is accepted. Moreover, for example, the providing unit 133-2 may provide information about a use purpose of the store E20 in a specified period when the specified period (for example, weekday, weekend, season, or the like) is specified by a user viewing the viewable information of the store E20. Furthermore, for example, the providing unit 133-2 may provide one or plural scores indicating a state in the respective stores E20 used for estimation of a use purpose of the respective store E20 as the information about a use purpose of the respective stores E20.

Figure 33:
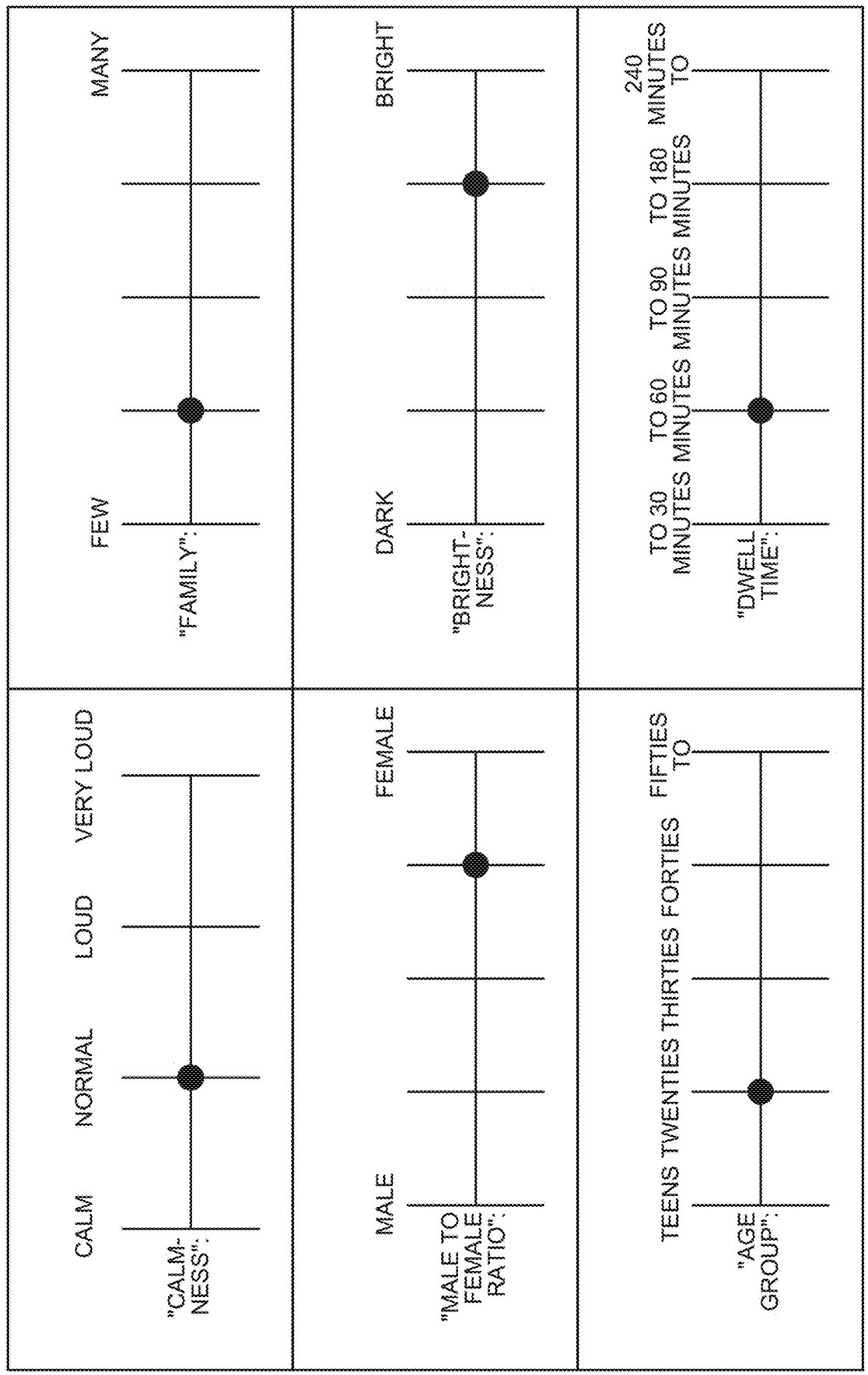
FIG. 33 is a diagram illustrating an example of providing plural scores indicating a state in the respective stores.

FIG. 33 is a diagram illustrating an example of providing plural scores indicating a state in the respective stores E20. In the example in FIG. 33, calmness, a male to female ratio, an age group, families, brightness, and dwell time are indicated as plural scores indicating a state in the respective stores E20 in a chart.

Processing Procedure

Figure 34:
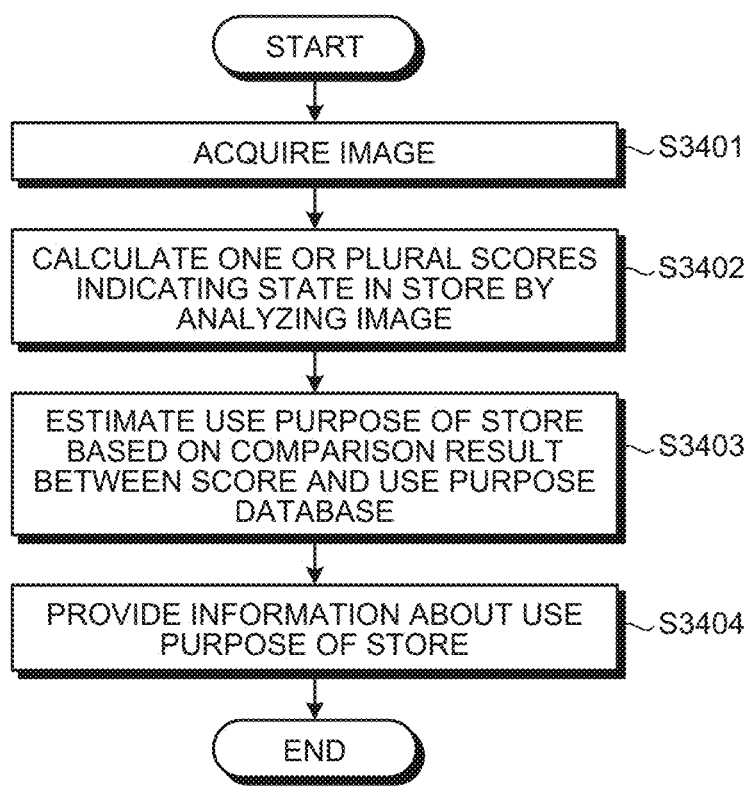
FIG. 34 is a flowchart illustrating an example of a procedure of information processing according to the fourth embodiment.

Next, a procedure of information processing according to the fourth embodiment will be explained by using FIG. 34. FIG. 34 is a flowchart illustrating one example of the procedure of the information processing according to the fourth embodiment.

As illustrated in FIG. 34, the acquiring unit 131-2 acquires an image obtained by capturing a state in the store E20 (step S3401).

The estimating unit 132-2 calculates one or plural scores indicating a state in the store E20 by analyzing the image (step S3402). The estimating unit 132-2 estimates information about a use purpose of the store E20 based on a comparison result between the calculated score and the use purpose database 122-2 (step S3403).

The providing unit 133-2 provides the estimated information about a use purpose of the store E20 (step S3404), and the processing is ended.

Effect

As described above, the information processing apparatus 100-2 according to the present embodiment includes the acquiring unit 131-2 and the estimating unit 132-2. The acquiring unit 131-2 acquires an image obtained by capturing a state in a store. The estimating unit 132-2 estimates information about a use purpose of the store based on the image acquired by the acquiring unit 131-2.

Thus, the information processing apparatus 100-2 according to the present embodiment can appropriately estimate the information about a use purpose of a store according to an actual state in the store.

Moreover, the acquiring unit 131-2 acquires an image including sound. Furthermore, the estimating unit 132-2 estimates the information about a use purpose of a store based on the image including sound acquired by the acquiring unit 131-2.

Thus, the information processing apparatus 100-2 according to the present embodiment can appropriately decide a use purpose of a store based on the image including sound.

Moreover, the information processing apparatus 100-2 according to the present embodiment further includes a storage unit that stores the use purpose database 122-2 in which a use purpose of a store as classified per condition to be satisfied by one or plural scores indicating a state in a store. Furthermore, the estimating unit 132-2 calculates one or plural scores indicating a state in a store by analyzing an image, and estimates information about a use purpose of the store based on a comparison result between the calculated score and the use purpose database 122-2.

Thus, the information processing apparatus 100-2 according to the present embodiment can estimate the information about a use purpose of a store appropriately by using the use purpose database 122-2 including variety of use purposes according to variety of states in the store.

Furthermore, the acquiring unit 131-2 acquires an image in real time. Moreover, the estimating unit 132-2 sequentially updates the use purpose of a store that has been estimate, based on the image in real time acquired by the acquiring unit 131-2.

Thus, the information processing apparatus 100-2 according to the present embodiment can sequentially update the use purpose of a store according to a change of a state in the store.

Furthermore, the acquiring unit 131-2 acquires plural images of various imaging dates and times. Moreover, the estimating unit 132-2 estimates the information about a use purpose of a store in a predetermined period based on an image, an imaging date and time of which falls within the predetermined time out of plural images acquired by the acquiring unit 131-2.

Thus, the information processing apparatus 100-2 according to the present embodiment can appropriately estimate the information about a use purpose of a store, for example, in a specified period that is specified by a user viewing viewable information of the store.

Furthermore, the acquiring unit 131-2 acquires an image obtained by capturing a state in a store for each of plural stores. Moreover, the estimating unit 132-2 estimates the information about a use purpose of each store based on the image acquired by the acquiring unit 131-2.

Thus, the information processing apparatus 100-2 according to the present embodiment can appropriately estimate the information about a use purpose of each store for each of the plural stores.

Furthermore, the information processing apparatus 100-2 according to the present embodiment further includes the providing unit 133-2 that provides the information about a use purpose of a store estimated by the estimating unit 132-1.

Thus, the information processing apparatus 100-2 according to the present embodiment can provide the information about a use purpose of a store in which an actual state in the store is reflected.

Fifth Embodiment

A fifth embodiment differs from the fourth embodiment in a point in which the user terminal T20 accepts a search condition, and displays information about a store searched in an information processing apparatus 100-2A.

One Example of Information Processing

Figure 35:
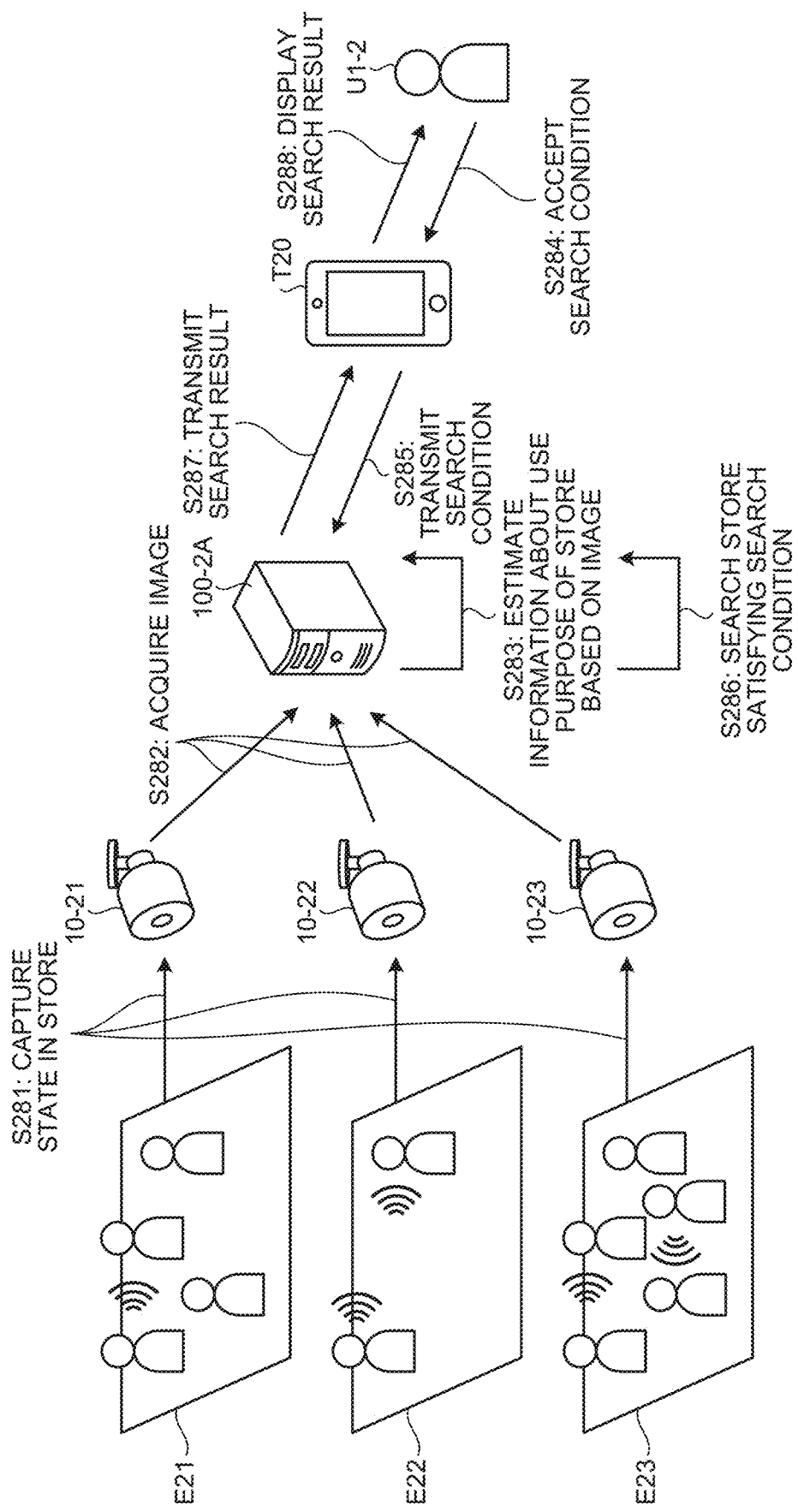
FIG. 35 is a diagram illustrating an example of information processing according to a fifth embodiment.

FIG. 35 is a diagram illustrating an example of information processing according to the fifth embodiment. In FIG. 35, information processing in which the user terminal T20 accepts a search condition, and displays information about a store searched in the information processing apparatus 100-2A will be explained. Because steps S281 to S283 in FIG. 35 correspond to steps S281 to S283 in FIG. 28, respectively, detailed explanation thereof is omitted.

As illustrated in FIG. 35, the user terminal T20 accepts a search condition including information about a use purpose of the store E20 from the user U1-2 (step S284). The search condition includes, for example, a date on which the store E20 is to be used, an area in which the store E20 is located, and the like in addition to the information about a use purpose of the store E20.

Figure 36:
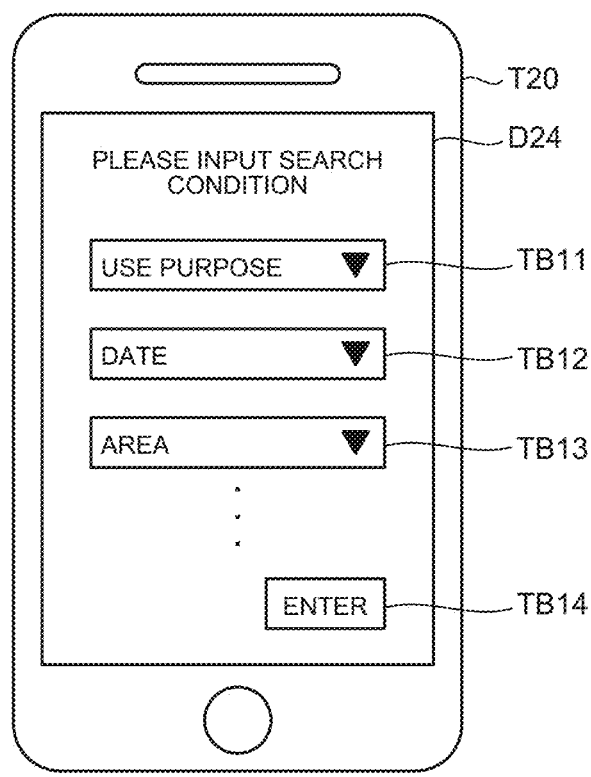
FIG. 36 is a diagram illustrating an example of a search-condition accepting screen in the user terminal.

FIG. 36 is a diagram illustrating an example of a search-condition accepting screen in the user terminal T20. When a predetermined application is started, as illustrated in FIG. 36, information telling "PLEASE INPUT SEARCH CONDITION" and a pull-down display TB 11 of "USE PURPOSE", a pull-down display TB12 of "DATE", a pull-down display TB13 of "AREA", and a button display TB14 of "ENTER" are displayed on an output unit D24 of the user terminal T20.

When the user presses the pull-down display TB11, candidates of use purpose of the store E20 are thereby displayed. Moreover, when the user presses the pull-down display TB12, candidates of date on which the store E20 is used are thereby displayed. Furthermore, when the user presses the pull-down display TB13, candidates of area in which the store E20 is located are thereby displayed. When the user selects desired use purpose, date, and area through the pull-down displays TB11 to TB13, and presses the button display TB 14 of "ENTER", a search condition is accepted.

Returning back to explanation of FIG. 35, subsequently, the user terminal T20 transmits the search condition to the information processing apparatus 100-2A (step S285).

Having accepted the search condition from the user terminal T20, the information processing apparatus 100-2A searches for the store E that satisfies the search condition (step S286). For example, the information processing apparatus 100-2A searches for the store E that satisfies the search condition by referring to the store database in which a search condition and information about the store E are associated.

Subsequently, the information processing apparatus 100-2A transmits a search result including the information about the store E that satisfies the search condition to the user terminal T20 (step S287).

The user terminal T20 then receives a search result, and displays the received search result (step S288).

Figure 37:
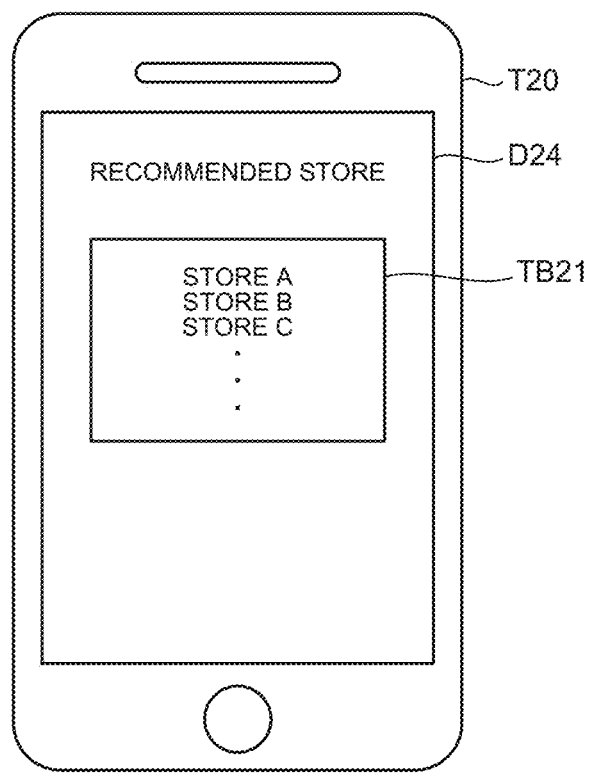
FIG. 37 is a diagram illustrating an example of a search-result display screen in the user terminal.

FIG. 37 is a diagram illustrating an example of a search-result display screen in the user terminal T20. When the user terminal T20 receives a search result transmitted from the information processing apparatus 100-2A, as illustrated in FIG. 37, information of "RECOMMENDED STORE" and a display section TB21 of information about the store E20 (for example, store A, store B, store C, . . . ) included in the search result are displayed on the output unit D24 of the user terminal T20.

As described, the terminal device T20 according to the fifth embodiment accepts a search result including the information about a use purpose of the store E20, and displays the information about the store E20 searched in the information processing apparatus 100-2A. Thus, the user terminal T20 according to the fifth embodiment can display information about the store E20 that satisfies the search condition including the information about a use purpose of the store E20.

Configuration of Information Processing System

Because the information processing system S2 according to the fifth embodiment has the same configuration as the information processing system S2 according to the fourth embodiment illustrated in FIG. 29, detailed explanation thereof is omitted.

Configuration of User Terminal

Figure 38:
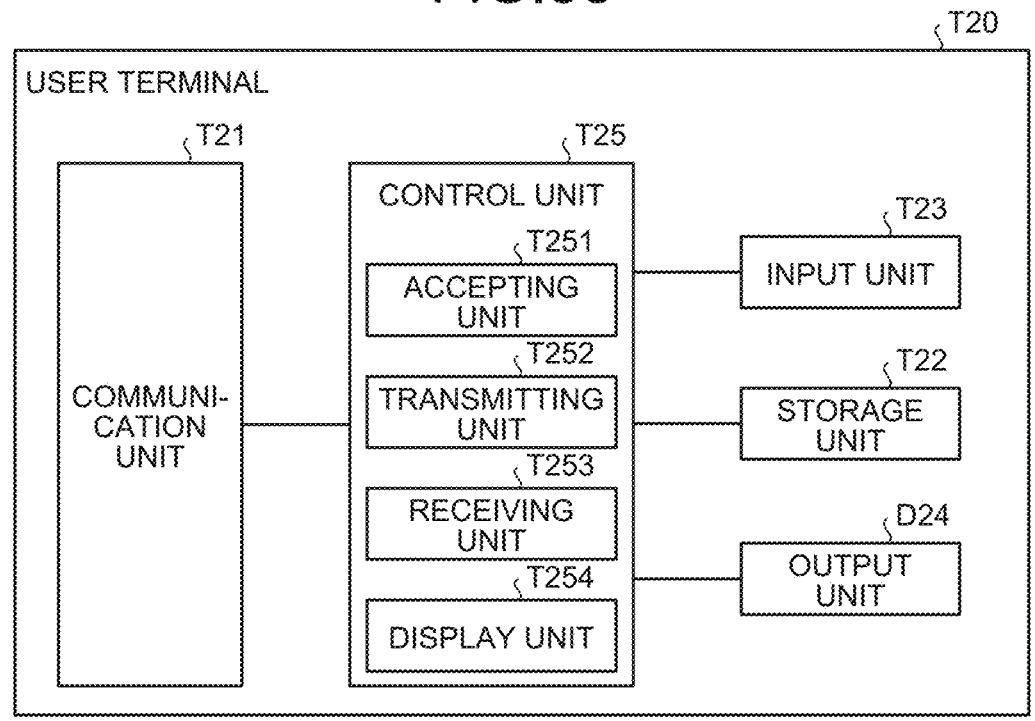
FIG. 38 is a diagram illustrating a configuration example of the user terminal according to the fifth embodiment.

Next, a configuration of the user terminal T20 according to the fifth embodiment will be explained. FIG. 38 is a diagram illustrating a configuration example of the user terminal T20 according to the fifth embodiment. As illustrated in FIG. 38, the user terminal T20 includes a communication an it T21, a storage unit T22, an input unit T23, an output unit T24, and a control unit T25.

The communication unit T21 is an interface, such as a NIC that communicates with the information processing apparatus 100-2A connected to the network N in a communication-enabled manner.

The storage unit T22 is implemented by, for example, a semiconductor memory device, such as a RAM and a flash memory, or a storage device, such as a hard disk and an optical disk.

The input unit T23 is an input device that accepts various kinds of operations from a user. For example, the input unit T23 is implemented by a keyboard, a mouse, an operating key, and the like. The output unit D24 is a display device to display various kinds of information. For example, the output unit 24 is implemented by a liquid crystal display, or the like. When a touch panel is used for the user terminal 20, the input unit 23 and the output unit 24 are integrated.

The control unit T25 is a controller, and is implemented by executing various kinds of programs (corresponding to one example of terminal-device control program) stored in the storage device in the user terminal T20 by a CPU, an MPU, or the like by using the RAM as a work area. Moreover, the control unit T25 is a controller, and is implemented by, for example, an integrated circuit, such as an ASIC and an FPGA.

The control unit T25 includes an accepting unit T251, a transmitting unit T252, a receiving unit T253, and a display unit T254.

The accepting unit T251 accepts a search condition including information about a use purpose of the store E20. The search condition includes, for example, a date on which the store E20 is to be used, an area in which the store E20 is located, and the like in addition to the information about a use purpose of the store E20.

The transmitting unit T252 transmits the search condition to the information processing apparatus 100-2A. The receiving unit T253 receives a search result by the information processing apparatus 100-2A.

The display unit T254 displays the search result received by the receiving unit T253 on the output unit D24. Moreover, the display unit T254 may display one or plural scores indicating a state in the respective stores E20 when one or plural scores indicating a state in the respective store E20 used for estimation of a use purpose of the respective stores E20 are included in the search result.

Configuration Example of Information Processing Apparatus

Figure 39:
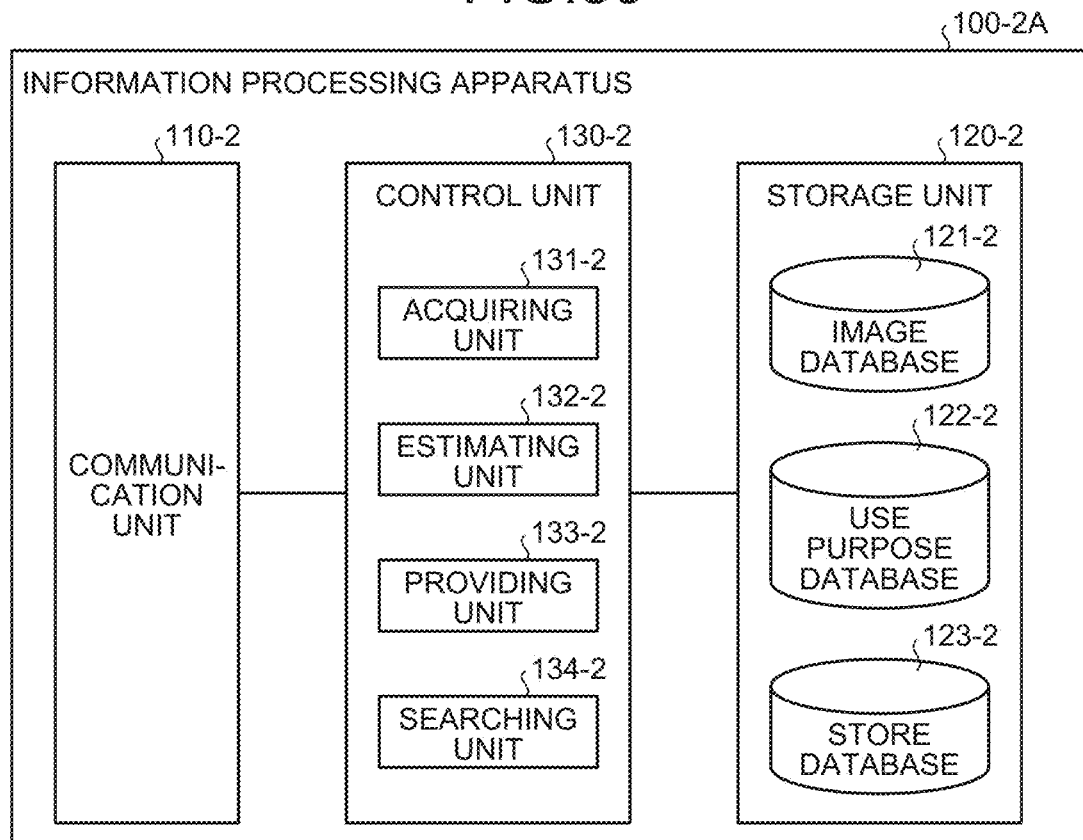
FIG. 39 is a diagram illustrating a configuration example of an information processing apparatus according to the fifth embodiment.

Next, the information processing apparatus 100-2A according to the fifth embodiment will be explained by using FIG. 39. FIG. 39 is a diagram illustrating a configuration example of the information processing apparatus 100-2A according to the fifth embodiment. In FIG. 39, identical reference signs are assigned to identical components to the information processing apparatus 100-2 according to the fourth embodiment, and explanations of duplicated components and operations is thereby omitted. As illustrated in FIG. 39, the information processing apparatus 100-2A includes the communication unit 110-2, the storage unit 120-2, and the control unit 130-2.

The storage unit 120-2 has the image database 121-2, the use purpose database 122-2, and a store database 123-2.

Figures 40, 41:
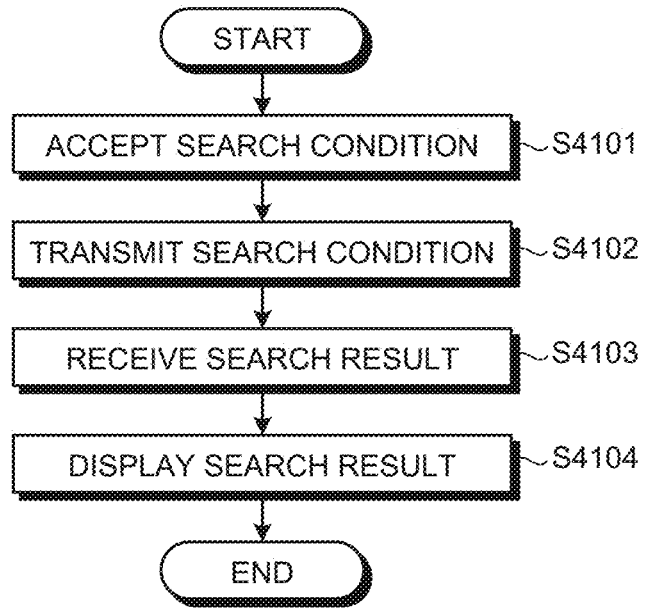
FIG. 40 is a diagram illustrating an example of a store database according to the fifth embodiment.
FIG. 41 is a flowchart illustrating an example of a procedure of information processing according to the fifth embodiment.

The store database 123-2 stores information about a store to be searched. FIG. 40 illustrates one example of the store database 123-2 according to the fifth embodiment. In the example illustrated in FIG. 40, the store database 123-2 includes items of "STORE ID" "DETAIL INFORMATION", "VACANCY INFORMATION", AND "AREA".

The "STORE ID" is an identifier to identify a store registered as a subject to be searched. The "DETAIL INFORMATION" is information indicating about a store associated with the "STORE ID" in detail. The "SEARCH CONDITION" is information indicating a search condition to search for a store associated with the "STORE ID". The "SEARCH CONDITION" includes items of, for example, "USE PURPOSE", "VACANCY", and "AREA". The "USE PURPOSE" indicates information about a use purpose of a store associated with the "STORE ID". The "VACANCY" indicates a vacancy per date on which a store associated with the "STORE ID" is used. The "AREA" indicates an area in which a store associated with the "STORE ID" is located.

For example, in FIG. 40, it is indicated that the store E21 identified by the store ID is identified by a search condition that the detail information is "DETAIL INFORMATION #1", the use purpose is "SUITABLE FOR DATE", the vacancy is "VACANCY #1", and the area is "AREA #1".

The control unit 130-2 includes the acquiring unit 131-2, the estimating unit 132-2, the providing unit 133-2, and a searching unit 134-2.

The estimating unit 132-2 estimates information about a use purpose of the respective store E20 based on an image (that is, image including sound) acquired by the acquiring unit 131-2. The estimating unit 132-2 enters the estimated information about a use purpose of the respective store in the store database 123-2 as a search condition.

The searching unit 134-2 accepts a search condition from the user terminal T20. When accepting a search result, the searching unit 134-2 searches for the store E that satisfies the search condition. Specifically, the information processing apparatus 100-2A refers to the store database 123-2, and searches for the store E20 that satisfies the search condition. A searching unit 124-2 transmits information about the store E20 that satisfies the search condition to the user terminal T20.

Processing Procedure

Next, a procedure of information processing according to the fifth embodiment will be explained by using FIG. 41. FIG. 41 is a flowchart illustrating an example of a procedure of the information processing according to the fifth embodiment. FIG. 41 illustrates a procedure of the information processing performed by the user terminal T20.

As illustrated in FIG. 41, the accepting unit T251 accepts a search condition including information about a use purpose of the store E20 (step S4101).

The transmitting unit T252 transmits a search condition to the information processing apparatus 100-2A (step S4102). Having accepted the search condition from the user terminal T20, the information processing apparatus 100-2A searches for the store E20 that satisfies the search condition. Subsequently, the information processing apparatus 100-2A transmits a search result including information about the store E20 that satisfies the search condition to the user terminal T20 (step S4103).

The receiving unit T253 receives the search result obtained by the information processing apparatus 100-2A (step S4103).

The display unit T254 displays the search result received by the receiving unit T253 on the output unit D24 (step S4104), and the processing is ended.

Effect

As described above, the user terminal T20 according to the present embodiment includes the accepting unit T251, the transmitting unit T252, the receiving unit T253, and the display unit T254. The accepting unit T251 accepts a search condition including information about a use purpose of a store. The transmitting unit T252 transmits the search condition to the information processing apparatus 100-2A that estimates information about a use purpose of a store based on an image obtained by capturing a state in a store, and that searches for a store satisfying the search condition. The receiving unit T253 receives a search result obtained by the information processing apparatus 100-2A. The display unit T254 displays the search result received by the receiving unit T253.

Thus, the user terminal T20 according to the present embodiment can display information about a store that satisfies a search condition including information about a use purpose of the store.

Sixth Embodiment

A sixth embodiment differs from the fourth embodiment in a point in which the imaging apparatus 10-2 acquires a image obtained by capturing a state in a store, and estimates information about a use purpose of the store based on the acquired image. That is, in the sixth embodiment, a part of the functions (the acquiring unit 131-2 and the estimating unit 132-2) of the information processing apparatus 100-2 of the fourth embodiment are combined in the imaging apparatus 10-2.

One Example of Information Processing

Figure 42:
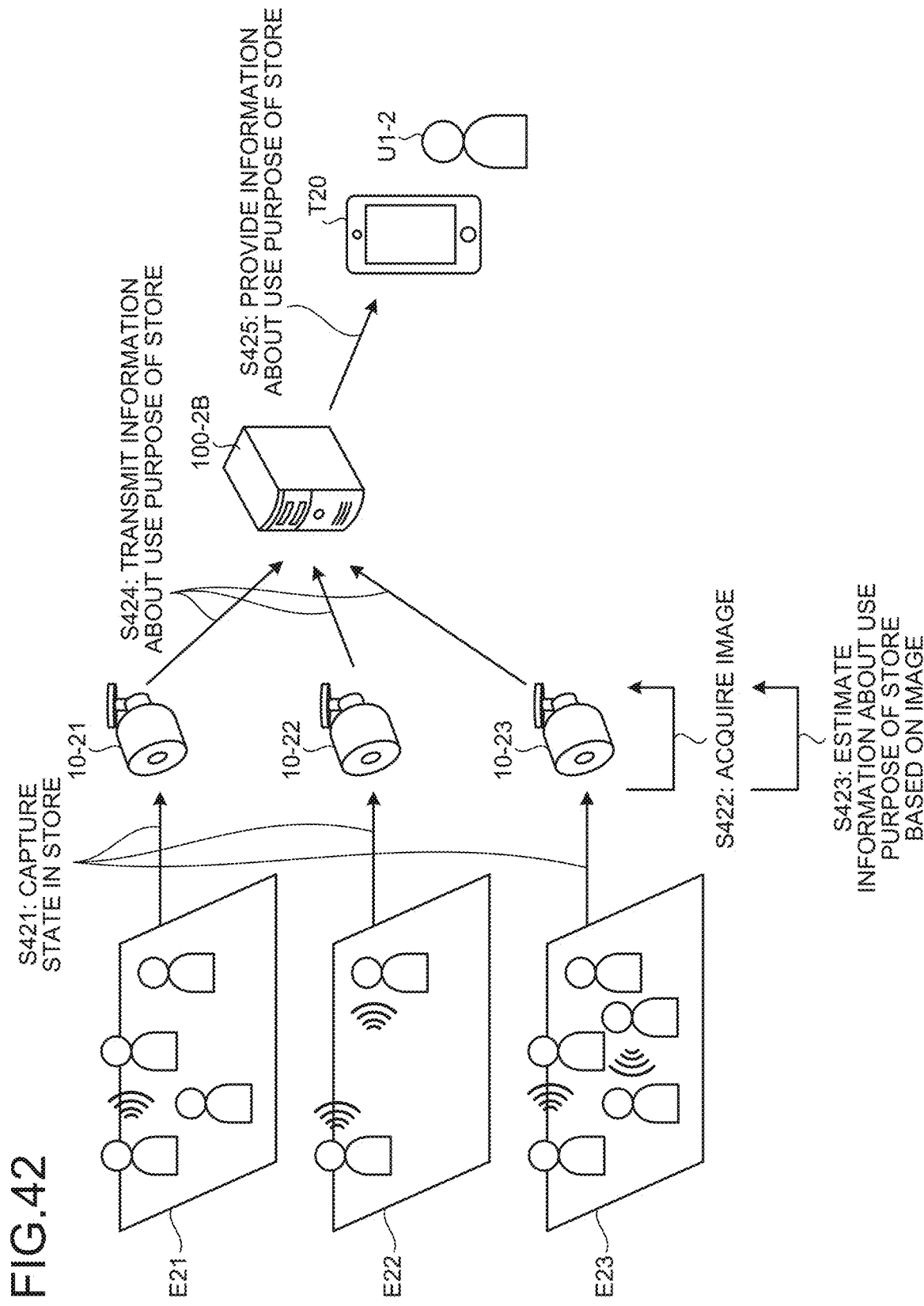
FIG. 42 is a diagram illustrating an example of information processing according to a sixth embodiment.

FIG. 42 is a diagram illustrating an example of information processing according to the sixth embodiment. In FIG. 42, information processing in which the imaging apparatus 10-2 acquires an image obtained by capturing a state in a store, and estimates information about a use purpose of the store based on the acquired image will be explained.

First, as illustrated in FIG. 42, the three imaging apparatuses 10-2 installed in the three stores E20, respective capture a state in the respective stores E20 (step S421).

Subsequently, the respective imaging apparatuses 10-2 acquire an image obtained by capturing a state in the stores E20 (step S422). Specifically, the respective imaging apparatus 10-2 acquires an image obtained by capturing a state in the corresponding stores E20. More specifically, the respective imaging apparatuses 10-2 acquire an image including sound.

Subsequently, the respective imaging apparatuses 10-2 estimate information about a use purpose of the respective stores E20 based on the image including sound (step S423). Specifically, the respective imaging apparatuses 10-2 analyze the image and calculate one or plural scores indicating a state in the store E20. The respective imaging apparatuses 10-2 estimate information about a use purpose of the store based on a comparison result of the calculated score with the use purpose database in which use purposes of the store E20 are classified for each condition to be satisfied by the score.

Subsequently, the respective imaging apparatuses 10-2 transmit the estimated information about a use purpose of the respective stores E20 to an information processing apparatus 100-21 (step S424).

Subsequently, having received the information about a use purpose of the respective stores E20 transmitted from the respective imaging apparatuses 10-2, the information processing apparatus 100-2B provides information about a use purpose of the respective stores E20 (step S425). Specifically, the information processing apparatus 100-21 provides the information about a use purpose of the respective stores E20 to the user terminal T20 being used by the user U1-2 to view viewable information of the respective stores E20.

As described, the imaging apparatus 10-2 according to the sixth embodiment acquires an image obtained by capturing a state in the store E20, and estimates information about a use purpose of the store E20 based on the acquired image. Thus, the imaging apparatus 10-2 according to the sixth embodiment can appropriately estimate information about a use purpose of the store E20 according to an actual state in the store E20.

Configuration of Information Processing System

Because the information processing system S2 according to the sixth embodiment has the same configuration as the information processing system S2 according to the fourth embodiment illustrated in FIG. 29, detailed explanation thereof is omitted.

Configuration of Imaging Apparatus

Figure 43:
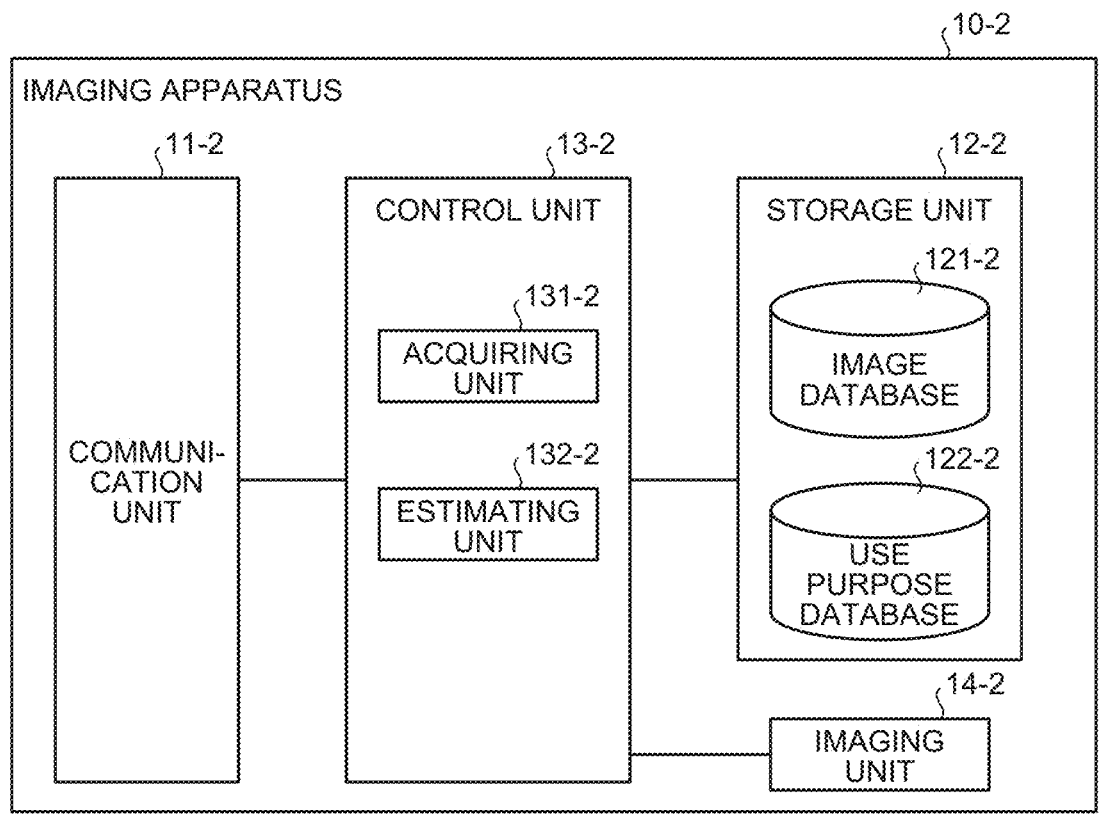
FIG. 43 is a diagram illustrating a configuration example of an imaging apparatus according to the sixth embodiment.

Next, a configuration of the imaging apparatus 10-2 according to the sixth embodiment will be explained by using FIG. 43. FIG. 43 is a diagram illustrating a configuration example of the imaging apparatus 10-2 according to the sixth embodiment. As illustrated in FIG. 43, the imaging apparatus 10-2 includes a communication unit 11-2, an imaging unit 14-2, a storage unit 12-2, and a control unit 13-2.

The communication unit 11-2 is an interface, such as a NIC that communicates with the information processing apparatus 100-2B connected to the network N in a communication-enabled manner.

The imaging unit 14-2 is a camera that implements an imaging function to capture a state in the store E20. The imaging unit 14-2 has a microphone function to collect sound, in addition to the imaging function.

The storage unit 12-2 is implemented by, for example, a semiconductor memory, such as a RAM and a flash memory, or a storage device, such as a hard disk and an optical disk. The storage unit 12-2 has the image database 121-2 and the use purpose database 122-2. The image database 121-2 and the use purpose database 122-2 correspond to the image database 121-2 and the use purpose database 122-2 (refer to FIG. 30) included in the information processing apparatus 100-2 according to the fourth embodiment, respectively.

The control unit 13-2 a controller, and is implemented by executing various kinds of programs (corresponding to one example of information processing program) stored in the storage device in the imaging apparatus 10-2, for example, by a CPU, a MPU, or the like using the RAM as a work area. Moreover, the control unit 13-2 is a controller, and is implemented by, for example, an integrated circuit, such as an application specific integrated circuit (ASIC) and a field programmable gate array (FPGA).

The control unit 13-2 includes the acquiring unit 131-2, and the estimating unit 132-2. The acquiring unit 131-2 and the estimating unit 132-2 correspond to the acquiring unit 131-2 and the estimating unit 132-2 included in the information processing apparatus 100-2 (refer to FIG. 30) according to the fourth embodiment, respectively. The estimating unit 132-2 further transmits estimated information about a use purpose of the store E20 to the information processing apparatus 100-2B.

Configuration of Information Processing Apparatus

Figure 44:
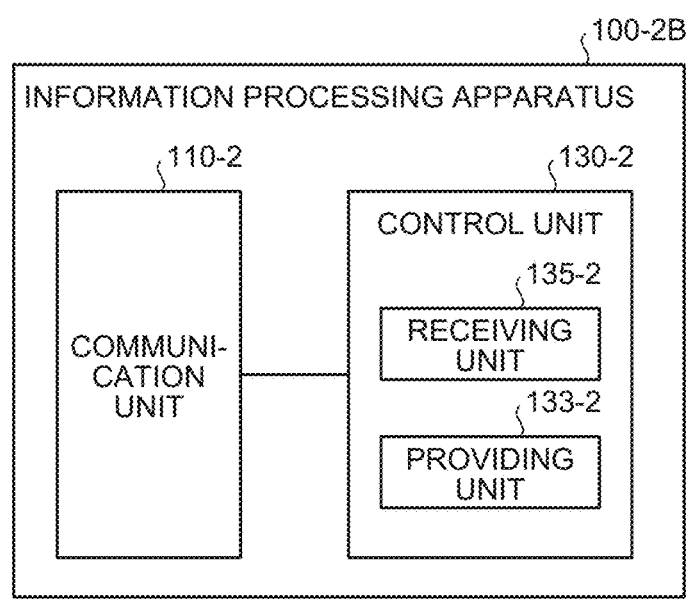
FIG. 44 is a diagram illustrating a configuration example of an information processing apparatus according to the sixth embodiment.

Next, a configuration of the information processing apparatus 100-2B according to the sixth embodiment will be explained by using FIG. 44. FIG. 44 is a diagram illustrating a configuration example of the information processing apparatus 100-2B according to the sixth embodiment. The information processing apparatus 100-2B includes the communication unit 110-2 and the control unit 130-2. The control unit 130-2 includes the providing unit 133-2 and a receiving unit 135-2.

The receiving unit 135-2 receives information about a use purpose of the store E20 transmitted from the respective imaging apparatuses 10-2.

The providing unit 133-2 provides the information about a use purpose of the respective stores E20 received by the receiving unit 135-2.

Effect

As described above, the imaging apparatus 10-2 according to the present embodiment includes the acquiring unit 131-2 and the estimating unit 132-2. The acquiring unit 131-2 acquires an image obtained by capturing a state in a store. The estimating unit 132-2 estimates information about a use purpose of the store based on the image acquired by the acquiring unit 131-2.

Thus, the imaging apparatus 10-2 according to the present embodiment can appropriately estimate information about a use purpose of the store according to an actual state in the store.

Seventh Embodiment

In the fourth to the sixth embodiments explained so far, as a part of a service to support store search by a user, the information processing apparatus 10-2 or the imaging apparatus 10-2 estimates information about a use purpose of a store based on image information acquired by capturing a state in the store. That is, in the fourth to the sixth embodiments explained so far, an example in which the information processing apparatus 10-2 or the imaging apparatus 10-2 estimates information that is used for store search as information about a use purpose of the store has been described.

On the other hand, information processing according to a seventh embodiment differs from the embodiments that have been explained in a point in which it is performed as a part of a service to support store opening. Moreover, from this point of view, the information processing according to a seventh embodiment can be regarded as a service for a user considering store opening (for example, an owner of a store), or a service for consulting work relating to store opening.

Specifically, the estimating unit 132-2 of the information processing apparatus 100-2 estimates information used for store opening as information about a use purpose of the store based on the image information acquired by the acquiring unit 131-2. For example, the acquiring unit 131-2 may further acquire store information registered in advance about a store of a source from which the image information has been acquired. Thus, the estimating unit 132-2 estimates information used for store opening based on the image information and the store information.

For example, the estimating unit 132-2 identifies a store that satisfies condition information relating to store opening out of stores present in a predetermined area, and estimates an area to be a candidate location as the information used for store opening based on information about this identified store out of the information acquired by the acquiring unit (the image information and the image store information). As one example, the estimating unit 132-2 identifies a store that satisfies the condition information relating to store opening (for example, desired store opening area, category of store, customer type of store, average spending per customer, or use purpose of store) based on the information about a store present in the predetermined area out of the information acquired by the acquiring unit 131-2. Hereinafter, one example of the information processing according to the seventh embodiment will be explained by using FIG. 45.

One Example of Information Processing

Figure 45:
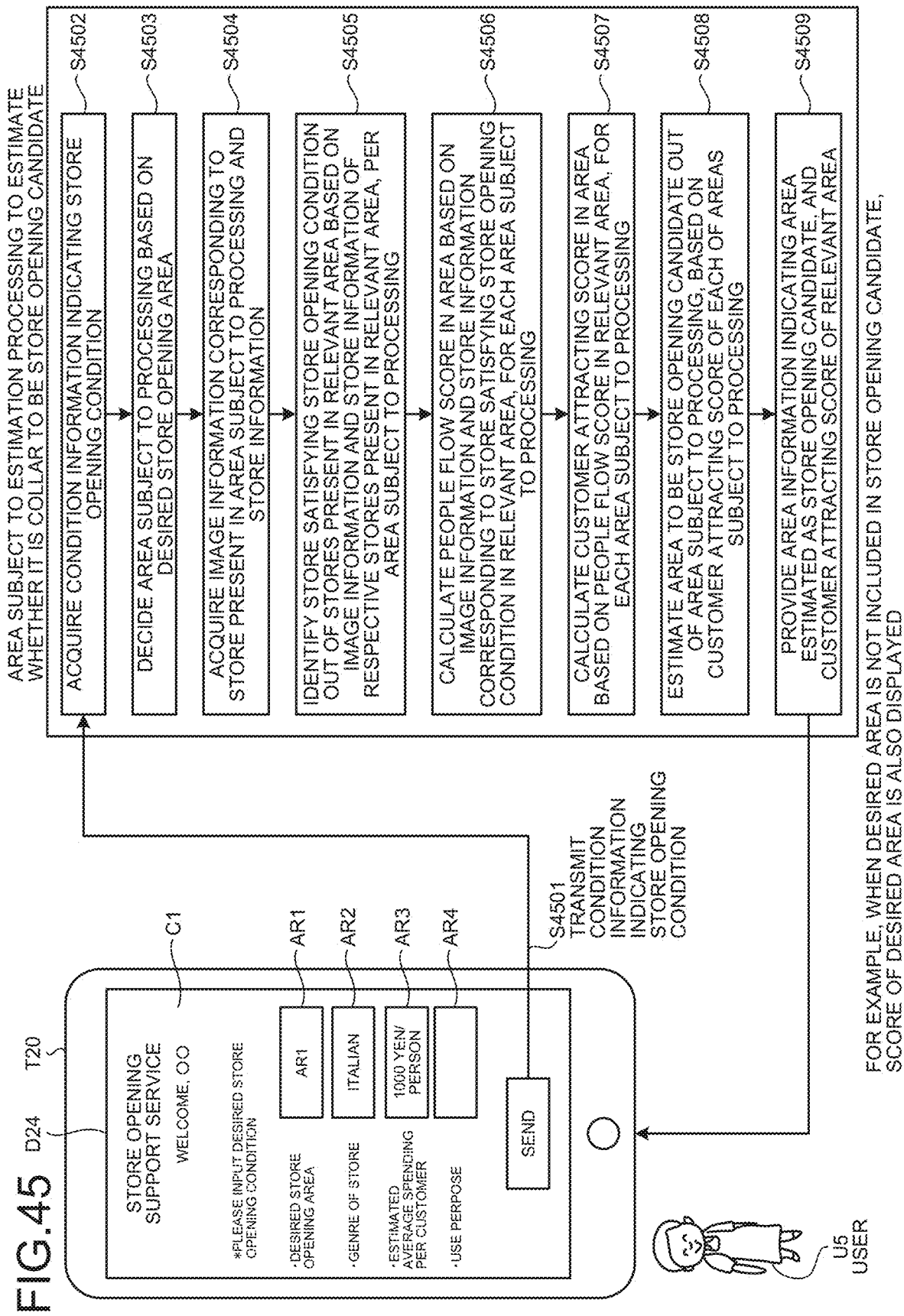
FIG. 45 is a diagram illustrating an example of information processing according to a seventh embodiment.

FIG. 45 is a diagram illustrating an example of information processing according to the seventh embodiment. While an example in which the search-condition accepting screen for store search is displayed when a predetermined application is started has been illustrated in FIG. 36, in the present embodiment, a user can input a store opening condition (an example of the condition information relating to store opening) that is a condition for searching an area to be a store opening candidate location by using this predetermined application.

In the example in FIG. 45, a content (condition input screen C1) corresponding to the predetermined application is displayed on the display screen D24 of the user terminal T20 of a user U5 with a service name of "STORE OPENING SUPPORT SERVICE". The user U5 is assumed to be a store owner considering opening of a second store, for example, but this is only one example, and the user U5 may be a user that is involved in consulting work relating to store opening. Furthermore, according to the example in FIG. 45, the condition input screen C1 includes an input section AR1 to input "DESIRED STORE OPENING AREA" as a store opening condition, an input section AR2 to input "STORE GENRE" (an example of category of store) as a store opening condition, an input section AR3 to input "ESTIMATED AVERAGE SPENDING PER CUSTOMER" as a store opening condition, and an input area AR4 to input "USE PURPOSE" as a store opening condition. Moreover, the condition input screen C1 includes a transmission button BT to transmit the store opening condition to the information processing apparatus 100.

The user not necessarily required to input all of the store opening conditions requested to input on the condition input screen C1. Furthermore, the store opening condition is not limited to the example illustrated in FIG. 45, specifically, not limited to the desired store opening area, the category of store, the average spending per customer, the use purpose of the store. For example, a customer type may be further added to the store opening condition. Moreover, the category of store can be replaced with a category of dish (type of cuisine).

In such a state, it is assumed that the user U5 inputs the desired store opening area "AR1", the type of cuisine "ITALIAN", the estimated average spending per customer "1,000 YEN/PERSON" as the store opening condition. The store opening condition corresponds to inquiring the information processing apparatus 100 whether it will go well in the area "AR1" or whether there is another better area, when considering opening a store of "ITALIAN" at an average spending per customer of "1,000 YEN" in the area "AR1" is considered.

In such a case, The user terminal 20 transmits the condition information indicating the store opening condition input in the condition input screen C1 to the information processing apparatus 100 (step S4501). Subsequently, for example, the receiving unit 135-2 receives the condition information from the user terminal T20 (step S4502).

When the condition information is received by the receiving unit 135-2, the estimating unit 132-2 decides an area subject to processing based on the desired store opening area "AR1" (step S4503). For example, the estimating unit 132-2 decides the desired store opening area "AR1" and an adjacent area adjacent to the desired store opening area "AR1" as a subject to be processed based on the desired store opening area "AR1". In the example in FIG. 45, it is assumed that the estimating unit 132-2 decides the area AR1, an area AR2 (one example of adjacent area), and an area AR3 (one example of adjacent area) as the areas subject to processing.

Next, the acquiring unit 131-2 acquires store image information and store information corresponding to a store included in the area subject to processing (step S4504). For example, the acquiring unit 131-2 acquires the image information corresponding to a store included in the area subject to processing out of image information stored in the image database 121-2. Moreover, the store information is store information that is registered in advance about the store or an acquisition source from which the image information has been acquired (store included in the area subject to processing). Such store information is, for example, stored in the store database 123-2.

Although one example of the store database 123-2 has been explained in FIG. 40, its example will be again explained herein in the configuration corresponding to the sixth embodiment by using FIG. 47. FIG. 47 is a diagram illustrating an example of the store database 123-2 according to the sixth embodiment. In the example in FIG. 47, the store database 123-2 has items of "AREA", "STORE ID", "GENRE", "AVERAGE SPENDING PER CUSTOMER", and "USE PURPOSE".

The "AREA" indicates an area possible to be provided (presented) as a store opening candidate location. Moreover, the "AREA" is also an area in which a store identified by the "STORE ID" is present. The "STORE ID" indicates identification information to identify a store. Moreover, in the store identified by the "STORE ID", the imaging apparatus 10 is installed, and the imaging apparatus transmits image information capturing a state in the store in real time to the information processing apparatus 100 at all times.

The "GENRE" indicates a genre of a store identified by the "STORE ID" (it can be said as a type of cuisine provided by the store identified by the "STORE ID"). The "AVERAGE SPENDING PER CUSTOMER" indicates an average spending per customer of the store identified by the "STORE ID". The "USE PURPOSE" is information about a use purpose estimated for the store identified by the "STORE ID". Such information about a use purpose is used when supporting store search by a user, and this estimation processing is explained in detail in the fourth to the sixth embodiments.

That is, in the example of the store database 123-2 illustrate in FIG. 47, an example in which a store (store SH11) located in the area "AR1", which is a store identified by a store ID "SH11", is a store providing Italian food mainly at an average spending per customer of "900 YEN", and is estimated as a store suitable for date based on image information is illustrated.

Although not illustrated in FIG. 47, the store database 123-2 may store the "CUSTOMER TYPE" of the store for each store. Moreover, the customer type is estimated from the image information. Furthermore, it is assumed that information stored in each item in the store database 123-2 is the store information according to the present embodiment.

Using the example in FIG. 47, at step S4504, the acquiring unit 131-2 acquires image information of respective stores included in the area AR1, the area AR2, the area AR3 (hereinafter, "areas AR1 to AR3" in short) from the store database 123-2, and acquires store information of the respective stores included in the areas AR1 to AR3.

Next, the estimating unit 132-2 identifies a store that satisfies the store opening condition out of the stores included in the area based on the image information of the respective stores included in the area and the store information for each of areas subject to processing (step S4505). With the store SH11 included in the area AR1 that is an area subject to processing as an example, the estimating unit 132-2 judges whether the store SH11 satisfies the store opening condition from the user U5 based on the image information and the store information acquired for the store SH11. When it is judged that the store SH 11 satisfies the store opening condition from the user U5, the estimating unit 132-2 identifies that the store SH11 is a store satisfying the store opening condition. Moreover, in the example in FIG. 47, the estimating unit 132-2 performs similar processing for each of the stores SH12, SH13, SH21, SH23, SH31, SH32, and SH33.

When an area has been found in which no stores satisfying the store opening condition are present among the areas that have been an area subject to processing at step S4505, the estimating unit 132-2 excludes the area from the areas subject to processing, and performs following processing. In the example in FIG. 47, because a store satisfying the store opening condition is present in each of the areas AR1 to AR3, the estimating unit 132-2 does not exclude any area from the areas subject to processing.

Next, the estimating unit 132-2 calculates, per area subject to processing, a people flow score in the area based on the image information or the store information corresponding to the store satisfying the store opening condition in the area (step S4506). The people Flow score is a degree of flow of people in a subject area expressed in a numerical value, and the more people there are in this area (the more crowded the store present in this area is), the higher the value is acquired.

An example of calculating the people flow score in the are AR1 will be explained, with the stores SH11 and the SH12 that are included in the area AR1 subject to processing, and that have been judged to satisfy the store opening condition as an example. In the example, the estimating unit 132-2 calculates a crowdedness score indicating a degree of crowded state in the store SH 11 by analyzing image information acquired for the store SH11. Moreover, the estimating unit 132-2 calculates a crowdedness score indicating a degree of crowded state in the store SH12 by analyzing image information acquired for the store SH12. The estimating unit 132-2 calculates the people flow score in the area AR1 based on the crowdedness score of the store SH11 and the crowdedness score of the store SH12. For example, the estimating unit 132-2 may calculate the people flow score in the area AR1 by adding up the respective crowdedness scores, or may calculate the people flow score in the area AR1 by multiplying the respective crowdedness scores. For example, the estimating unit 132-2 may determines an average value of the respective crowdedness score as the people flow score.

Furthermore, the estimating unit 132-2 may further perform weighting with respect to the calculated people flow scores based on the store information of the store SH11 and the store SH12. For example, the estimating unit 132-2 may perform the weighting such that the people flow score increases as an average of spending per customer becomes lower. Moreover, the estimating unit 132-2 may judge a store rank from the image information (for example, higher rank as cleanliness increases, or the like), and may perform weighting such that the people flow score increases as the store rank becomes higher. The estimating unit 132-2 performs the similar processing with respect to the areas AR2 and AR3 also.

Next, the estimating unit 132-2 calculates a customer attracting score in an area based on the people flow score in the area, for each area subject to processing (step S4507). The customer attracting score is a degree of attracting customers when a store is opened in a subject area converted into a numerical form, and is calculated as a higher value as the people flow score increases. This is based on the viewpoint that an area estimated to have a large number of people can expect to have high ability to attract customers. The estimating unit 132-2 may determine the people flow score calculated at step S4506 itself as the customer attracting score, or may calculate the customer attracting score by, for example, assigning weights to the people flow score according to the number of rival stores in the same area. For example, the estimating unit 132-2 weights such that the people flow score decreases as the number of rival stores in the same area increases, from the viewpoint that as the number of rival stores in the same area increases, the competition intensifies, and it becomes difficult to attract customers.

The estimating unit 132-2 estimates an area to be a store opening candidate among the areas subject to processing, based on the respective customer attracting scores of the areas subject to processing (step S4508). For example, the estimating unit 132-2 estimates an area for which the customer attracting score is equal to or higher than a predetermined value (for example, 5 pt) out of the areas subject to processing as an area to be a store opening candidate. In the example in FIG. 45, the estimating unit 132-2 is assumed to have estimated that the area AR1 cannot be a store opening candidate because the customer attracting score is "3 pt/10 pt". On the other hand, in the example in FIG. 45, the estimating unit 132-2 is assumed to have estimated. that the area AR2 and the area AR3 are areas to be a store opening candidate because the customer attracting score of the area AR2 is "8 pt/10 pt" and the customer attracting score of the area AR3 is "7 pt/10 pt".

The providing unit 133-2 provides the area information indicating an area to be a store opening candidate, and the customer attracting score calculated for the area to the user U5 (step S4509). Specifically, the providing unit 133-2 transmits the area information indicating an area to be a store opening candidate, and the customer attracting score calculated for the area to the user terminal T20 of the user U5. Moreover, although it is estimated that the area AR1 in which the user U5 has first wished to open a store is not to be a store opening candidate in the above example, the providing unit 133-2 presents this result whatever the estimation result is obtained for any desired store opening area specified in the store opening condition. Therefore, the providing unit 133-2 provides the customer attracting score calculated for the desired store opening area to the user U5. For example, the providing unit 133-2 generates an estimation result screen C2 in which a list of these kinds of information is displayed, and distributes the generated estimation result screen C2 to the user terminal 20.

Figure 46:
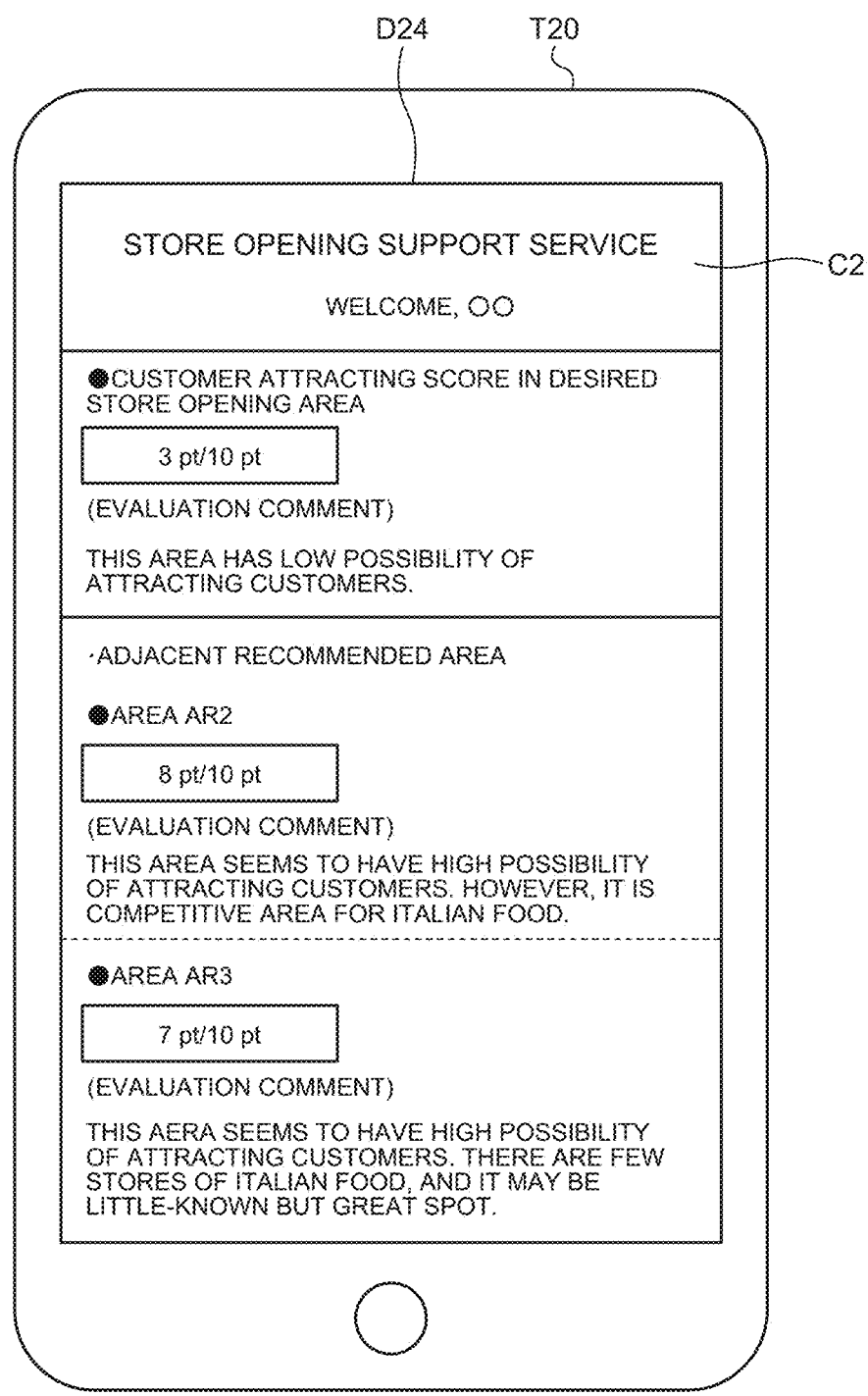
FIG. 46 is a diagram illustrating an example of an estimation result screen according to the seventh embodiment.

One example of the estimation result screen C2 will be herein explained by using FIG. 46. FIG. 46 is a diagram illustrating an example of the estimation result screen C2 according to the seventh embodiment. According to the example in FIG. 46, the providing unit 133-2 generates the estimation result screen C2 in which the customer attracting score in an area, and an evaluation comment based on the customer attracting score are displayed per area. More specifically, the providing unit 133-2 generates the estimation result screen C2 in which the estimation result (the customer attracting score and the evaluation comment) of the area AR1, which is the desired store opening area, is displayed, and together with it, the estimation results (the customer attracting scores and the evaluation comments) of the area AR2 and the area AR3 estimated as a store opening candidate are displayed in a recommending manner.

Thus, the information processing apparatus 100-2 according to the seventh embodiment can provide information to judge whether opening a store in a desired store opening area is beneficial from the viewpoint of attracting customers to a user. Moreover, the information processing apparatus 100-2 according to the seventh embodiment can provide information indicating how it works if a store is opened in an adjacent area even if it is estimated to be difficult to open a store in the desired store opening area and, therefore, can implement a service enabling to effectively support store opening.

The estimating unit 132-2 may estimate, for each area, whether the area is a competitive area or a little-known but great spot based on the number of stores and the people flow score in the area, and in this case, the providing unit 133-2 may provide an estimation result indicating whether a competitive area or a little-known but great spot also. For example, the estimating unit 132-2 estimates that it can be expected to attract customers although it is a competitive area, for an area in which the people flow score is equal to or higher than a predetermined value and the number of stores is equal to or larger than a predetermined value. Moreover, the estimating unit 132-2 estimates an area in which the people flow score is equal to or higher than the predetermined value, but the number of stores is smaller than the predetermined value as a little-known but great spot (good location because pedestrian traffic is heavy although the number of stores is not large).

Furthermore, although an example in which the estimating unit 132-2 estimates information used for opening a store based on the image information and the store information in the seventh embodiment described above, the estimating unit 132-2 may estimate information used for opening a store only from the image information.

Hardware Configuration

Figure 48:
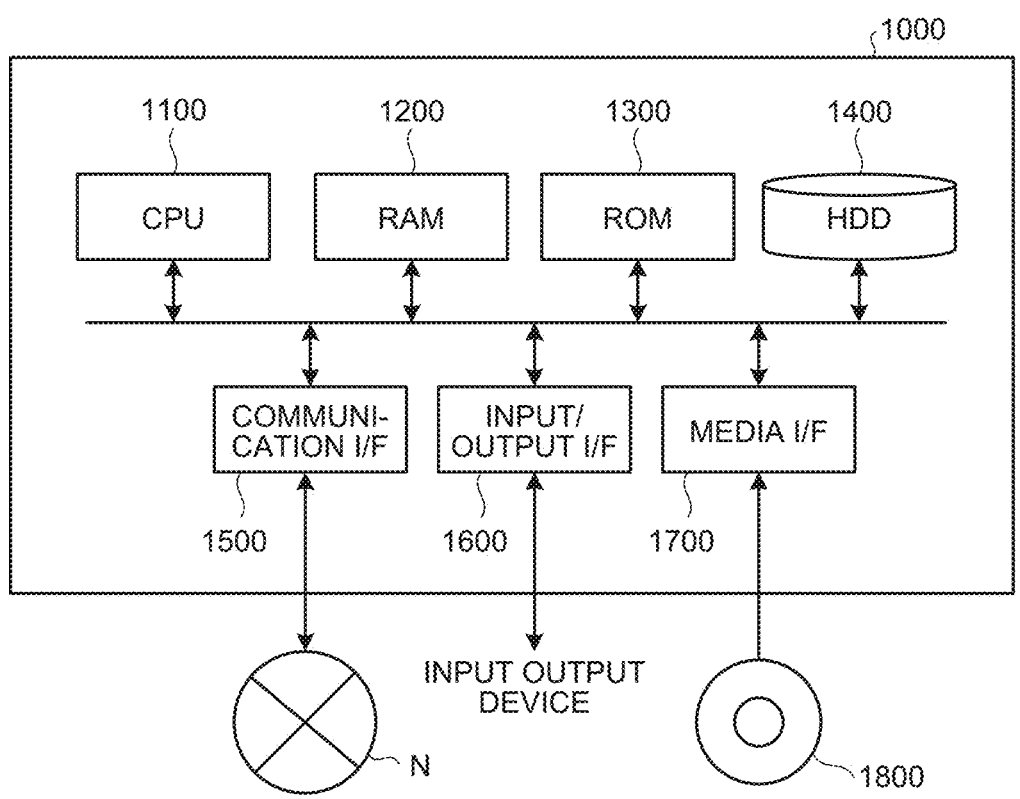
FIG. 48 is a hardware configuration diagram illustrating an example of a computer that implements functions of an information processing apparatus.

Moreover, the information processing apparatus, the user terminal, or the imaging apparatus according to the respective embodiments described above is implemented by, for example, the computer 1000 having a configuration as illustrated in 48. In the following, the information processing apparatus 100-2 is explained as an example. FIG. 48 is a hardware configuration diagram illustrating an example of a computer that implements the functions of the information processing apparatus 100-2. The computer 1000 includes the CPU 1100, the RAM 1200, the ROM 1300, the HDD 1400, the communication interface (I/F) 1500, the input/output interface (I/F) 1600, and the media interface (I/F) 1700.

The CPU 1100 operates based on a program stored in the ROM 1300 or the HDD 1400, and controls the respective components. The ROM 1300 stores a boot program that is executed by the CPU 1100 at the time of starting the computer 1000, a program dependent on hardware of the computer 1000, and the like.

The HDD 1400 stores a program that is executed by the CPU 1100, data that is used by the program, and the like. The communication interface 1500 receives data from other devices through a predetermined communication network to send to the CPU 1100, and transmits data generated by the CPU 1100 to other devices through a predetermined communication network.

The CPU 1100 controls an output device, such as a display and a printer, and an input device, such as a keyboard and a mouse, through the input/output interface 1600. The CPU 1100 acquires data from the input device through the input/output interface 1600. Moreover, the CPU 1100 outputs generated data to the output device through the input/output interface 1600.

The media interface 1700 reads a program or data stored in a recording medium 1800, and provides it to the CPU 1100 through the PAM 1200. The CPU 1100 loads the program on the RAM 1200 from the recording medium 1800 through the media interface 1700, to execute the loaded program. The recording medium 1800 is, for example, an optical recording medium, such as a digital versatile disc (MID) and a phase change rewritable disk (PD), a magneto-optical recording medium, such as a magneto-optical disk (MO), a tape medium, a magnet recording medium, a semiconductor memory, or the like.

For example, when the computer 1000 functions as the information processing apparatus 100-2 according to the embodiment, the CPU 1100 of the computer 1000 implements the function of the control unit 130-2 by executing a program loaded in the RAM 1200. The CPU 1100 of the computer 1000 executes these programs by reading from the recording medium 1800, but as another example, these programs may be acquired from other devices through a predetermined communication network.

Others

Moreover, out of the respective processing explained in the above embodiments and modifications, all or some of processing explained to be performed automatically can also be performed manually, or all or some o processing explained to be performed manually can also be performed automatically by a publicly-known method. Besides, the procedure of processing, the specific names, and the information including various kinds of data and parameters described in the above document or in the drawings can be arbitrarily changed, unless otherwise specified. For example, the respective information illustrated in the respective drawings is not limited to the information illustrated.

Furthermore, the respective components of the respective devices illustrated are of functional concept, and it is not necessarily required to be configured physically as illustrated. That is, specific forms of distribution and integration of the respective devices are not limited to the ones illustrated, and all or some thereof can be configured to be distributed or integrated functionally or physically in arbitrary units according to various kinds of loads, use conditions, and the like.

Moreover, the embodiments and the modifications described above can be arbitrarily combined within a range not causing a contradiction in the processing.

Some of embodiments of the present application have so far been explained in detail with reference to the drawings, but these are examples and the present invention can be implemented by other forms in which various modifications and improvements are made therein including modes described in a field of disclosure of the invention based on knowledge of those skilled in the art.

Furthermore, the term "section, module, unit" described above can be replaced with "means", "circuit", or the like. For example, the acquiring unit can be read as acquiring means or acquiring circuit.

REFERENCE SIGNS LIST

20 USER TERMINAL
100 INFORMATION PROCESSING APPARATUS
131 USE-CONDITION ACQUIRING UNIT
132 ANALYSIS-RESULT ACQUIRING UNIT
133 RESERVATION-INFORMATION ACQUIRING UNIT
134 SELECTING UNIT
135 PROVIDING UNIT
251 ACCEPTING UNIT
252 TRANSMITTING UNIT
253 RECEIVING UNIT
254 DISPLAY UNIT
255 RESERVATION-INFORMATION TRANSMITTING UNIT
S1 INFORMATION PROCESSING SYSTEM
T10 TERMINAL DEVICE
T15 APP CONTROL UNIT
T15a DISPLAY CONTROL UNIT
T15b FIRST TRANSMITTING UNIT
T15c RECEIVING UNIT
T15d TRANSMISSION CONTROL UNIT
T15e SECOND TRANSMITTING UNIT
60 EXTERNAL DEVICE
100-1 INFORMATION PROCESSING APPARATUS
120-1 STORAGE UNIT
121-1 USER-INFORMATION STORAGE UNIT
122-1 STORE-VISIT-INFORMATION STORAGE UNIT
123-1 STORE-INFORMATION STORAGE UNIT
130-1 CONTROL UNIT
131-1 FIRST RECEIVING UNIT
132-1 JUDGING UNIT
133-1 TRANSMITTING UNIT
134-1 SECOND RECEIVING UNIT
135-1 CALCULATING UNIT
136-1 REWARD CONTROL UNIT
137-1 GIVING UNIT
138-1 ANALYZING UNIT
T20 USER TERMINAL
T25 CONTROL UNIT
100-2 INFORMATION PROCESSING APPARATUS
120-2 STORAGE UNIT
121-2 IMAGE DATABASE
122-2 USE PURPOSE DATABASE
130-2 CONTROL UNIT
131-2 ACQUIRING UNIT
132-2 ESTIMATING UNIT
133-2 PROVIDING UNIT
T251 ACCEPTING UNIT
T252 TRANSMITTING UNIT
T253 RECEIVING UNIT
T254 DISPLAY UNIT

The invention claimed is:

1. An information processing apparatus comprising:
a memory storing a database for classifying a use purpose of a store for each condition to be satisfied by a score indicating a state in the store;
a communication interface configured to acquire image data obtained by capturing a state in a plurality of stores; and
processing circuitry configured to
calculate the score indicating the state in a plurality of stores by analyzing the image data acquired by the communication interface;
estimate information about the use purpose of each of the plurality of stores based on the comparison result between the calculated score and the database;
estimate a time series change of the use purpose for each store based on the image data acquired so far;
receive, from a user, a specified store from the plurality of stores and a specified future time period,
estimate, based on the time series change of the use purpose for each store, a use purpose of the specified store in the specified future time; and
output information indicating the use purpose of the specified store in the specified future time period wherein the user terminal performs a reservation process for the store when an input of a store is accepted.

2. The information processing apparatus according to claim 1, wherein
the communication interface is configured to acquire the image data including sound data, and
the processing circuitry is configured to estimate information about a use purpose of the plurality of stores based on the image data including sound data acquired by the communication interface.

3. The information processing apparatus according to claim 1, wherein
the communication interface is configured to acquire, for the plurality of stores, an image obtained by capturing a state in the respective stores, and
the processing circuitry is configured to estimate information about the use purpose of the plurality of stores based on the image acquired by the communication interface.

4. The information processing apparatus according to claim 1, wherein
the processing circuitry is configured to estimate information used for opening a store as the information about a use purpose of the store based on the image data acquired by the communication interface.

5. The information processing apparatus according to claim 4, wherein
- the communication interface is configured to acquire store information that is registered in advance for a store from which the image data is acquired, and
- the processing circuitry is configured to estimate information used for opening a store based on the image data and the store information.

6. The information processing apparatus according to claim 4, wherein the processing circuitry is configured to:
- identify a store satisfying condition information about store opening out of stores present in a predetermined area; and
- estimate an area to be a store opening candidate based on information of the identified store out of information acquired by the communication interface, as the information used for opening a store.

7. The information processing apparatus according to claim 6, wherein the processing circuitry is configured to:
- calculate a customer attracting score indicating a degree of attracting customers when a store is opened in a predetermined area based on a degree of people flow in the predetermined area, which is a degree estimated based on information of an identified store out of the information acquired by the communication interface; and
- estimate an area to be the store opening candidate based on the calculated customer attracting score.

8. The information processing apparatus according to claim 7, wherein
- the processing circuitry is configured to calculate the customer attracting score based on the degree of people flow estimated based on a crowdedness in the store, which is a crowdedness analyzed from information of the identified store out of the information acquired by the communication interface.

9. An information processing method that is performed by a computer, the method comprising:
- classifying a use purpose of a store for each condition to be satisfied by a score indicating a state in the store;
- acquiring image data obtained by capturing the state in a plurality of stores;
- calculating the score indicating the state in a plurality of stores by analyzing the image data acquired by the communication interface;
- estimating information about the use purpose of each of the plurality of stores based on the comparison result between the calculated score and the database;
- estimating a time series change of the use purpose for each store based on the image data acquired so far;
- receiving, from a user, a specified store from the plurality of stores and a specified future time period;
- estimating, based on the time series change of the user purpose for each store, a use purpose of the specified store in the specified future time period; and
- outputting information indicating the use purpose of the specified store in the specified future time period wherein the user terminal performs a reservation process for the store when an input of a store is accepted.

10. A non-transitory computer-readable storage medium having stored therein information processing program that causes a computer to execute:
- classifying a use purpose of a store for each condition to be satisfied by a score indicating a state in the store;
- acquiring image data obtained by capturing the state in a plurality of stores;
- calculating the score indicating the state in a plurality of store by analyzing the image data acquired by the communication interface;
- estimating information about the use purpose of each of the plurality of stores based on the comparison result between the calculated score and the database;
- estimating a time series change of the use purpose for each store based on the image data acquired so far;
- receiving, from a user, a specified store from the plurality of stores and a specified future time period;
- estimating, based on the time series change of the user purpose for each store, a use purpose of the specified store in the specified future time period; and
- outputting information indicating the use purpose of the specified store in the specified future time period wherein the user terminal performs a reservation process for the store when an input of a store is accepted.

* * * * *